United States Patent
Sakurada et al.

(10) Patent No.: US 8,687,481 B2
(45) Date of Patent: Apr. 1, 2014

(54) COMMUNICATION SYSTEM, MANAGEMENT APPARATUS, COMMUNICATION APPARATUS AND COMPUTER PROGRAM

(75) Inventors: Hiroshi Sakurada, Tokyo (JP); Masato Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 886 days.

(21) Appl. No.: 12/593,079

(22) PCT Filed: Apr. 4, 2007

(86) PCT No.: PCT/JP2007/057534
§ 371 (c)(1),
(2), (4) Date: Sep. 25, 2009

(87) PCT Pub. No.: WO2008/129594
PCT Pub. Date: Oct. 30, 2008

(65) Prior Publication Data
US 2010/0085885 A1  Apr. 8, 2010

(51) Int. Cl.
*H04J 3/06* (2006.01)
(52) U.S. Cl.
USPC ............ 370/222; 370/249; 370/350; 370/503
(58) Field of Classification Search
USPC ......... 370/216, 222, 241, 242, 245, 249, 252, 370/254, 255, 258, 345, 350, 404, 503, 370/507–510
See application file for complete search history.

(56) References Cited

U.S. PATENT DOCUMENTS

| | | | | |
|---|---|---|---|---|
| 5,276,655 | A * | 1/1994 | Rialan et al. | 367/77 |
| 5,327,468 | A * | 7/1994 | Edblad et al. | 375/356 |
| 7,113,485 | B2 * | 9/2006 | Bruckman | 370/252 |
| 7,280,550 | B1 * | 10/2007 | Rosenboom | 370/404 |
| 2002/0053985 | A1 * | 5/2002 | Nesbitt | 340/994 |
| 2003/0048754 | A1 * | 3/2003 | Bruckman | 370/252 |

FOREIGN PATENT DOCUMENTS

| | | |
|---|---|---|
| JP | 2-5654 | 1/1990 |
| JP | 5-167589 | 7/1993 |
| JP | 6-52076 | 2/1994 |
| JP | 7-226756 | 8/1995 |
| JP | 2003-333058 | 11/2003 |
| JP | 2004-15251 | 1/2004 |

OTHER PUBLICATIONS

U.S. Appl. No. 12/594,354, filed Oct. 2, 2009, Sakurada et al.
D. Mills, "Simple Network Time Protocol (SNTP) Version 4 for IPv4, IPv6 and OSI", Network Working Group, Request for Comments: 2030, Oct. 1996, 12 pages.

* cited by examiner

*Primary Examiner* — Yemane Mesfin
*Assistant Examiner* — Mon Cheri Davenport
(74) *Attorney, Agent, or Firm* — Oblon, Spivak, McClelland, Maier & Neustadt, L.L.P.

(57) ABSTRACT

In a ring type network, a master node sends a measurement packet to a slave node in the backward direction and the forward direction, receives the measurement packet which has been circulated among a plurality of slave nodes, stores a received time of the backward direction measurement packet and a sending time of the forward direction measurement packet according to time-keeping of an internal clock, sends a measurement result notifying packet showing a sending time and a received time of the measurement packet to the slave node; each slave node receives the backward direction measurement packet and the forward direction measurement packet, sends the received measurement packet to the next node, stores the received time of the backward direction measurement packet and the sending time of the forward direction measurement packet according to the time-keeping of the internal clock, receives a measurement result notifying packet, calculates a time correction value using the sending time and the received time of the measurement packet shown in the measurement result notifying packet and the sending time and the received time of the measurement packet stored, and corrects a time of the internal clock using the calculated time correction value.

27 Claims, 28 Drawing Sheets

COMMUNICATION SYSTEM, MANAGEMENT APPARATUS, COMMUNICATION APPARATUS AND COMPUTER PROGRAM

TECHNICAL FIELD

The present invention relates to, for example, a time synchronizing technique between a plurality of node apparatuses connected to form a ring type network.

BACKGROUND ART

A time synchronizing method with excluding influence of transmission delay in each transmission channel or processing delay in each node is described in, for example, IEEE 1588, etc.

In the implementation of a high precision time synchronization system based on the IEEE 1588, the influence of internal processing delay of the sending node and the receiving node is excluded by obtaining time stamps of sending/receiving a packet at a closer timing of physically sending or receiving signals.

The method according to the IEEE 1588 implements time synchronization in all types of network configuration using a master/slave configuration in a point-to-point or multi-point connection as a minimum unit and by combining these minimum units.

Further, in the conventional time synchronizing method, a master clock node (a master, hereinafter) which is a time reference within the network notifies time information, and other slave clock nodes (slaves, hereinafter) obtain a time correction value from a difference between the notified time information and the clock of the own node and carries out the time correction of the own node.

At this time, a method to carry out time correction has been disclosed with considering a delay time of packet transmission calculated from the known network configuration and a cable length between the nodes (Patent Document 1, for example).

Patent Document 1: JP06-52076

DISCLOSURE OF THE INVENTION

Problems to be Solved by the Invention

In the conventional time synchronizing method for the ring type network, there is a problem that influence of transmission delay of a time information notifying packet which may occur in a transmission channel and a relay node between the master which is the reference of the time synchronization and the slaves which are targets of time correction is not considered.

In addition, in a method for calculating a delay time based on the network configuration or the cable length between the nodes, there is a problem that at least parameters for delay calculation, namely, the number of relay nodes on the route to each slave, the total extension of cables between the nodes, etc. have to be transmitted from the master at every changing the network configuration, and further that the delay time cannot be calculated if these information is not known.

Further, when the time synchronizing method by combining the point-to-point or multi-point configuration as shown in the IEEE 1588 is applied to the ring type network, a relation of a master and a slave should be formed in each combination of two neighboring nodes which are directly physically connected in the ring configuration, and the time synchronizing process should be performed sequentially in multi-step configuration of master/slave. Therefore, there are problems that each node on the ring has to implement both processing of the master and the slave, that the number of packet exchanges for the time synchronization is large, and that it takes long to complete the time synchronization of all the nodes.

One of main objects of the present invention is to solve the above problems, and one of the main objects is, in the time synchronization of the ring type network, to exclude influence of delay which occurs on the transmission channel from the master to the slave, simplify each processing of the master and the slave, and reduce the number of packet exchanges for the time synchronization.

Means to Solve the Problems

According to the present invention, in a communication system, in which a master node apparatus having a reference clock and a plurality of slave node apparatuses each having an internal clock are connected to form a ring, for circulating a packet between a plurality of node apparatuses in two directions by transferring the packet in the two directions according to a packet transferring order prescribed for each node apparatus, the master node apparatus:

sends a first measurement packet to a slave node apparatus being a receiver in one direction according to the packet transferring order, and receives the first measurement packet which has been circulated among the plurality of slave node apparatuses in the one direction;

sends a second measurement packet to a slave node apparatus being a receiver in an other direction according to the packet transferring order, and receives the second measurement packet which has been circulated among the plurality of slave node apparatuses in the other direction;

according to time-keeping of the reference clock, stores at least either of a pair of a sending time of the first measurement packet and a received time of the second measurement packet and a pair of a received time of the first measurement packet and a sending time of the second measurement packet;

generates a measurement result notifying packet showing at least either of the pair of the sending time of the first measurement packet and the received time of the second measurement packet and the pair of the received time of the first measurement packet and the sending time of the second measurement packet; and sends the measurement result notifying packet generated to a slave node apparatus being a receiver in either direction, and each slave node apparatus:

receives the first measurement packet from a node apparatus of a sender of the one direction, and sends the first measurement packet received to a node apparatus being a receiver in the one direction;

receives the second measurement packet from a node apparatus of a sender in the other direction, and sends the second measurement packet received to a node apparatus being the receiver in the other direction;

according to time-keeping of the internal clock, stores at least either of a pair of a received time of the first measurement packet and a sending time of the second measurement packet and a pair of a sending time of the first measurement packet and a received time of the second measurement packet; and receives the measurement result notifying packet from a node apparatus being a sender in either direction, calculates a time correction value using at least either of the pair of the sending time of the first measurement packet and the received time of the second measurement packet and the pair of the received time of the first measurement packet and the sending time of the second measurement packet shown in the measurement result notifying packet received and at least either of the pair of the received time of the first measurement packet and the sending time of the second measurement packet stored and the pair of the sending time of the first measurement packet and the received time of the second measurement packet stored, and corrects a time of the internal clock using the time correction value calculated.

Each slave node apparatus sets as the time correction value, a differential value obtained by subtracting an average value of the sending time and the received time of the pair stored from an average value of the sending time and the received time of the pair shown in the measurement result notifying packet.

Each slave node apparatus:

when the pair of the sending time of the first measurement packet and the received time of the second measurement packet is stored at the master node apparatus, stores the pair of the received time of the first measurement packet and the sending time of the second measurement packet, sets as the time correction value, a differential value obtained by subtracting an average value of the received time of the first measurement packet and the sending time of the second measurement packet stored from an average value of the sending time of the first measurement packet and the received time of the second measurement packet shown in the measurement result notifying packet received; and when the pair of the received time of the first measurement packet and the sending time of the second measurement packet is stored at the master node apparatus, stores the pair of the sending time of the first measurement packet and the received time of the second measurement packet, sets as the time correction value, a differential value obtained by subtracting an average value of the sending time of the first measurement packet and the received time of the second measurement packet stored from an average value of the received time of the first measurement packet and the sending time of the second measurement packet shown in the measurement result notifying packet received.

The master node apparatus:

when either one of the plurality of slave node apparatuses is uncommunicable, sends a turn-back measurement packet to be returned by a turn-back point slave node apparatus being uncommunicable to a slave node apparatus being a receiver in a direction of the turn-back point slave node apparatus, and according to time-keeping of the reference clock, stores a sending time of the turn-back measurement packet;

receives a returned turn-back measurement packet returned by the turn-back point slave node apparatus, and according to the time-keeping of the reference clock, stores a received time of the returned turn-back measurement packet; and generates a turn-back measurement result notifying packet showing the sending time of the turn-back measurement packet and the received time of the returned turn-back measurement packet, and sends the turn-back measurement result notifying packet generated to a slave node apparatus being a receiver in a direction of the turn-back point slave node apparatus, and each slave node apparatus:

on receiving the turn-back measurement packet, according to the time-keeping of the internal clock, stores a received time of the turn-back measurement packet;

when the apparatus itself is not the turn-back point slave node apparatus, sends the turn-back measurement packet to a node apparatus being a receiver in a sending direction of the turn-back measurement packet, receives the returned turn-back measurement packet returned by the turn-back point slave node apparatus, sends the returned turn-back measurement packet received to a node apparatus being a receiver in a returning direction, and according to the time-keeping of the internal clock, stores a sending time of the returned turn-back measurement packet;

when the apparatus itself is the turn-back point slave node apparatus, returns the turn-back measurement packet to a node apparatus being a sender of the turn-back measurement packet, and according to the time-keeping of the internal clock, stores a sending time of the returned turn-back measurement packet; and receives the turn-back measurement result notifying packet, calculates a time correction value using the sending time of the turn-back measurement packet and the received time of the returned turn-back measurement packet shown in the turn-back measurement result notifying packet and the received time of the turn-back measurement packet stored and the sending time of the returned turn-back measurement packet stored, and corrects a time of the internal clock using the time correction value calculated.

The master node apparatus:

when two slave node apparatuses are uncommunicable between each other, receives a returned turn-back measurement packet returned by a turn-back point slave node apparatus of one side of the two slave node apparatuses being uncommunicable, sends the returned turn-back measurement packet to a slave node apparatus being a receiver in a direction of a turn-back point slave node apparatus of an other side of the two slave node apparatuses being uncommunicable, and as well according to the time-keeping of the reference clock, stores a sending time of the returned turn-back measurement packet;

receives a twicely-returned turn-back measurement packet returned twice by the turn-back point slave node apparatus being the other side, and according to the time-keeping of the reference clock, stores a received time of the twicely-returned turn-back measurement packet; and generates a turn-back measurement result notifying packet showing the sending time of the returned turn-back measurement packet and the received time of the twicely-returned turn-back measurement packet, and sends the turn-back measurement result notifying packet generated to the slave node apparatus being the receiver in the direction of the turn-back point slave node apparatus being the other side, and each slave node apparatus:

on receiving the returned turn-back measurement packet sent by the master node apparatus, according to the time-keeping of the internal clock, stores a received time of the returned turn-back measurement packet;

when the apparatus itself is not the turn-back point slave node apparatus being the other side, sends the returned turn-back measurement packet to a node apparatus being a receiver in a sending direction of the returned turn-back measurement packet, receives the twicely-returned turn-back measurement packet returned twicely by the turn-back point slave node apparatus being the other side, sends the twicely-returned turn-back measurement packet received to a node apparatus being a receiver in a twicely-returning direction, and according to the time-keeping of the internal clock, stores a sending time of the twicely-returned turn-back measurement packet;

when the apparatus itself is the turn-back point slave node apparatus being the other side, twicely returns the returned turn-back measurement packet to a node apparatus being a sender of the returned turn-back measurement packet, and according to the time-keeping of the internal clock, stores a sending time of the twicely-returned turn-back measurement packet returned twicely; and receives the turn-back measurement result notifying packet, calculates the time correction value using the sending time of the returned turn-back measurement packet and the received time of the twicely-returned turn-back measurement packet shown in the turn-back measurement result notifying packet and the received time of the returned turn-back measurement packet stored and the sending time of the twicely-returned turn-back measurement packet stored, and corrects the time of the internal clock using the time correction value calculated.

Each slave node apparatus sets as the time correction value, a differential value obtained by subtracting an average value of the received time of the turn-back measurement packet and the sending time of the returned turn-back measurement packets stored from an average value of the sending time of the turn-back measurement packet and the received time of the returned turn-back measurement packet shown in the turn-back measurement result notifying packet.

Each slave node apparatus sets as the time correction value, a differential value obtained by subtracting an average value of the received time of the returned turn-back measurement packet and the sending time of the twicely-returned turn-back measurement packets stored from an average value of the sending time of the returned turn-back measurement packet and the received time of the twicely-returned turn-back measurement packet shown in the turn-back measurement result notifying packet.

Each slave node apparatus:

according the time-keeping of the internal clock, stores the pair of the sending time of the first measurement packet and the received time of the second measurement packet and the pair of the received time of the first measurement packet and the sending time of the second measurement packet;

receives a measurement result notifying packet showing either of a pair of a sending time of the first measurement packet and a received time of the second measurement packet at an other node apparatus and a pair of a received time of the first measurement packet and a sending time of the second measurement packet at the other node apparatus;

calculates the time correction value using the pair of the sending time and the received time shown in the measurement result notifying packet received and either pair of the sending time and the received time out of the pairs stored; and calculates a sending time after correction and a received time after correction by applying the time correction value calculated to the pair of the sending time and the received time which has not been used for calculating the time correction value out of the pairs of the sending time and the received time stored.

Each slave node apparatus:

receives, from the node apparatus being the sender in the one direction, a measurement result notifying packet showing the pair of the sending time of the first measurement packet and the received time of the second measurement packet at the node apparatus;

calculates the time correction value using the pair of the sending time of the first measurement packet and the received time of the second measurement packet shown in the measurement result notifying packet received and the pair of the received time of the first measurement packet and the sending time of the second measurement packet stored, and calculates the sending time after correction of the first measurement packet and the received time after correction of the second measurement packet by applying the time correction value calculated to the sending time of the first measurement packet stored and the received time of the second measurement packet stored; and stores a pair of the sending time after correction of the first measurement packet calculated and the received time after correction of the second measurement packet calculated in the measurement result notifying packet by replacing the pair of the sending time of the first measurement packet and the received time of the second measurement packet shown in the measurement result notifying packet received, and sends to a node apparatus being a receiver in the one direction the measurement result notifying packet in which the pair of the sending time after correction of the first measurement packet and the received time after correction of the second measurement packet is stored.

Each slave node apparatus:

receives, from a node apparatus of a sender in the other direction, the measurement result notifying packet showing the pair of the received time of the first measurement packet and the sending time of the second measurement packet of the node apparatus;

calculates the time correction value using the pair of the received time of the first measurement packet and the sending time of the second measurement packet shown in the measurement result notifying packet received and the pair of the sending time of the first measurement packet stored and the received time of the second measurement packet stored, and calculates the received time after correction of the first measurement packet and the sending time after correction of the second measurement packet by applying the time correction value calculated to the received time of the first measurement packet stored and the sending time of the second measurement packet stored; and stores a pair of the received time after correction of the first measurement packet and the sending time after correction of the second measurement packet calculated in the measurement result notifying packet by replacing the pair of the received time of the first measurement packet and the sending time of the second measurement packet shown in the measurement result notifying packet received, and sends the measurement result notifying packet in which the pair of the received time after correction of the first measurement packet and the sending time after correction of the second measurement packet is stored to a node apparatus of a receiver in the other direction.

Each slave node apparatus sets as the time correction value, a differential value obtained by subtracting an average value of the received time of the first measurement packet stored and the sending time of the second measurement packet stored from an average value of the sending time of the first measurement packet and the received time of the second measurement packet shown in the measurement result notifying packet.

Each slave node apparatus sets as the time correction value, a differential value obtained by subtracting an average value of the sending time of the first measurement packet stored and the received time of the second measurement packet stored from an average value of the received time of the first measurement packet and the sending time of the second measurement packet shown in the measurement result notifying packet.

According to the present invention, a management apparatus having a reference clock, forming a circulation route of a packet with a plurality of communication apparatuses, and circulating a packet in two directions on the circulation route according to a packet transferring order prescribed for each of the apparatus, the management apparatus includes:

a first measurement packet sending unit sending a first measurement packet to a communication apparatus being a receiver in one direction according to the packet transferring order;

a first measurement packet receiving unit receiving the first measurement packet which has been circulated among the plurality of communication apparatuses in the one direction;

a second measurement packet sending unit sending a second measurement packet to a communication apparatus being a receiver in an other direction according to the packet transferring order;

a second measurement packet receiving unit receiving the second measurement packet which has been circulated among the plurality of communication apparatuses in the other direction;

a time memory unit, according to time-keeping of the reference clock, storing at least either of a pair of a sending time of the first measurement packet and a received time of the second measurement packet and a pair of a received time of the first measurement packet and a sending time of the second measurement packet;

a measurement result notifying packet generating unit generating a measurement result notifying packet showing at least either of the pair of the sending time of the first measurement packet and the received time of the second measurement packet and the pair of the received time of the first measurement packet and the sending time of the second measurement packet stored in the time memory unit; and a measurement result notifying packet sending unit sending the measurement result notifying packet generated by the measurement result notifying packet generating unit to a slave node apparatus being the receiver in either direction.

The management apparatus further includes:

a turn-back measurement packet generating unit, when either one of the plurality of communication apparatuses is uncommunicable, generating a turn-back measurement packet to be returned by a turn-back point communication apparatus which is uncommunicable;

a turn-back measurement packet sending unit sending the turn-back measurement packet generated by the turn-back measurement packet generating unit to a communication apparatus being a receiver in a direction of the turn-back point communication apparatus; and a turn-back measurement packet receiving unit receiving a returned turn-back measurement packet returned by the turn-back point communication apparatus, the time memory unit, according to time-keeping of the reference clock, stores a sending time of the turn-back measurement packet by the turn-back measurement packet sending unit and a received time of the returned turn-back measurement packet by the turn-back measurement packet receiving unit, the measurement result notifying packet generating unit generates a turn-back measurement result notifying packet showing the sending time of the turn-back measurement packet and the received time of the returned turn-back measurement packet stored in the time memory unit, and the measurement result notifying packet sending unit sends the turn-back measurement result notifying packet generated by the measurement result notifying packet generating unit to the communication apparatus being the receiver in the direction of the turn-back point communication apparatus.

The turn-back measurement packet receiving unit receives, when two communication apparatuses are uncommunicable between each other, the returned turn-back measurement packet from a turn-back point communication apparatus of one side of the two communication apparatuses being uncommunicable, the turn-back measurement packet sending unit sends the returned turn-back measurement packet received by the turn-back measurement packet receiving unit to a communication apparatus being a receiver in a direction of a turn-back point communication apparatus of an other side of the two communication apparatuses being uncommunicable, the turn-back measurement packet receiving unit further receives a twicely-returned turn-back measurement packet returned twicely by the turn-back point communication apparatus of the other side, the time memory unit, according to the time-keeping of the reference clock, stores a sending time of the returned turn-back measurement packet by the turn-back measurement packet sending unit and a received time of the twicely-returned turn-back measurement packet by the turn-back measurement packet receiving unit, the turn-back measurement result notifying packet generating unit generates a turn-back measurement result notifying packet showing the sending time of the returned turn-back measurement packet and the received time of the twicely-returned turn-back measurement packet stored by the time memory unit, and the turn-back measurement result notifying packet sending unit sends the turn-back measurement result notifying packet generated by the turn-back measurement result notifying packet generating unit to a communication apparatus being a receiver in the direction of the turn-back point communication apparatus of the other side.

According to the present invention, a communication apparatus having an internal clock, forming a circulation route of a packet with a management apparatus having a reference clock and at least one other communication apparatus, and circulating a packet in two directions on the circulation route according to a packet transferring order prescribed for each of the apparatuses, the communication apparatus includes:

a first measurement packet receiving unit receiving a first measurement packet which has been sent by the management apparatus in one direction, from an apparatus being a sender in the one direction according to the packet transferring order;

a first measurement packet sending unit sending the first measurement packet received by the first measurement packet receiving unit to an apparatus being a receiver in the one direction;

a second measurement packet receiving unit receiving a second measurement packet which has been sent by the management apparatus in an other direction, from an apparatus being a sender in the other direction according to the packet transferring order;

a second measurement packet sending unit sending the second measurement packet received by the second measurement packet receiving unit to an apparatus being a receiver in the other direction according to the packet transferring order;

a time memory unit, according to time-keeping of the internal clock, storing at least either of a pair of a received time of the first measurement packet and a sending time of the second measurement packet and a pair of a sending time of the first measurement packet and a received time of the second measurement packet;

a measurement result notifying packet receiving unit receiving a measurement result notifying packet showing, according to time-keeping of the reference clock of the management apparatus, at least either of a pair of a sending time of the first measurement packet at the management apparatus and a received time of the second measurement packet which has been circulated through the circulation route at the management apparatus and a pair of a received time of the first measurement packet which has been circulated through the circulation route at the management apparatus and a sending time of the second measurement packet at the management apparatus;

a time correction value calculating unit calculating a time correction value using at least either of the pair of the sending time of the first measurement packet at the management apparatus and the received time of the second measurement packet at the management apparatus and the pair of the received time of the first measurement packet at the management apparatus and the sending time of the second measurement packet at the management apparatus shown in the measurement result notifying packet received, and at least either of the pair of the received time of the first measurement packet and the sending time of the second measurement packet and the pair of the sending time of the first measurement packet and the received time of the second measurement packet stored by the time memory unit; and a clock controlling unit correcting a time of the internal clock using the time correction value calculated by the time correction value calculating unit.

The time correction value calculating unit sets as the time correction value, a differential value obtained by subtracting an average value of the sending time and the received time of the pair stored in the time memory unit from an average value of the received time of and the sending time shown in the measurement result notifying packet.

The time memory unit:

when the measurement result notifying packet showing the pair of the sending time of the first measurement packet and the received time of the second measurement packet at the management apparatus is received by the measurement result notifying packet receiving unit, stores the pair of the received time of the first measurement packet and the sending time of the second measurement packet; and when the measurement result notifying packet showing the pair of the received time of the first measurement packet and the sending time of the second measurement packet at the management apparatus is received by the measurement result notifying packet receiving unit, stores the pair of the sending time of the first measurement packet and the received time of the second measurement packet, the time correction value calculating unit:

when the measurement result notifying packet showing the pair of the sending time of the first measurement packet and the received time of the second measurement packet at the management apparatus is received by the measurement result notifying packet receiving unit, sets as the time correction value, a differential value obtained by subtracting an average value of the received time of the first measurement packet and the sending time of the second measurement packet stored in the time memory unit from an average value of the sending time of the first measurement packet and the received time of the second measurement packet at the management apparatus shown in the measurement result notifying packet; and when the measurement result notifying packet showing the pair of the received time of the first measurement packet and the sending time of the second measurement packet at the management apparatus is received by the measurement result notifying packet receiving unit, sets as the time correction value, a differential value obtained by subtracting an average value of the sending time of the first measurement packet and the received time of the second measurement packet stored by the time memory unit from an average value of the received time of the first measurement packet and the sending time of the second measurement packet shown in the measurement result notifying packet.

The communication apparatus further includes:

a turn-back measurement packet receiving unit, when either of the communication apparatuses is uncommunicable, receiving a turn-back measurement packet to be returned by a turn-back point communication apparatus being uncommunicable, sent by the management apparatus; and a turn-back measurement packet sending unit, when an apparatus itself is not the turn-back point communication apparatus, sending the turn-back measurement packet to an apparatus being a receiver in a sending direction of the turn-back measurement packet, as well sending a returned turn-back measurement packet which is the turn-back measurement packet returned by the turn-back point communication apparatus to an apparatus being a receiver in a returning direction after the returned turn-back measurement packet is received by the turn-back measurement packet receiving unit, and when the apparatus itself is the turn-back point communication apparatus, returning the turn-back measurement packet as the returned turn-back measurement packet to an apparatus being a sender of the turn-back measurement packet, the time memory unit stores, according to time-keeping of the internal clock, a received time of the turn-back measurement packet and a sending time of the returned turn-back measurement packet, the measurement result notifying packet receiving unit receives a turn-back measurement result notifying packet showing, according to time-keeping of the reference clock of the management apparatus, a sending time of the turn-back measurement packet at the management apparatus and a received time of the returned turn-back measurement packet at the management apparatus, and the time correction value calculating unit calculates the time correction value using the sending time of the turn-back measurement packet at the management apparatus and the received time of the returned turn-back measurement packet at the management apparatus shown in the turn-back measurement result notifying packet and the received time of the turn-back measurement packet and the sending time of the returned turn-back measurement packet stored in the time memory unit.

The time correction value calculating unit sets as the time correction value, a differential value obtained by subtracting an average value of the received time of the turn-back measurement packet and the sending time of the returned turn-back measurement packet stored by the time memory unit from an average value of the sending time of the turn-back measurement packet at the management apparatus and the received time of the returned turn-back measurement packet at the management apparatus shown in the measurement result notifying packet.

The time memory unit according to the time-keeping of the internal clock, stores the pair of the sending time of the first measurement packet and the received time of the second measurement packet and the pair of the received time of the first measurement packet and the sending time of the second measurement packet, the measurement result notifying packet receiving unit receives a measurement result notifying packet showing either of a pair of a sending time of the first measurement packet at an other apparatus and a received time of the second measurement packet at the other apparatus and a pair of a received time of the first measurement packet at the other apparatus and a sending time of the second measurement packet at the other apparatus, and the time correction value calculating unit:

calculates the time correction value using the pair of the sending time and the received time at the other apparatus shown in the measurement result notifying packet received by the measurement result notifying packet receiving unit and either pair of the sending time and the received time out of the pairs stored by the time memory unit; and calculates a sending time after correction and a received time after correction by applying the time correction value calculated to the pair of the sending time and the received time which is not used for calculating the time correction value out of the pairs of the sending time and the received time stored by the time memory unit.

The measurement result notifying packet receiving unit receives a measurement result notifying packet showing a pair of a sending time of the first measurement packet and a received time of the second measurement packet at the apparatus being the sender in the one direction, from the apparatus, the time correction value calculating unit calculates the time correction value using the sending time of the first measurement packet and the received time of the second measurement packet shown in the measurement result notifying packet received by the measurement result notifying packet receiving unit and the pair of the received time of the first measurement packet and the sending time of the second measurement packet stored by the time memory unit, and calculates a sending time after correction of the first measurement packet and a received time after correction of the second measurement packet by applying the time correction value calculated to the sending time of the first measurement packet and the received time of the second measurement packet stored by the time memory unit, and the communication apparatus further comprises:

a measurement result notifying packet updating unit storing a pair of the sending time after correction of the first measurement packet and the received time after correction of the second measurement packet calculated by the time correction value calculating unit in the measurement result notifying packet by replacing the pair of the sending time of the first measurement packet and the received time of the second measurement packet shown in the measurement result notifying packet received by the measurement result notifying packet receiving unit; and a measurement result notifying packet sending unit sending the measurement result notifying packet in which the pair of the sending time after correction of the first measurement packet and the received time after correction of the second measurement packet is stored by the measurement result notifying packet updating unit, to an apparatus being a receiver in the one direction.

In each communication apparatus, the measurement result notifying packet receiving unit receives a measurement result notifying packet showing a pair of a received time of the first measurement packet and a sending time of the second measurement packet at the apparatus being the sender in the other direction, the time correction value calculating unit calculates the time correction value using the received time of the first measurement packet and the sending time of the second measurement packet shown in the measurement result notifying packet received by the measurement result notifying packet receiving unit and the pair of the sending time of the first measurement packet and the received time of the second measurement packet stored by the time memory unit, and calculates a received time after correction of the first measurement packet and a sending time after correction of the second measurement packet by applying the time correction value calculated to the received time of the first measurement packet and the sending time of the second measurement packet stored by the time memory unit, and the communication apparatus further comprises:

a measurement result notifying packet updating unit storing a pair of the received time after correction of the first measurement packet and the sending time after correction of the second measurement packet calculated by the time correction value calculating unit in the measurement result notifying packet by replacing the pair of the received time of the first measurement packet and the sending time of the second measurement packet shown in the measurement result notifying packet received by the measurement result notifying packet receiving unit; and a measurement result notifying packet sending unit sending the measurement result notifying packet in which the pair of the received time after correction of the first measurement packet and the sending time after correction of the second measurement packet is stored by the measurement result notifying packet updating unit, to an apparatus being a receiver in the other direction.

The time correction value calculating unit sets as the time correction value, a differential value obtained by subtracting an average value of the received time of the first measurement packet and the sending time of the second measurement packet stored by the time memory unit from an average value of the sending time of the first measurement packet and the received time of the second measurement packet shown in the measurement result notifying packet.

Each communication apparatus sets as the time correction value, a differential value obtained by subtracting an average value of the sending time of the first measurement packet and the received time of the second measurement packet stored by the time memory unit from an average value of the received time of the first measurement packet and the sending time of the second measurement packet shown in the measurement result notifying packet.

According to the present invention, a computer program makes a management apparatus, having a reference clock, forming a circulation route of a packet with a plurality of communication apparatuses, and circulating a packet in two directions on the circulation route according to a packet transferring order prescribed for each of the apparatus, execute:

a first measurement packet sending process sending a first measurement packet to a communication apparatus being a receiver in one direction according to the packet transferring order;

a first measurement packet receiving process receiving the first measurement packet which has been circulated among the plurality of communication apparatuses in the one direction;

a second measurement packet sending process sending a second measurement packet to a communication apparatus being a receiver in an other direction according to the packet transferring order;

a second measurement packet receiving process receiving the second measurement packet which has been circulated among the plurality of communication apparatuses in the other direction;

a time storing process, according to time-keeping of the reference clock, storing at least either of a pair of a sending time of the first measurement packet and a received time of the second measurement packet and a pair of a received time of the first measurement packet and a sending time of the second measurement packet;

a measurement result notifying packet generating process generating a measurement result notifying packet showing at least either of the pair of the sending time of the first measurement packet and the received time of the second measurement packet and the pair of the received time of the first measurement packet and the sending time of the second measurement packet stored by the time storing process; and a measurement result notifying packet sending process sending the measurement result notifying packet generated by the measurement result notifying packet generating process to a communication apparatus being a receiver in either direction.

According to the present invention, a computer program makes a communication apparatus, having an internal clock, forming a circulation route of a packet with a management apparatus having a reference clock and at least one other communication apparatuses, and circulating a packet in two directions on the circulation route according to a packet transferring order prescribed for each of the apparatuses, execute:

a first measurement packet receiving process receiving a first measurement packet which has been sent by the management apparatus in one direction, from an apparatus being a sender in the one direction according to the packet transferring order;

a first measurement packet sending process sending the first measurement packet received by the first measurement packet receiving process to an apparatus being a receiver in the one direction;

a second measurement packet receiving process receiving a second measurement packet which has been sent by the management apparatus in an other direction, from an apparatus being a sender in the other direction according to the packet transferring order;

a second measurement packet sending process sending the second measurement packet received by the second measurement packet receiving process to an apparatus being a receiver in the other direction according to the packet transferring order;

a time storing process, according to time-keeping of the internal clock, storing at least either of a pair of a received time of the first measurement packet and a sending time of the second measurement packet and a pair of a sending time of the first measurement packet and a received time of the second measurement packet;

a measurement result notifying packet receiving process receiving a measurement result notifying packet showing, according to time-keeping of the reference clock of the management apparatus, at least either of a pair of a sending time of the first measurement packet at the management apparatus and a received time of the second measurement packet which has been circulated through the circulation route at the management apparatus and a pair of a received time of the first measurement packet which has been circulated through the circulation route at the management apparatus and a sending time of the second measurement packet at the management apparatus;

a time correction value calculating process calculating a time correction value using at least either of the pair of the sending time of the first measurement packet and the received time of the second measurement packet at the management apparatus and the pair of the received time of the first measurement packet at the management apparatus and the sending time of the second measurement packet at the management apparatus shown in the measurement result notifying packet received, and at least either of the pair of the received time of the first measurement packet and the sending time of the second measurement packet and the pair of the sending time of the first measurement packet and the received time of the second measurement packet stored by the time storing process; and a clock controlling process correcting a time of the internal clock using the time correction value calculated by the time correction value calculating process.

Effect of the Invention

According to the present invention, the master node apparatus circulates a measurement packet among a plurality of slave node apparatuses in two directions, and the time correction value is calculated using a sending/received time in the two directions measured by the master node apparatus and each slave node apparatus. Therefore, time synchronization with a high precision can be implemented with less number of procedures excluding an influence of delay generated on the transmission route.

PREFERRED EMBODIMENTS FOR CARRYING OUT THE INVENTION

Embodiment 1

FIGS. 1 and 2 are diagrams showing configuration examples of a time synchronizing apparatus 100 according to the present embodiment.

In the present embodiment, plural time synchronizing apparatuses 100 are connected as shown in FIG. 3 to form a ring type network.

Namely, a communication system discussed in the present embodiment is the ring type network in which a master node apparatus being a management apparatus and plural slave node apparatuses being communication apparatuses are connected as a ring as shown in FIG. 3. The master node apparatus and the slave node apparatuses in FIG. 3 are the time synchronizing apparatuses 100, respectively.

Packets sent by each node apparatus are sent in two directions of forward direction and backward direction. Namely, in the present embodiment, packets are circulated among the plural node apparatuses in the forward direction and the backward direction.

Here, an example of double ring configuration, in which a forward direction transmission channel and a backward direction transmission channel are respectively connected as rings, is shown; however, the transmission channel does not always need to be double. Here, the forward direction transmission channel and the backward direction transmission channel are, for example, a sending signal line and a receiving signal line on the same cable. Further, even if the transmission channel is made double, the forward direction transmission channel and the backward direction transmission channel are not fixed; the forward direction transmission channel can be a transmission channel in the backward direction, and further, the backward direction transmission channel can be a transmission channel in the forward direction.

Further, for each node apparatus, a packet transferring order is defined. A direction to transfer a packet according to the packet transferring order is forward direction, and a direction to transfer a packet inversely to the packet transferring order is backward direction.

In the example of FIG. 3, a packet transferring route of a master node apparatus—a slave node apparatus A—a slave node apparatus B—the master node apparatus is the forward direction, and a packet transferring route of the master node apparatus—the slave node apparatus B—the slave node apparatus A—the master node apparatus is the backward direction.

Further, a ring type network shown in FIG. 3 is also referred to as a circulation route.

FIG. 1 is a diagram showing a configuration example of the time synchronizing apparatus 100 as the master node apparatus, and FIG. 2 is a diagram showing a configuration example of the time synchronizing apparatus 100 as the slave node apparatus.

Either when operated as the master node apparatus or when as the slave node apparatus, the configuration itself of the time synchronizing apparatus 100 is the same; however, tasks of each configurational element and processing contents are different respectively for the master node apparatus and the slave node apparatus, so that two cases are shown as different drawings for convenience of the explanation.

However, either when operated as the master node apparatus or when as the slave node apparatus, the configuration itself of the time synchronizing apparatus 100 is the same, so that the same time synchronizing apparatus 100 can be either the master node apparatus or the slave node apparatus.

Hereinafter, for each configurational element, after explaining tasks and processing contents which are common to the master node apparatus and the slave node apparatus, tasks and processing contents which are specific to the master node apparatus and tasks and processing contents which are specific to the slave node apparatus will be explained.

Here, in the following, the master node apparatus is called simply as "a master" or "a master node", and the slave node apparatus is called simply as "a slave" or "a slave node".

In FIGS. 1 and 2, a time synchronization controlling unit 1 is means to control time synchronizing procedure, and is a circuit such as, for example, a CPU (Central Processing Unit), etc.

A received data processing unit 2 is means to carry out a processing for received data from a forward direction transmission channel and a backward direction transmission channel, and is a circuit such as, for example, a CPU or an ASIC (Application Specific Integrated Circuit), etc.

A sending data generating unit 3 is means to generate a sending data to be sent from the forward direction transmission channel and the backward direction transmission channel, and is a circuit such as, for example, the CPU or the ASIC, etc.

An internal clock 4 is a circuit including means to measure time passage such as an internal oscillator, etc.

A clock controlling unit 5 is connected to the internal clock 4, a forward direction transmission channel receiving unit 6, a forward direction transmission channel sending unit 8, a backward direction transmission channel receiving unit 9, and a backward direction transmission channel sending unit 11, respectively, is means to control time stamp obtainment of data transmission/receipt, and is a circuit such as ASIC, etc.

The forward direction transmission channel receiving unit 6 is means to carry out data receipt from the forward direction transmission channel.

The forward direction transmission channel repeater 7 is means to buffer the data received from the forward direction transmission channel to send at a high speed.

The forward direction transmission channel sending unit 8 is means to carry out transmission to the forward direction transmission channel.

The backward direction transmission channel receiving unit 9 is means to carry out data receipt from the backward direction transmission channel.

A backward direction transmission channel repeater 10 is means to buffer the data received from the backward direction transmission channel to send at a high speed.

The backward direction transmission channel sending unit 11 is means to carry out transmission to the backward direction transmission channel.

Here, as discussed above, the forward direction transmission channel can be a transmission channel in the backward direction, and also the backward direction transmission channel can be a transmission channel in the forward direction, and thus the forward direction transmission channel receiving unit 6, the forward direction transmission channel repeater 7, and the forward direction transmission channel sending unit 8 can carry out receipt from the backward direction and transmission to the backward direction if the forward direction transmission channel is changed to the transmission channel in the backward direction. Similarly, the backward direction transmission channel receiving unit 9, the backward direction transmission channel repeater 10, and the backward direction transmission channel sending unit 11 can carry out receipt from the forward direction and transmission to the forward direction if the backward direction transmission channel is changed to the transmission channel in the forward direction.

In the present embodiment, the master node, as will be discussed in detail later, sends the first measurement packet to the slave node being a receiver in one direction according to the packet transferring order, and receives the first measurement packet which has been circulated among plural slave nodes in the one direction. The sending direction of the first measurement packet can be the forward direction or the backward direction.

Further, the master node sends the second measurement packet to the slave node being a receiver in the other direction according to the packet transferring order, and receives the second measurement packet which has been circulated among plural slave nodes in the other direction. The sending direction of the second measurement packet is an opposite direction of the sending direction of the first measurement packet.

Further, the master node, according to the timekeeping of the internal clock (reference clock), stores at least either of a pair of a sending time of the first measurement packet and a received time of the second measurement packet and a pair of a received time of the first measurement packet and a sending time of the second measurement packet, and generates a measurement result notifying packet showing at least either of the pair of the sending time of the first measurement packet and the received time of the second measurement packet and the pair of the received time of the first measurement packet and the sending time of the second measurement packet.

Then, the master node sends the generated measurement result notifying packet to the slave node being the receiver in either of the forward direction and the backward direction.

When operated as the master node performing the above processing, the configurational elements of the time synchronizing apparatus 100 mainly have the following tasks as shown in FIG. 1.

The internal clock 4 functions as a reference clock which is a reference of time synchronization among plural node apparatuses included in the ring type network.

The forward direction transmission channel sending unit 8 and the backward direction transmission channel sending unit 11 respectively send the first measurement packet or the second measurement packet to the slave nodes (communication apparatuses) being receivers in respective direction according to the packet transferring order.

Further, the forward direction transmission channel sending unit 8 and the backward direction transmission channel sending unit 11 can send the measurement result notifying packet to the slave nodes being receivers in respective direction.

The forward direction transmission channel sending unit 8 and the backward direction transmission channel sending unit 11 are examples of a first measurement packet sending unit or a second measurement packet sending unit, and a measurement result notifying packet sending unit.

The forward direction transmission channel receiving unit 6 and the backward direction transmission channel receiving unit 9 respectively receive the first measurement packet or the second measurement packet which has been circulated among plural slave nodes in the forward direction or the backward direction.

Further, the forward direction transmission channel receiving unit 6 and the backward direction transmission channel receiving unit 9 can receive the measurement result notifying packet from the slave nodes being senders in respective direction.

The forward direction transmission channel receiving unit 6 and the backward direction transmission channel receiving unit 9 are examples of a first measurement packet receiving unit or a second measurement packet receiving unit.

The time synchronization controlling unit 1, according to the timekeeping of the internal clock 4 (reference clock), stores at least either of a pair of the sending time of the first measurement packet and the received time of the second measurement packet and the pair of the received time of the first measurement packet and a sending time of the second measurement packet.

The time synchronization controlling unit 1 is an example of a time memory unit.

The sending data generating unit 3 generates a measurement result notifying packet showing at least either of the pair of the sending time of the first measurement packet and the received time of the second measurement packet and the pair of the received time of the first measurement packet and the sending time of the second measurement packet stored in the time synchronization controlling unit 1.

The sending data generating unit 3 is an example of a measurement result notifying packet generating unit.

Further, in the present embodiment, as will be discussed in detail later, each slave node receives the first measurement packet from the node apparatus being the sender in one direction, sends the received first measurement packet to the node apparatus being the receiver in the one direction, and further, receives the second measurement packet from the node apparatus being the sender in the other direction, sends the received second measurement packet to the node apparatus being the receiver in the other direction.

Further, each slave node, according to the timekeeping of the internal clock, stores at least either of the pair of the sending time of the first measurement packet and the received time of the second measurement packet and the pair of the received time of the first measurement packet and the sending time of the second measurement packet.

Moreover, each slave node receives the measurement result notifying packet from the node apparatus being the sender in either direction, calculates a time correction value using at least either of the pair of the sending time of the first measurement packet and the received time of the second measurement packet and the pair of the received time of the first measurement packet and the sending time of the second measurement packet shown in the received measurement result notifying packet and at least either of the pair of the sending time of the first measurement packet and the received time of the second measurement packet stored and the pair of the received time of the first measurement packet and the sending time of the second measurement packet stored, and corrects a time of the internal clock using the calculated time correction value.

When operated as the slave node performing the above processing, the configurational elements of the time synchronizing apparatus 100 mainly have the following tasks as shown in FIG. 2.

The forward direction transmission channel receiving unit 6 and the backward direction transmission channel receiving unit 9 respectively receive the first measurement packet or the second measurement packet from the slave nodes being senders in respective direction according to the packet transferring order.

Further, the forward direction transmission channel receiving unit 6 and the backward direction transmission channel receiving unit 9 can receive the measurement result notifying packet transmitted by the master node from the slave nodes being senders in respective direction.

The forward direction transmission channel receiving unit 6 and the backward direction transmission channel receiving unit 9 are examples of a first measurement packet receiving unit or a second measurement packet receiving unit, and a measurement result notifying packet receiving unit.

The forward direction transmission channel sending unit 8 and the backward direction transmission channel sending unit 11 respectively send the first measurement packet or the second measurement packet to the slave nodes being receivers in respective direction according to the packet transferring order.

Further, the forward direction transmission channel sending unit 8 and the backward direction transmission channel sending unit 11 can send the measurement result notifying packet to the slave nodes being receivers in respective direction.

The forward direction transmission channel sending unit 8 and the backward direction transmission channel sending unit 11 are examples of a first measurement packet sending unit or a second measurement packet sending unit.

The time synchronization controlling unit 1, according to the timekeeping of the internal clock 4, stores at least either of a pair of the received time of the first measurement packet and the sending time of the second measurement packet and the pair of the sending time of the first measurement packet and a received time of the second measurement packet.

Further, the time synchronization controlling unit 1 calculates a time correction value using at least either of the pair of the sending time of the first measurement packet and the received time of the second measurement packet at the master node and the pair of the received time of the first measurement packet and the sending time of the second measurement packet at the master node shown in the received measurement result notifying packet; and at least either of the pair of the received time of the first measurement packet and the sending time of the second measurement packet stored and the pair of the sending time of the first measurement packet and the received time of the second measurement packet and stored.

Concretely, the time synchronization controlling unit 1 obtains a differential value by subtracting an average value of the sending time and the received time of the stored pair from an average value of the sending time and the received time of the pair shown in the measurement result notifying packet and sets the differential value as the time correction value.

The time synchronization controlling unit 1 is an example of a time memory unit and a time correction value calculating unit.

The clock controlling unit 5 corrects a time of the internal clock using the time correction value calculated by the time synchronization controlling unit 1.

Next, the operation will be explained.

First, a general operation in the ring configuration will be explained.

Time synchronizing apparatuses are connected in the ring type as shown in FIG. 3 as has been discussed.

One node of the nodes on the same ring is a master, which is a reference of time synchronization within this ring. The other nodes are slaves.

On performing time synchronization, the master sends packets in the forward and the backward directions, respectively.

Each slave calculates the correction value of the time from a sending time and a received time of these packets at the own node and a sending time and a received time of packets at the master.

As shown in FIG. 3, an example in which three time synchronizing apparatuses are connected will be explained according to the processing order.

In order to time sequentially show the packet exchange among the master, the slave A, and the slave B in FIG. 3, FIG. 4 is time sequence diagram showing the ring structure broken at the master to spread in the horizontal direction so that the vertical direction is a time sequence. Accordingly, "master" shown at the right and the left ends in FIG. 4 are the same node.

FIG. 4 shows an example in which the master sends the first measurement packet in the backward direction, and sends the second measurement packet in the forward direction.

FIG. 5 shows an example in which although the master sends the first measurement packet in the backward direction, and sends the second measurement packet in the forward direction, the time is obtained differently at the master and the slaves from the case of FIG. 4.

FIG. 6 is an example in which the master sends the first measurement packet in the forward direction, and sends the second measurement packet in the backward direction.

FIG. 7 shows an example in which although the master sends the first measurement packet in the forward direction, and sends the second measurement packet in the backward direction, the time is obtained differently at the master and the slaves from the case of FIG. 6.

Here, it is assumed that the measurement result notifying packet is sent in the forward direction in FIGS. 4 through 7; however, the measurement result notifying packet can be sent in either direction, and the measurement result notifying packet can be sent in the backward direction in FIGS. 4 through 7.

Here, in the following, an example of FIG. 4 will be explained first, and then examples of FIG. 5 through 7 will be explained.

The process of time synchronization is carried out at a fixed time interval by, for example, a timer of the master.

When the process of time synchronization starts, the master first sends the first measurement packet in the backward direction (backward direction measurement packet, hereinafter) as shown in FIG. 4.

At the slave, when the backward direction measurement packet is received, the packet is sent after repeating to the next node via a repeater at a high speed, and the data is read as well. Further, at the time of sending to the next node, the sending time is obtained.

In FIG. 4, a packet sending time $T_{21}$ is obtained in a slave B, and a packet sending time $T_{11}$ is obtained at a slave A. Here, in the figures, if a time obtained by the master and each slave is a sending time of the packet, (S) is written next to $T_{xx}$, and if it is a received time of the packet, (R) is written.

Next, on receiving a backward direction measurement packet which has been circulated through the ring, the master obtains the received time $T_{01}$.

Next, on sending the second measurement packet (forward direction measurement packet, hereinafter) in the forward direction, the master also obtains the sending time $T_{02}$.

On receiving the forward direction measurement packet, each slave passes the packet at a high speed to the next node via the repeater and as well reads the data.

Further, each slave obtains the received time of the forward direction measurement packet.

In FIG. 3, a packet received time $T_{12}$ is obtained at the slave A, and a packet received time $T_{22}$ is obtained at the slave B.

Next, the master stores the values of $T_{01}$ and $T_{02}$ obtained by the own node in the measurement result notifying packet, sends and notifies to each slave.

Each slave calculates a correction value applied to the time shown by each internal clock based on the values of $T_{01}$ and $T_{02}$ received in the measurement result notifying packet and the sending time and the received time obtained by the own node.

Up to the above, the sending time and the received time obtained by each node of the master, the slave A, and the slave B are values obtained according to each internal clock, and each internal clock has a difference with the absolute time and each time shown by each internal clocks is different with each other because of the influence of the precision of its internal oscillator, etc.

Here, an offset of the internal clock of each slave with reference to the internal clock of the master, namely, the correction value of the internal clock at each slave is calculated.

Now, when it is assumed that total delay including transmission delay of the backward direction measurement packet and the forward direction measurement packet between the master/slave in the same route and the processing delay on a relay node, etc. is constant regardless of the sending direction of the packets, in FIG. 4, an average value of $T_{01}$ and $T_{02}$ obtained by the master, an average value of $T_{11}$ and $T_{12}$ obtained by the slave A, and an average value of $T_{21}$ and $T_{22}$ obtained by the slave B can be respectively deemed as times indicated by respective internal clock at the same time.

Consequently, a difference between the average of times obtained at the master and the average at each slave becomes the correction value for adjusting each internal clock of each slave to the internal clock of the master (reference clock).

In FIG. 4, a correction value $\Delta T1$ of the internal clock of the slave A is:

$$\Delta T1 = \{(T_{01}+T_{02})-(T_{11}+T_{12})\}/2 \quad \text{expression 1}$$

Further, the correction value $\Delta T2$ of the internal clock of the slave B is:

$$\Delta T2 = \{(T_{01}+T_{02})-(T_{21}+T_{22})\}/2 \quad \text{expression 2}$$

After obtaining these correction values, by adjusting the time of the internal clock using the calculated correction value at an arbitrary timing, the time synchronization process is completed.

Next, a detail of the process at the master and the slaves will be discussed.

First, the process at the master is shown.

FIG. 8 is an example of processing flow at the master.

The master starts these series of time synchronization process with triggers of periodic operation by the timer inside of the master, the operation by the operator, various event that occurs by software and hardware inside of the master, and so on. On starting the time synchronization process, the master first sends the backward direction measurement packet (S1).

An example of a format of the backward direction measurement packet is shown in FIG. 9.

In FIG. 9, a sender address and a receiver address are addresses to identify each node in the ring type network.

In the backward direction measurement packet, since the receiver is all nodes, a broadcast address is specified as the receiver address.

For the broadcast address, for example, when the address length is one byte, FF in hexadecimal number, etc. is previously reserved.

A packet type shows a type of packet according to its value. In this embodiment, values are reserved for three types of the backward direction measurement packet, the forward direction measurement packet, and the measurement result notifying packets.

A sequence number is used for relating a series of packets.

In FIG. 4, by storing the same numbers in the sequence number field of a series of the forward direction measurement packet, the backward direction measurement packet, and the measurement result notifying packet, the receiver side relates the series of packets with each other. The sequence number can be assigned freely as long as the series of packets can be identified; for example, a counter is incremented at every sending of the backward direction measurement packet by the master, and the same value is stored in the related forward direction measurement packet and measurement result notifying packet.

As for the operation inside of the master for sending the backward direction measurement packet, since the forward direction transmission channel transmits packets in the forward direction, and the backward direction transmission channel transmits packets in the backward direction, first, the time synchronization controlling unit 1 issues a command to send the backward direction measurement packet to the sending data generating unit 3, the sending data generating unit 3 generates the backward direction measurement packet and sends to the backward direction transmission channel sending unit 11, and the backward direction transmission channel sending unit 11 sends out the backward direction measurement packet to the backward direction transmission channel.

After sending the backward direction measurement packet, the master, next, receives the same backward direction measurement packet which has been circulated round the ring.

At this time, the received time is obtained and maintained as a received time of the backward direction measurement packet (S2).

As for process inside of the master, first the backward direction transmission channel receiving unit 9 receives the backward direction measurement packet.

At this time, by a timing signal from the backward direction transmission channel receiving unit 9, the clock controlling unit 5 obtains the time of the internal clock 4.

At the same time, the data of the backward direction measurement packet received at the backward direction transmission channel receiving unit 9 is transmitted to the received data processing unit 2, the type of packet is determined at the received data processing unit 2, and an event of receiving the backward direction measurement packet is notified to the time synchronization controlling unit 1.

On receiving the event of receiving the backward direction measurement packet, the time synchronization controlling unit 1 obtains the time which has been obtained at a timing of receiving packet by the backward direction transmission channel receiving unit 9 from the clock controlling unit 5, relates the time to the sequence number as the received time of the backward direction measurement packet and stores it.

Next, the master sends the forward direction measurement packet and obtains the sending time (S3).

Although a format of the forward direction measurement packet is the same as the one of the backward direction measurement packet shown in FIG. 9, a value of the type of packet is different.

As for the internal process of the master, first, the time synchronization controlling unit 1 issues a command to send the forward direction measurement packet to the sending data generating unit 3, the sending data generating unit 3 generates the forward direction measurement packet and sends to the forward direction transmission channel sending unit 8. The forward direction transmission channel sending unit 8 sends out the forward direction measurement packet to the forward direction transmission channel, and sends a timing signal to the clock controlling unit 5 at a timing of sending.

The clock controlling unit 5, on receiving the timing signal, obtains a time shown by the internal clock 4.

On the other hand, when the sending process is completed in the forward direction transmission channel sending unit 8, and the control returns to the time synchronization controlling unit 1 via the sending data generating unit 3, the time synchronization controlling unit 1 obtains the time obtained at the timing of sending the forward direction measurement packet by the forward direction transmission channel sending unit 8 from the clock controlling unit 5, and stores the time as the sending time of the forward direction measurement packet by relating to the sequence number.

Next, the master receives the forward direction measurement packet which has been circulated round the ring (S4).

As for the process inside of the master, the forward direction transmission channel receiving unit 6 receives the forward direction measurement packet from the forward direction transmission channel, the type of packet is determined by the received data processing unit 2 and the time synchronization controlling unit 1 is notified of an event of receiving the forward direction measurement packet.

The master does not have the process to perform on the receipt of the forward direction measurement packet; however, it is also possible to start the process of sending the measurement result notifying packet with a trigger of receiving the forward direction measurement packet.

Next, the master sends the measurement result notifying packet, and notifies the received time of the backward direction measurement packet and the sending time of the forward direction measurement packet measured by the own node to each slave (S5).

As for the internal process of the master, the time synchronization controlling unit 1 notifies the received time of the backward direction measurement packet and the sending time of the forward direction measurement packet stored inside to the sending data generating unit 3 with a command to send the measurement result notifying packet.

The sending data generating unit 3 generates the measurement result notifying packet storing the received time of the backward direction measurement packet and the sending time of the forward direction measurement packet.

An example of a format of the measurement result notifying packet is shown in FIG. 10.

The packet generated at the sending data generating unit 3 is sent from the forward direction transmission channel sending unit 8 to the forward direction transmission channel.

Next, the master receives the measurement result notifying packet which has been circulated round the ring (S6).

As the internal process of the master, the forward direction transmission channel receiving unit 6 receives the packet, the type of packet is determined by the received data processing unit 2, and an event of receiving the measurement result notifying packet is notified to the time synchronization controlling unit 1.

The processing order shown in FIG. 8 does not have to be followed, the order of processing can be freely exchanged as long as the following two conditions are met:

(1) Receipt of each packet occurs after sending the same packet; namely, in FIG. 8, S2 occurs after S1, S4 occurs after S3, and S6 occurs after S5.

(2) Transmission of the measurement result notifying packet is carries out after the received time of the backward direction measurement packet is obtained, and also after the sending time of the forward direction measurement packet is obtained. Namely, in FIG. 8, S5 is carried out after S2 and S3.

The process at the slave will be shown in the following.

FIG. 11 is an example of processing flow at the slave.

First, the slave receives the backward direction measurement packet, sends the backward direction measurement packet to the next node, and as well obtains the sending time (S7).

The following processing is done inside of the slave.

First, the backward direction transmission channel receiving unit 9 receives the backward direction measurement packet.

The received packet is transmitted to the backward direction transmission channel repeater 10 from the backward direction transmission channel receiving unit 9, and as well imported to the received data processing unit 2.

The packet sent to the backward direction transmission channel repeater 10 is buffered, sent to the backward direction transmission channel sending unit 11 as it is without changing, or sent to the backward direction transmission channel sending unit 11 after changing a header and a trailer of the data link layer.

The backward direction transmission channel sending unit 11 sends the packet received from the backward direction transmission channel repeater 10 to the backward direction transmission channel, and as well sends a signal of sending timing to the clock controlling unit 5.

On receiving the timing signal, the clock controlling unit 5 obtains the time shown by the internal clock 4 and stores the time.

On the other hand, the received data processing unit 2 which imports the data of the backward direction measurement packet from the backward direction transmission channel receiving unit 9 identifies the type of packet and notifies an event of receiving the backward direction measurement packet to the time synchronization controlling unit 1.

The time synchronization controlling unit 1 which has received the event obtains the sending time obtained at a timing of sending of the backward direction measurement packet from the backward direction transmission channel sending unit 11 from the clock controlling unit 5 and stores the time with relating to the sequence number of the backward direction measurement packet.

Next, the slave receives the forward direction measurement packet, obtains the received time, and as well sends out to the next node (S8).

The following processing is done inside of the slave.

First, the forward direction transmission channel receiving unit 6 receives the forward direction measurement packet.

At this time, the forward direction transmission channel receiving unit 6 sends a timing signal of receiving the packet to the clock controlling unit 5.

The clock controlling unit 5 which has received the timing signal obtains and stores the time shown by the internal clock 4.

On the other hand, the received packet is transmitted to the forward direction transmission channel repeater 7 from the forward direction transmission channel receiving unit 6 and as well imported to the received data processing unit 2.

The packet sent to the forward direction transmission channel repeater 7 is buffered, and sent to the forward direction transmission channel sending unit 8 as it is without changing, or sent to the forward direction transmission channel sending unit 8 with changing a header and a trailer of the data link layer.

The forward direction transmission channel sending unit 8 sends the packet received from the forward direction transmission channel repeater 7 to the forward direction transmission channel.

Further, on the other hand, the received data processing unit 2 which has imported the data of the forward direction measurement packet identifies the type of packet and notifies an event of receiving the forward direction measurement packet to the time synchronization controlling unit 1.

The time synchronization controlling unit 1, which has received the event obtains the received time that has been obtained at the timing of receiving the forward direction measurement packet by the forward direction transmission channel receiving unit 6 from the clock controlling unit 5 and stores the time by relating to the sequence number of the forward direction measurement packet.

Next, the slave receives the measurement result notifying packet (S9).

The following operation is done inside of the slave.

First, the forward direction transmission channel receiving unit 6 receives the measurement result notifying packet.

The received packet is transmitted to the forward direction transmission channel repeater 7 from the forward direction transmission channel receiving unit 6 and as well imported to the received data processing unit 2.

The packet sent to the forward direction transmission channel repeater 7 is buffered, and sent to the forward direction transmission channel sending unit 8 as it is without changing, or sent to the forward direction transmission channel sending unit 8 with changing a header and a trailer of the data link layer.

The forward direction transmission channel sending unit 8 sends the packet received from the forward direction transmission channel repeater 7 to the forward direction transmission channel.

Further, on the other hand, the received data processing unit 2 which has imported the data of the measurement result notifying packet from the forward direction transmission channel receiving unit 6 identifies the type of packet, and notifies an event of receiving the measurement result notifying packet to the time synchronization controlling unit 1.

Next, the slave calculates a correction value applied to the time of the internal clock of the own node (S10).

Inside of the slave, the time synchronization controlling unit 1 which has received the event of receiving the measurement result notifying packet extracts the received time of the backward direction measurement packet and the sending time of forward direction measurement packet measured at the master from the data of the measurement result notifying packet obtained on the event notification, and calculates a correction value of the time by combining with the sending time of the backward direction measurement packet and the received time of the forward direction measurement packet measured at the slave.

At this time, the received time data and the sending time data are related with each other using the sequence number of each packet.

The calculation expression of the correction value of the time has been shown in case of FIG. 4; the following shows a more generalized form.

Now, if it is assumed that the received time of the backward direction measurement packet measured at the master is $T_{MR}$, the sending time of the forward direction measurement packet measured at the master is $T_{MS}$, the sending time of the backward direction measurement packet measured at the slave is $T_{SS}$, and the received time of the forward direction measurement packet measured at the slave is $T_{SR}$, the correction value $\Delta T$ of the time at the slave is $$\Delta T = \{(T_{MR}+T_{MS})-(T_{SS}+T_{SR})\}/2.$$

Next, the slave adjusts the time of the internal clock using the calculated time correction value (S11).

In the internal process of the slave, the time synchronization controlling unit 1 issues a command to the clock controlling unit 5 to adjust the internal clock using the correction value $\Delta T$ calculated at S10.

On receiving the command to adjust the internal clock, the clock controlling unit 5 carries out a process to add the correction value $\Delta T$ to the current time of the internal clock 4.

Up to the above process, the time synchronizing process to synchronize the internal clock of the slave to the internal clock of the master is completed.

The processing flow of the slave shown in FIG. 11 describes processes to be carried out in order when the master carries out processes in order of the processing flow of FIG. 8; however, the master can exchange the order of the processes as discussed above.

In FIG. 8, first, the backward direction measurement packet is sent, and then the forward direction measurement packet is sent; this can be exchanged; for example, the forward direction measurement packet can be sent first, and then the backward direction measurement packet can be sent.

FIG. 12 shows the processing flow, according to which the slave side can deal with a case whichever order the master carries out the processes.

First, the slave receives the packet sent from the master (S12).

At this time, if it is the backward direction measurement packet, the packet is received by the backward direction transmission channel receiving unit 9; if it is the forward direction measurement packet or the measurement result notifying packet, the packet is received by the forward direction transmission channel receiving unit 6.

Further, at this time, the receiving unit sends a receiving timing signal to the clock controlling unit 5, and the clock controlling unit 5 stores the time shown by the internal clock 4 at the timing signal as the received time of the forward direction transmission channel packet or the received time of the backward direction transmission channel packet, respectively.

On the other hand, the packet received at the forward direction transmission channel receiving unit 6 or the backward direction transmission channel receiving unit 9 is sent to the next node from the forward direction transmission channel sending unit 8 or the backward direction transmission channel sending unit 11 via the forward direction transmission channel repeater 7 or the backward direction transmission channel repeater 10, respectively.

At this time, the sending time at the time of sending is obtained by the clock controlling unit 5 at the timing signal from each sending unit, and stored as the sending time of the forward direction transmission channel or the sending time of the backward direction transmission channel.

Further, on the other hand, the data of the packet received at the forward direction transmission channel receiving unit 6 or the backward direction transmission channel receiving unit 9 is also imported to the received data processing unit 2, and events of receiving the backward direction measurement packet, the forward direction measurement packet, or the measurement result notifying packet are notified to the time synchronization controlling unit 1.

After the process of receiving the packets is finished, the slave next determines the type of packet (S13).

Next, if the type of the received packet type is the backward direction measurement packet, in the slave, the time synchronization controlling unit 1 obtains from the clock controlling unit 5 time information which has been stored since the timing signal from the backward direction transmission channel sending unit 11 and stores as the sending time of the backward direction measurement packet (S14).

Further, if the packet type determined at S13 is the forward direction measurement packet, the time synchronization controlling unit 1 obtains from the clock controlling unit 5 time information which has been stored since the timing signal from the forward direction transmission channel receiving unit 6 and stores as the received time of the forward direction measurement packet (S15). Further, if the packet type determined at S13 is the measurement result notifying packet, first the time correction value is calculated (S16). Next, the time adjustment is done using the time correction value calculated at S16 (S17).

Here, as for the time measuring point at the master, the received time of the backward direction measurement packet and the sending time of the forward direction measurement packet are obtained, and as for the time measuring point at the slave, the sending time of the backward direction measurement packet and the received time of the forward direction measurement packet are obtained. However, it is also possible to obtain the sending time of the backward direction measurement packet and the received time of the forward direction measurement packet at the master, or obtain the received time of the backward direction measurement packet and the sending time of the forward direction measurement packet at the slave. Namely, the time measuring point at each node of the master and the slaves can be freely selected from the following two combinations:

the sending time of the backward direction measurement packet and the received time of the forward direction measurement packet; and the received time of the backward direction measurement packet and the sending time of the forward direction measurement packet.

Concretely, FIGS. 5 through 7 show examples.

In the example shown in FIG. 5, the master sends the first measurement packet in the backward direction, and sends the second measurement packet in the forward direction.

Then, the master measures the sending time $T_{01}$ of the backward direction measurement packet being the first measurement packet and the received time $T_{02}$ of the forward direction measurement packet being the second measurement packet.

The slave measures the received time $T_{11}$ (or $T_{21}$) of the backward direction measurement packet being the first measurement packet and the sending time $T_{12}$ (or $T_{22}$) of the forward direction measurement packet being the second measurement packet.

Then, the master sends the measurement result notifying packet showing the sending time $T_{01}$ of the backward direction measurement packet and the received time $T_{02}$ of the forward direction measurement packet, and each slave calculates the time correction value using the time $T_{01}$, $T_{02}$ shown in the measurement result notifying packet and the stored time $T_{11}$, $T_{12}$ (or $T_{21}$, $T_{22}$) according to the expression 1 (or the expression 2) and corrects the time of the internal clock as discussed above.

Further, in the example shown in FIG. 6, the master sends the first measurement packet in the forward direction, and sends the second measurement packet in the backward direction.

Then, the master measures the received time $T_{01}$ of the forward direction measurement packet being the first measurement packet and the sending time $T_{02}$ of the backward direction measurement packet being the second measurement packet.

The slave measures the sending time $T_{11}$ (or $T_{21}$) of the forward direction measurement packet being the first measurement packet and the received time $T_{12}$ (or $T_{22}$) of the backward direction measurement packet being the second measurement packet.

Then, the master sends the measurement result notifying packet showing the received time $T_{01}$ of the forward direction measurement packet and the sending time $T_{02}$ of the backward direction measurement packet, and each slave calculates the time correction value using the time $T_{01}$, $T_{02}$ shown in the measurement result notifying packet and the stored time $T_{11}$, $T_{12}$ (or $T_{21}$, $T_{22}$) according to the expression 1 (or the expression 2) and corrects the time of the internal clock as discussed above.

Further, in the example shown in FIG. 7, the master sends the first measurement packet in the forward direction, and sends the second measurement packet in the backward direction.

Then, the master measures the sending time $T_{01}$ of the forward direction measurement packet being the first measurement packet and the received time $T_{02}$ of the backward direction measurement packet being the second measurement packet.

The slave measures the received time $T_{11}$ (or $T_{21}$) of the forward direction measurement packet being the first measurement packet and the sending time $T_{12}$ (or $T_{22}$) of the backward direction measurement packet being the second measurement packet.

Then, the master sends the measurement result notifying packet showing the sending time $T_{01}$ of the forward direction measurement packet and the received time $T_{02}$ of the backward direction measurement packet, and each slave calculates the time correction value using the time $T_{01}$, $T_{02}$ shown in the measurement result notifying packet and the stored time $T_{11}$, $T_{12}$ (or $T_{21}$, $T_{22}$) according to the expression 1 (or the expression 2) and corrects the time of the internal clock as discussed above.

Within the ring type network, if a slave in which a large difference occurs between the relay processing time of the forward direction measurement packet and the relay processing time of the backward direction measurement packet exists, it is considered to use a combination of the measuring points excluding the relay processing of such a slave.

If the measuring points are set as the combination shown in FIGS. 4 through 7 of the present embodiment, the measuring points at the slaves can be uniformed, then the process at the slave can be simplified, and further, the calculated correction value does not include the influence caused by the relay processing time of the slave itself which carries out time synchronization.

In the examples of FIGS. 4 through 7, the type of the time measured at the master and the type of the time measured at each slave are different, and further, the type of measured time varies according to the sending directions of the measurement packet. For example, in FIG. 4, the master measures the received time of the backward direction measurement packet, and each slave measures the sending time of the backward direction measurement packet. Further, the master measures the sending time of the forward direction measurement packet, and each slave measures the received time of the forward direction measurement packet. In FIG. 5, the master measures the sending time of the backward direction measurement packet, and each slave measures the received time of the backward direction measurement packet. Further, the master measures the received time of the forward direction measurement packet, and the slave measures the sending time. In FIGS. 6 and 7, similarly, the type of the measuring time of the master and the type of the measuring time of each slave are different, and the type of the measuring time is different depending on the sending directions of the measurement packet.

The time obtainment like this excludes the influence caused by the relay processing time of the slave itself.

On the other hand, although the influence of the relay processing time at the slave is included, the time can be obtained in a way being different from the time obtaining method of FIGS. 4 through 7.

Concretely, the type of the time obtained by the master and each slave can be made the same. For example, in the example shown in FIG. 4, both the master and each slave can measure the received time of the backward direction measurement packet, and both the master and each slave can measure the sending time of the forward direction measurement packet.

Further, in order to freely arrange the combination of the measuring points at the slave side for calculating the time correction value, the master can measure four points of the sending time of the backward direction measurement packet, the received time of the backward direction measurement packet, the sending time of the forward direction measurement packet, and the received time of the forward direction measurement packet, and can send all the information to the slaves. An example of the format of the measurement result notifying packet in this case is shown in FIG. 13.

Further, in the case of FIG. 4, the received time of the backward direction measurement packet at the master can be included in the forward direction measurement packet, and sent to the slaves.

In this case, an example of the format of the backward direction measurement packet is shown in FIG. 14, an example of the format of the forward direction measurement packet is shown in FIG. 15, and an example of the format of the measurement result notifying packet is shown in FIG. 16.

In FIG. 14, a field of the time information can store the time information obtained at a certain timing or store nothing.

The field is provided for equal packet length so as to avoid a difference in transmission delay between the backward direction measurement packet and the forward direction measurement packet, and a difference in the relay processing time between the backward direction measurement packet and the forward direction measurement packet.

Next, the turn-back operation in the case of disconnection of line, etc. will be described.

In the ring type network forming a double ring, when communication failure arises because of disconnection of line, etc., the operation sometimes moves into the turn-back operation in which the packet is turned back at the nodes of both ends of the failed route.

FIG. 17 shows such operation.

In FIG. 17, four nodes of a master, a slave A, a slave B, and a slave C form a ring type network.

At this time, when the communication between the slave B and the slave C becomes impossible, the slave B and the slave C detect this status, and each node moves to a turn-back operation mode in which the received packet is sent by turning back as shown by arrows in FIG. 17. The slave B and the slave C which perform this turning back of the packet are called as a turn-back point slave node apparatus or a turn-back point slave node.

At this time, each node of the master and the slaves detects movement to the turn-back operation mode and carries out the time synchronization.

FIG. 18 shows packet exchanging procedure at the time synchronization in the turn-back operation mode in the configuration shown in FIG. 17. The processing flow of the master at this time will be shown in FIG. 19.

The operation of the master will be explained in order with reference to FIG. 19.

Here, the measurement packet sent/received at the time of turn-back operation is called as a turn-back measurement packet.

First, the master sends the turn-back measurement packet in the forward direction (S18). Here, although the initial direction of the turn-back measurement packet can be either of the forward direction and the backward direction, here the explanation will be done assuming that the packet is sent in the forward direction first.

A format of the turn-back measurement packet is, for example, the format shown in FIG. 9, in which the packet type is a value reserved as a turn-back measurement packet. The turn-back measurement packet is generated, similarly to the normal operation time, by the sending data generating unit 3 based on the instruction from the time synchronization controlling unit 1.

At this time, the time synchronization controlling unit 1 stores the sending time measured by the clock controlling unit 5 as the forward direction sending time ($T_{01}$ in FIG. 18).

Next, the master receives the turn-back measurement packet in the backward direction (S19). That is, a returned turn-back measurement packet which is returned by the turn-back point slave node (slave B) of one side.

At this time, the master receives the returned turn-back measurement packet by the backward direction transmission channel receiving unit 9 and sends the returned turn-back measurement packet again from the backward direction transmission channel sending unit 11 via the backward direction transmission channel repeater 10.

Further, at this time, the time synchronization controlling unit 1 obtains the received time at the time of receiving the returned turn-back measurement packet at the backward direction transmission channel receiving unit 9 and the sending time at the time of sending the returned turn-back measurement packet at the backward direction transmission channel sending unit 11, and stores as the backward direction received time ($T_{02}$ in FIG. 18) and the backward direction sending time ($T_{03}$ in FIG. 18).

Next, the master receives the turn-back measurement packet in the forward direction (S20). Namely, the master receives a twicely-returned turn-back measurement packet which has been returned again by another turn-back point slave node (slave C).

At this time, the time synchronization controlling unit 1 obtains the received time of the twicely-returned turn-back measurement packet and stores the time as the forward direction received time ($T_{04}$ in FIG. 18).

Next, in the master, based on the instruction from the time synchronization controlling unit 1, the sending data generating unit 3 generates the measurement result notifying packet storing the forward direction sending time ($T_{01}$ the backward direction received time ($T_{02}$), the backward direction sending time ($T_{03}$), and the forward direction received time ($T_{04}$) obtained, and the forward direction transmission channel sending unit 8 sends the measurement result notifying packet in the forward direction (S21). Here, to separate the measurement result notifying packet at the time of turn-back operation from the measurement result notifying packet at the normal operation, this measurement result notifying packet is also called as a turn-back measurement result notifying packet.

An example of a format of the turn-back measurement result notifying packet at this time is shown in FIG. 20.

Next, the master receives the turn-back measurement result notifying packet which has been returned by the turn-back point slave node (slave B) in the backward direction, and sends the packet again in the backward direction via the repeater (S22).

Next, the master receives the turn-back measurement result notifying packet which has been returned again by the turn-back point slave node (slave C) in the forward direction (S23).

Like this, at the time of turn-back operation, the master node apparatus sends to a slave node apparatus which acts as a receiver in the direction of the turn-back point slave node apparatus at one side (slave B) the turn-back measurement packet which is to be returned by the turn-back point slave node apparatus being uncommunicable, according to the time-keeping of the internal clock (reference clock), stores the sending time ($T_{01}$) of the turn-back measurement packet, receives the returned turn-back measurement packet which has been returned by the returning slave node apparatus at one side, and according to the time-keeping of the internal clock (reference clock), stores the received time ($T_{02}$) of the returned turn-back measurement packet.

Further, the master node apparatus sends the returned turn-back measurement packet received to a slave node apparatus being a receiver in the direction of the turn-back point slave node apparatus at another side (slave C), as well according to the time-keeping of the internal clock (reference clock), stores the sending time ($T_{03}$) of the returned turn-back measurement packet, receives the twicely returned turn-back measurement packet which has been returned again by the turn-back point slave node apparatus at the other side, and according to the time-keeping of the internal clock (reference clock), stores the received time ($T_{04}$) of the twicely-returned turn-back measurement packet.

Further, the master node apparatus generates the turn-back measurement result notifying packet showing the sending time ($T_{01}$) of the turn-back measurement packet, the received time ($T_{02}$) of the returned turn-back measurement packet, the sending time ($T_{03}$) of the returned turn-back measurement packet, and the received time ($T_{04}$) of the twicely-returned turn-back measurement packet, sends the generated turn-back measurement result notifying packet to a slave node apparatus being a receiver in the direction of the turn-back point slave node apparatus at the one side (slave node B), and, as will be discussed later, notifies the slave node apparatus in the direction of the turn-back point slave node apparatus at one side of at least the sending time ($T_{01}$) of the turn-back measurement packet and the received time ($T_{02}$) of the returned turn-back measurement packet.

Further, the master node apparatus sends the turn-back measurement result notifying packet to a slave node apparatus being a receiver in the direction of the turn-back point slave node apparatus at the other side (slave C), and, as will be discussed later, notifies the slave node apparatus in the direction of the turn-back point slave node apparatus at the other side of at least the sending time ($T_{03}$) of the returned turn-back measurement packet and the received time ($T_{04}$) of the twicely-returned turn-back measurement packet.

Here, the sending data generating unit 3 of the time synchronizing apparatus 100 is also an example of a turn-back measurement packet generating unit at the time of turn-back operation; the forward direction transmission channel sending unit 8 and the backward direction transmission channel sending unit 11 are examples of a turn-back measurement packet sending unit at the time of turn-back operation; and the forward direction transmission channel receiving unit 6 and the backward direction transmission channel receiving unit 9 are examples of a turn-back measurement packet receiving unit at the time of turn-back operation.

Next, the operation of the slave will be explained.

FIG. 21 shows the processing flow of the slave at the time of turn-back operation.

First, the slave receives a packet (S18).

At this time, if the slave which receives the packet is not a turn-back point slave node, the received packet is sent after repeating via the repeater.

If the slave which receives the packet is a turn-back point, the slave returns the packet in the direction opposite to the direction of receiving the packet.

Further, at this time, the received time and the sending time are respectively stored in the clock controlling unit 5.

Next, at the slave, the time synchronization controlling unit 1 determines a type of the received packet (S19).

If the type of packet is the turn-back measurement packet, the time synchronization controlling unit 1 determines whether or not this is the first-time receipt of the turn-back measurement packet of that sequence number (S20).

If it is the first-time receipt, the time synchronization controlling unit 1 obtains the received time obtained by the forward direction transmission channel receiving unit 6 or the backward direction transmission channel receiving unit 9 from the clock controlling unit 5 and stores as the received time ($T_{11}, T_{21}, T_{31}$ in FIG. 18) of the turn-back measurement packet (S21).

Further, if it is not the first-time receipt at S20, that is, if it is the second-time receipt of the turn-back measurement packet having the same sequence number, the time synchronization controlling unit 1 obtains the sending time obtained at the time of sending after repeating by the forward direction transmission channel sending unit 8 or the backward direction transmission channel sending unit 11 from the clock controlling unit 5 and stores as the sending time ($T_{12}$ in FIG. 18) of the turn-back measurement packet (S22).

Next, at the slave, the time synchronization controlling unit 1 determines if the own node is the turn-back point or not (S23).

If the own node is the turn-back point, the time synchronization controlling unit 1 obtains the sending time obtained at the time of sending back by the forward direction transmission channel sending unit 8 or the backward direction transmission channel sending unit 11 from the clock controlling unit 5 and stores as the sending time ($T_{22}, T_{32}$ in FIG. 18) of the turn-back measurement packet (S24).

Further, if the received packet is the turn-back measurement packet at S19, at the slave, the time synchronization controlling unit 1 determines whether or not this is the first-time receipt of the turn-back measurement packet having the same sequence number (S25).

If it is the first-time receipt, the time synchronization controlling unit 1 calculates the time correction value at the slave (S26) and adjusts the time using the calculated correction value (S27).

In case of turn-back operation, the obtaining point of sending/received time at the slave differs according to whether the slave is the turn-back point or not, or whether the slave is connected at the upstream side or the downstream side of the master, viewed in the forward direction.

Further, which obtaining point at the master is to be used for calculating the time correction value also differs according to whether the slave is connected at the upstream side or the downstream side of the master.

First, the obtaining point at the slave will be explained.

Like the slave A in FIG. 18, if the slave is not the turn-back point, the slave receives the turn-back measurement packet twice in total, namely, once in the forward direction and the backward direction each.

In this case, for the first-time receipt, the received time is stored at S21 in FIG. 21, and for the second-time receipt, the sending time of sending after repeating via the repeater is stored at S22. These obtaining points correspond to $T_{11}$ and $T_{12}$ in the example of FIG. 18.

As for the time obtaining point at the slave other than the turn-back point, like the slave A in FIG. 18, if the slave is connected at the downstream side of the master, the slave should use a combination of the receipt in the forward direction, namely, the received time obtained at the forward direction transmission channel receiving unit 6 and the transmission in the backward direction, namely, the sending time obtained at the backward direction transmission channel sending unit 11; on the contrary, if the slave is connected at the upstream side of the master, the slave should use a combination of the receipt in the backward direction, namely, the received time obtained at the backward direction transmission channel receiving unit 9 and the transmission in the forward direction, namely, the sending time obtained at the forward direction transmission channel sending unit 8.

As for the slave other than the turn-back point, the slave can use opposite combinations of obtaining points, respectively; however, if the time is obtained at the above-discussed points, it is effective to exclude the influence due to the repeating process of the slave itself which calculates the time correction value from the calculated result.

If the slave is the turn-back point, since the packet is to be returned by the own node, the receipt of the turn-back measurement packet is only once.

At the slave of the turn-back point, at S21 of FIG. 21, the received time is stored, and subsequently, the sending time is stored at 24.

If the slave is the turn-back point at the downstream side, the obtaining points are the received time in the forward direction and the sending time in the backward direction as $T_{21}$ and $T_{22}$ at the slave B shown in FIG. 18; and if the slave is the turn-back point at the upstream side, the obtaining points are the received time in the backward direction and the sending time in the forward direction as $T_{31}$ and $T_{32}$ at the slave C shown in FIG. 18.

Further, as for the obtaining point of the master to be used for calculating the time correction value of the slave at S26 in FIG. 21, if the slave is connected at the downstream side of the master, the forward direction sending time ($T_{01}$) and the backward direction received time ($T_{02}$) are applied; on the contrary, if the slave is connected at the upstream side of the master, the backward direction sending time ($T_{03}$) and the forward direction received time ($T_{04}$) are applied.

In the example of FIG. 18, for the slave A and the slave B connected at the downstream side of the master, $T_{01}$ and $T_{02}$ are used as the obtaining points of time at the master; and for the slave C connected at the upstream side of the master, $T_{03}$ and $T_{04}$ are used as the obtaining points of time at the master.

Then, a correction value $\Delta T1$ for the internal clock of the salve A is:

$$\Delta T1 = \{(T_{01}+T_{02})-(T_{11}+T_{12})\}/2.$$

Further, a correction value $\Delta T2$ for the internal clock of the salve B is:

$$\Delta T2 = \{(T_{01}+T_{02})-(T_{21}+T_{22})\}/2.$$

Further, a correction value $\Delta T3$ for the internal clock of the salve C is:

$$\Delta T3 = \{(T_{03}+T_{04})-(T_{31}+T_{32})\}/2.$$

There are some methods to determine whether the slave is connected at the upstream side of the master or at the downstream side; for example, if the slave side receives a packet in forward direction first, it is determined that the slave is at the downstream side, and if the slave side receives a packet in backward direction first, it is determined that the slave is at the upstream side.

Or it can be also determined by setting a bit of some field only if the packet is sent in the backward direction when the packet is sent from the master.

Or it can be also determined by changing the received time and the sending time to be notified according to the direction to send the measurement result notifying packet when the packet is sent from the master.

For example, the measurement result notifying packet has a format shown in FIG. 22, when sending the measurement result notifying packet from the master in the forward direction, the measurement result notifying packet stores the forward direction sending time as the sending time of the turn-back measurement packet and the backward direction received time as the received time of the turn-back measurement packet and is sent.

Then, when the measurement result notifying packet which has been sent to the downstream side is returned to the master, the field of the sending time of the turn-back measurement packet is replaced with the backward direction sending time, and the field of the received time of the turn-back measurement packet is replaced with the forward direction received time, respectively, and the packet is sent in the backward direction.

In this way, in case of the turn-back operation, on receiving the turn-back measurement packet, each salve node apparatus stores the received time of the turn-back measurement packet according to the time-keeping of the internal clock.

Then, if the slave node apparatus itself is not the turn-back point slave node, each slave node apparatus sends the turn-back measurement packet to the node apparatus being the receiver in the sending direction of the turn-back measurement packet, receives the returned turn-back measurement packet which has been returned by the turn-back point slave node apparatus, sends the received returned turn-back measurement packet to the node apparatus being the receiver in the sending back direction, and stores the sending time of the returned turn-back measurement packet according to the time-keeping of the internal clock.

Further, if the slave node apparatus itself is the turn-back point slave node, each slave node apparatus returns the turn-back measurement packet to the node apparatus which acts as the sender of the turn-back measurement packet, and stores the sending time of the returned turn-back measurement packet which is returned.

Further, on receiving the turn-back measurement result notifying packet, each slave node calculates the time correction value using the sending time of the turn-back measurement packet and the received time of the returned turn-back measurement packet shown in the received turn-back measurement result notifying packet and the received time of the turn-back measurement packet stored and the sending time of the returned turn-back measurement packet stored, and corrects the time of the internal clock using the time correction value calculated.

Further, on receiving the returned turn-back measurement packet which has been returned by the turn-back point slave node at one side, each slave node apparatus stores the received time of the returned turn-back measurement packet according to the time-keeping of the internal clock.

Then, if the slave node apparatus itself is not the turn-back point slave node apparatus being the other side, each slave node apparatus sends the returned turn-back measurement packet to the node apparatus being the receiver in the sending direction of the returned turn-back measurement packet, receives the twicely-returned turn-back measurement packet which has been returned again at the slave node at the other side, sends the twicely-returned turn-back measurement packet to the node apparatus being the receiver in the twicely returning direction, and stores the sending time of the twicely-returned turn-back measurement packet according to the time-keeping of the internal clock.

Further, if the slave node apparatus itself is the turn-back point slave node apparatus at the other side, each slave node apparatus returns again the returned turn-back measurement packet to the node apparatus being the sender of the returned turn-back measurement packet, and stores the sending time of the twicely-returned turn-back measurement packet which has been returned again according to the time-keeping of the internal clock.

Further, on receiving the turn-back measurement result notifying packet, each slave node calculates the time correction value using the sending time of the returned turn-back measurement packet and the received time of the twicely-returned turn-back measurement packet shown in the received turn-back measurement result notifying packet and the received time of the returned turn-back measurement packet stored and the sending time of the twicely-returned turn-back measurement packet stored, and corrects the time of the internal clock using the time correction value calculated.

As has been discussed, the measurement packet is circulated in the ring once each in the backward direction and the forward direction and the sending/received time is obtained, so that the time synchronization can be done with less number of procedure, by measuring the time of reciprocation in the same route.

Further, since generation and transmission of a new packet is done only by the master side, the operation of the slave side can be simplified, and further the relay processing time of the slave side can be shortened, its variation can be small, and it can be expected to lessen the influence on the calculation of the corrected time.

Further, since the time correction value calculation by each slave uses only the values obtained by the own node and the master, the time synchronization can be performed independently regardless of supporting status of the time synchronization at other slaves.

Moreover, if there is partial communication failure in the ring type network, the time synchronization method is switched to a method for the turn-back operation, so that the time synchronization can be performed also in case of turn-back operation.

As discussed above, in the present embodiment, the time synchronization apparatus including the following means has been explained:
(a) receiving means and sending means for the forward transmission channel;
(b) receiving means and sending means for the backward direction transmission channel;
(c) the internal clock;
(d) means to obtain and store times based on the internal clock at timing of receiving the packet and the sending the packet by the receiving means and the sending means; and
(e) controlling means to exchange the above time information with another node, calculate the time correction value, and adjust the time of the internal clock.

Further, in the present embodiment, the master node apparatus including the following means has been also explained:
(a) means to send the backward direction measurement packet from the backward direction transmission channel;
(b) means to receive the backward direction measurement packet from the backward direction transmission channel and store the received time;
(c) means to send the forward direction measurement packet from the forward direction transmission channel and store the sending time; and
(f) means to store the received time and the sending time in the notifying packet and send the notifying packet.

Further, in the present embodiment, the slave node apparatus including the following means has been also explained:
(a) means to receive the packet from the forward direction transmission channel or the backward direction transmission channel and to determine the packet type;
(b) if the packet type is the backward direction measurement packet, means to send the packet to the next node and store the sending time;
(c) if the packet type is the forward direction measurement packet, means to store the received time of the packet;
(d) if the packet type is the measurement result notifying packet, means to calculate time correction from the time information of the master stored in the measurement result notifying packet and the time information measured by the own node; and
(e) means to adjust a clock of the own node using the time correction value calculated above.

Further, in the present embodiment, the master node apparatus including the following means has been also explained:
(a) means to send the turn-back measurement packet in the forward direction transmission channel and store the sending time;
(b) means to receive the turn-back measurement packet from the backward direction transmission channel, store the received time, send the turn-back measurement packet in the backward direction transmission channel, and store the sending time;
(c) means to receive the turn-back measurement packet from the forward direction transmission channel and store the received time; and
(d) means to store the above four received and sending times in the measurement result notifying packet and send by broadcast.

Further, in the present embodiment, the slave node apparatus including the following means has been also explained:
(a) means to receive a packet from the forward direction transmission channel or the backward direction transmission channel, send the received packet to the next node, and as well determine the packet type;
(b) if the packet type is turn-back measurement packet, means to determine whether it is the first-time receipt, if it is the first-time receipt, store the received time, and if not, store the sending time;
(c) means to determine whether that slave is the turn-back point, if it is, store the sending time;
(d) if the received packet is measurement result notifying packet, means to determine whether it is the first-time receipt, if it is the first-time receipt, calculate a time correction value; and
(e) means to adjust a time of the clock of the own node using the calculated time correction value.

Embodiment 2

In the above first embodiment, the correction value of the time of the slave is calculated using the measured value including the time for relay processing of other slaves existing on the route to the slave from the master, that is, the relay nodes. Next, another embodiment will be shown, in which the time synchronization is done using the value excluding the relay processing time at the relay node.

In this embodiment, the slave stores times of all four obtaining points including the received time and the sending time of the backward direction measurement packet, and the received time and the sending time of the forward direction measurement packet, and calculates the time correction value using four time measured values which exclude the relay processing time of the nearest preceding node and the own node, with the nearest preceding node.

In this way, the time synchronization is sequentially carried out. Further, as the measured value to notify to the next node, a value made by correcting the measured value using the time correction value of the own node is notified.

FIG. 24 shows an example of procedure of packet exchange between the master and the slave in the above case.

In FIG. 24, it is the same as the first embodiment that the backward direction measurement packet being the first measurement packet and the forward direction measurement packet being the second measurement packet are sent from the master node, and that the backward direction measurement packet and the forward direction measurement packet are circulated in the circulation route.

Each slave node stores, according to the timekeeping of the internal clock, four times of the received time ($T_{11}$, $T_{21}$) and the sending time ($T_{12}$, $T_{22}$) of the backward direction measurement packet, and the received time ($T_{13}$, $T_{23}$) and the sending time ($T_{14}$, $T_{24}$) of the forward direction measurement packet. Here, the received time of the backward direction measurement packet (the first measurement packet) and the sending time of the forward direction measurement packet (the second measurement packet) are made a pair, and the sending time of the backward direction measurement packet and the received time of the forward direction measurement packet are made a pair.

Further, each slave node receives the measurement result notifying packet after correction, and calculates the time correction value using a pair of the sending time and the received time shown in the received measurement result notifying packet after correction and either pair of the sending time and the received time stored.

In the example shown in FIG. 24, a pair of the received time ($T_{11}$) of the backward direction measurement packet after correction and the sending time ($T_{14}$) of the forward direction measurement packet after correction at the preceding slave node (slave A, for example) is shown in the measurement result notifying packet after correction, each slave node (the slave B, for example) calculates the time correction value using a pair of the sending time ($T_{22}$) of the backward direction measurement packet and the received time ($T_{23}$) of the forward direction measurement packet stored in the own node and a pair of the received time ($T_{11}$) and the sending time ($T_{14}$) shown in the measurement result notifying packet after correction, calculates the sending time after correction and the received time after correction using the calculated time correction value to a pair of the sending time and the received time ($T_{21}$ and $T_{24}$) which have not been used for calculating the time correction value among the stored pairs of the sending times and the received times, and sends the measurement result notifying packet after correction showing the sending time after correction and the received time after correction to the next slave node.

Here, the sending direction of the measurement packet and the sending direction of the measurement result notifying packet after correction are not limited to the ones shown in FIG. 24, but the sending direction can be as shown in FIGS. 25 through 27.

In FIG. 25, similarly to the case of FIG. 24, the master sends the backward direction measurement packet as the first measurement packet and sends the forward direction measurement packet as the second measurement packet, but sends the measurement result notifying packet after correction in the backward direction.

In FIG. 26, the master sends the forward direction measurement packet as the first measurement packet, sends the backward direction measurement packet as the second measurement packet, and sends the measurement result notifying packet after correction in the backward direction.

In FIG. 27, the master sends the forward direction measurement packet as the first measurement packet, sends the backward direction measurement packet as the second measurement packet, and sends the measurement result notifying packet after correction in the forward direction.

Here, a detail of the operations of the master node and the slave nodes in examples of FIGS. 25 through 27 will be discussed later.

FIG. 23 is a configuration example of a time synchronizing apparatus 100 as the slave node apparatus according to the present embodiment.

The configuration shown in FIG. 23 is the same as the one of FIG. 2 which has been shown in the first embodiment; however, the processing contents are different from the first embodiment as shown in the following.

According to the time-keeping of the internal clock 4, the time synchronization controlling unit 1 stores four times, namely, the received time and the sending time of the backward direction measurement packet, and the received time and the sending time of the forward direction measurement packet. As has been discussed above, the received time of the backward direction measurement packet and the sending time of the forward direction measurement packet make a pair, and the sending time of the backward direction measurement packet and the received time of the forward direction measurement packet make a pair.

Further, the time synchronization controlling unit 1 calculates the time correction value using a pair of the sending time and the received time at another node apparatus shown in the measurement result notifying packet after correction and either pair of stored pairs of the sending time and the received time, and calculates the sending time after correction and the received time after correction by applying the calculated time correction value to a pair of the sending time and the received time which has not been used for calculating the time correction value among the stored pairs of the sending time and the received time.

The time synchronization controlling unit 1 is an example of a time memory unit and a time correction value calculating unit.

Replacing the pair of the sending time and the received time of the other node apparatus shown in the measurement result notifying packet after correction, the sending data generating unit 3 stores the pair of the sending time after correction and the received time after correction calculated by the time synchronization controlling unit 1 in the measurement result notifying packet after correction, and generates a new measurement result notifying packet after correction.

The sending data generating unit 3 is an example of a measurement result notifying packet updating unit.

The forward direction transmission channel receiving unit 6 and the backward direction transmission channel receiving unit 9 respectively receive the first measurement packet and the second measurement packet sent from the master node, and as well can receive the measurement result notifying packet after correction.

The forward direction transmission channel receiving unit 6 and the backward direction transmission channel receiving unit 9 are examples of a first measurement packet receiving unit, a second measurement packet receiving unit, or a measurement result notifying packet receiving unit.

The forward direction transmission channel sending unit 8 and the backward direction transmission channel sending unit 11 respectively send the first measurement packet or the second measurement packet.

Further, the forward direction transmission channel sending unit 8 and the backward direction transmission channel sending unit 11 can send the new measurement result notifying packet after correction generated by the sending data generating unit 3.

The forward direction transmission channel sending unit 8 and the backward direction transmission channel sending unit 11 are examples of a first measurement packet sending unit, a second measurement packet sending unit, or a measurement result notifying packet sending unit.

The other elements are the same as the ones shown in FIG. 2.

Further, a task of each configurational element of the time synchronizing apparatus 100 operated as the master node is the same as the one shown in FIG. 1.

Next, the operation will be explained.

FIG. 28 shows a processing flow of the master in case of packet sending example shown in FIG. 24.

The operation procedure at the master will be discussed with reference to FIG. 28.

The operation procedure is approximately the same as the one of FIG. 8 which has been shown in the first embodiment.

The master first sends the backward direction measurement packet (S28).

A format of the backward direction measurement packet is the same as the one shown in FIG. 9.

After sending the backward direction measurement packet, the master next receives the backward direction measurement packet which has been circulated round the ring. At this time, the received time is obtained and maintained as the received time of the backward direction measurement packet (S29).

Next, the master sends the forward direction measurement packet and obtains the sending time (S30).

A format of the forward direction measurement packet is the same as the one shown in FIG. 9.

Next, the master receives the forward direction measurement packet which has been circulated round the ring (S31).

Next, the master sends the measurement result notifying packet after correction, and notifies the received time of the backward direction measurement packet and the sending time of the forward direction measurement packet measured by the own node to the slave A (S32).

An example of a format of the measurement result notifying packet after correction is shown in FIG. 29.

The measurement result notifying packet after correction from the master is not sent by broadcast, but is sent to the slave A.

Next, the master receives the measurement result notifying packet after correction sent from the slave C (S33).

The internal process of the master is the same as the one shown in the first embodiment in principle.

Next, the operation procedure of the slave will be explained.

FIG. 30 is a processing flow of the slave in case of packet sending example of FIG. 24.

First, the slave receives a packet (S34).

At this time, the backward direction measurement packet and the forward direction measurement packet sent by broadcast are sent after repeating via the repeater.

At this time, the received time and the sending time are obtained and stored in the clock controlling unit 5.

Next, in the slave, the time synchronization controlling unit 1 determines a type of the received packet (S35).

If the received packet is the backward direction measurement packet, the time synchronization controlling unit 1 obtains the received time of the packet from the clock controlling unit 5 and stores the time as the backward direction received time (S36).

Subsequently, the time synchronization controlling unit 1 obtains the packet sending time from the clock controlling unit 5 and stores as the backward direction sending time (S37).

On the other hand, at S35, if the received packet is the forward direction measurement packet, the time synchronization controlling unit 1 obtains the packet received time from the clock controlling unit 5 and stores as the forward direction received time (S38).

Subsequently, the time synchronization controlling unit 1 obtains the packet sending time from the clock controlling unit 5 and stores as the forward direction sending time (S39).

Further, at S35, if the received packet is the measurement result notifying packet after correction, the time synchronization controlling unit 1 calculates the time correction value of the own node.

For calculating the time correction value of the own node at the slave, four values of the received time after correction of the backward direction measurement packet and the sending time after correction of the forward direction measurement packet included in the received measurement result notifying packet after correction, the backward direction sending time and the forward direction received time obtained by the own node are used.

If it is assumed that the received time after correction of the backward direction measurement packet included in the measurement result notifying packet after correction is $T_{PAR}$, the sending time after correction of the forward direction measurement packet is $T_{PFS}$, the backward direction sending time obtained at the own node is $T_{SAS}$, and the forward direction received time is $T_{SFR}$, a time correction value $\Delta T$ at that slave node is obtained by $$\Delta T = \{(T_{PAR} + T_{PFS}) - (T_{SAS} + T_{SFR})\}/2.$$

Next, the time synchronization controlling unit 1 corrects the measured value using the calculated time correction value, the sending data generating unit 3 stores the corrected value in the measurement result notifying packet after correction, and the forward direction transmission channel sending unit 8 sends a new measurement result notifying packet after correction (S41).

The time synchronization controlling unit 1 corrects the backward direction received time obtained by the own node by adding $\Delta T$ and makes the corrected value as the received time after correction of the backward direction measurement packet; further, corrects the forward direction sending time obtained by the own node by adding $\Delta T$ and makes the corrected value as the sending time after correction of the forward direction measurement packet. The sending data generating unit 3 stores respective values of the calculated received time after correction of the backward direction measurement packet and the calculated sending time after correction of the forward direction measurement packet in the measurement result notifying packet after correction instead of the received time after correction of the backward direction measurement packet and the sending time after correction of the forward direction measurement packet of the other node, respectively. The forward direction transmission channel sending unit 8 sends a new measurement result notifying packet after correction to a node next to the own node in the forward direction.

Next, the clock controlling unit 5 adjusts the internal clock 4 of the own node using the $\Delta T$ calculated by the time synchronization controlling unit 1 (S42).

In an example of FIG. 25, the master sends the backward direction measurement packet as the first measurement packet and sends the forward direction measurement packet as the second measurement packet. Then, the master stores the sending time ($T_{O1}$) of the backward direction measurement packet and the received time ($T_{O2}$) of the forward direction measurement packet, and sends the measurement result notifying packet after correction showing a pair of the sending time ($T_{O1}$) of the backward direction measurement packet and the received time ($T_{O2}$) of the forward direction measurement packet in the backward direction.

Further, each slave node, according to the time-keeping of the internal clock, stores four times of the received time ($T_{11}$, $T_{21}$) and the sending time ($T_{12}$, $T_{22}$) of the backward direction measurement packet, and the received time ($T_{13}$, $T_{23}$) and the sending time ($T_{14}$, $T_{24}$) of the forward direction measurement packet. Here, the received time of the backward direction measurement packet (the first measurement packet) and the sending time of the forward direction measurement packet (the second measurement packet) make a pair, and the sending time of the backward direction measurement packet and the received time of the forward direction measurement packet make a pair.

The slave node B which receives the measurement result notifying packet after correction from the master node calculates the time correction value using a pair of the sending time ($T_{O1}$) of the backward direction measurement packet and the received time ($T_{O2}$) of the forward direction measurement packet shown in the measurement result notifying packet after correction and a pair of the received time ($T_{21}$) of the backward direction measurement packet and the sending time ($T_{24}$) of the forward direction measurement packet stored by the slave node B.

A time correction value ΔT at the slave node B is obtained by the following.

$$\Delta T = \{(T_{01}+T_{02})-(T_{21}+T_{24})\}/2$$

Then, the calculated time correction value is used for the stored sending time ($T_{22}$) of the backward direction measurement packet and the received time ($T_{23}$) of the forward direction measurement packet, the sending time after correction of the backward direction measurement packet and the received time after correction of the forward direction measurement packet are calculated, and the measurement result notifying packet after correction showing the sending time after correction of the backward direction measurement packet and the received time after correction of the forward direction measurement packet are sent to the next slave node A.

In an example of FIG. 26, the master sends the forward direction measurement packet as the first measurement packet and sends the backward direction measurement packet as the second measurement packet. Then, the master stores the received time ($T_{01}$) of the forward direction measurement packet and the sending time ($T_{02}$) of the backward direction measurement packet, and sends the measurement result notifying packet after correction showing a pair of the received time ($T_{01}$) of the forward direction measurement packet and the sending time ($T_{02}$) of the backward direction measurement packet in the backward direction.

Further, each slave node, according to the time-keeping of the internal clock, stores four times of the received time ($T_{11}$, $T_{21}$) and the sending time ($T_{12}$, $T_{22}$) of the forward direction measurement packet, and the received time ($T_{13}$, $T_{23}$) and the sending time ($T_{14}$, $T_{24}$) of the backward direction measurement packet. Here, the received time of the forward direction measurement packet (the first measurement packet) and the sending time of the backward direction measurement packet (the second measurement packet) make a pair, and the sending time of the forward direction measurement packet and the received time of the backward direction measurement packet make a pair.

The slave node B which receives the measurement result notifying packet after correction from the master node calculates the time correction value using a pair of the received time ($T_{01}$) of the forward direction measurement packet and the sending time ($T_{02}$) of the backward direction measurement packet shown in the measurement result notifying packet after correction and a pair of the sending time ($T_{22}$) of the forward direction measurement packet and the received time ($T_{23}$) of the backward direction measurement packet stored by the slave node B.

A time correction value ΔT at the slave node B is obtained by the following.

$$\Delta T = \{(T_{01}+T_{02})-(T_{22}+T_{23})\}/2$$

Then, the calculated time correction value is used for the stored received time ($T_{21}$) of the forward direction measurement packet and the sending time ($T_{24}$) of the backward direction measurement packet, the received time after correction of the forward direction measurement packet and the sending time after correction of the backward direction measurement packet are calculated, and the measurement result notifying packet after correction showing the received time after correction of the forward direction measurement packet and the sending time after correction of the backward direction measurement packet are sent to the next slave node A.

In an example of FIG. 27, the master sends the forward direction measurement packet as the first measurement packet and sends the backward direction measurement packet as the second measurement packet. Then, the master stores the sending time ($T_{01}$) of the forward direction measurement packet and the received time ($T_{02}$) of the backward direction measurement packet, and sends the measurement result notifying packet after correction showing a pair of the sending time ($T_{01}$) of the forward direction measurement packet and the received time ($T_{02}$) of the backward direction measurement packet in the forward direction.

Further, each slave node, according to the time-keeping of the internal clock, stores four times of the received time ($T_{11}$, $T_{21}$) and the sending time ($T_{12}$, $T_{22}$) of the forward direction measurement packet, and the received time ($T_{13}$, $T_{23}$) and the sending time ($T_{14}$, $T_{24}$) of the backward direction measurement packet. Here, the received time of the forward direction measurement packet (the first measurement packet) and the sending time of the backward direction measurement packet (the second measurement packet) make a pair, and the sending time of the forward direction measurement packet and the received time of the backward direction measurement packet make a pair.

The slave node A which receives the measurement result notifying packet after correction from the master node calculates the time correction value using a pair of the sending time ($T_{01}$) of the forward direction measurement packet and the received time ($T_{02}$) of the backward direction measurement packet shown in the measurement result notifying packet after correction and a pair of the received time ($T_{21}$) of the forward direction measurement packet and the sending time ($T_{24}$) of the backward direction measurement packet stored by the slave node A.

The time correction value ΔT at the slave node B is obtained by the following.

$$\Delta T = \{(T_{01}+T_{02})-(T_{11}+T_{14})\}/2$$

Then, the calculated time correction value is used for the stored sending time ($T_{12}$) of the forward direction measurement packet and the received time ($T_{13}$) of the backward direction measurement packet, the sending time after correction of the forward direction measurement packet and the received time after correction of the backward direction measurement packet are calculated, and the measurement result notifying packet after correction showing the sending time after correction of the forward direction measurement packet and the received time after correction of the backward direction measurement packet are sent to the next slave node B.

As has been discussed, excluding relay processing time at each slave from the measured value used for calculating the time correction value, the time correction value is calculated sequentially from the node located closer to the master, so that it is possible to accomplish time synchronization without influence of fluctuation of relay processing time at the relay nodes existing between the master and that slave.

Further, the process of the slave can be uniformed and simplified. Further, all slaves send the measurement packet after repeating, so that the measurement packet can be circulated quickly.

As discussed above, in the present embodiment, the slave node apparatus including the following means has been explained.

(a) means to receive a packet from the forward direction transmission channel or the backward direction transmission channel, send the received packet to the next node, and as well determine a type of packet;

(b) if the packet type is the backward direction measurement packet, means to store a packet received time as a backward direction received time, and store a packet sending time as a backward direction sending time;

(c) if the packet type is the forward direction measurement packet, means to store a packet received time as a forward direction received time, and store a packet sending time as a forward direction sending time;

(d) if the packet type is the measurement result notifying packet after correction, means to calculate a time correction value; (e) using the calculated time correction value, means to correct values of a received time and a sending time obtained by the own node and send the values to the next node as measurement result notifying packet after correction; and (f) using the calculated time correction value, means to adjust a time of a clock of the own node.

Finally, the configuration example of the time synchronizing apparatus 100 shown in the first and second embodiments will be explained.

FIG. 31 shows an example of hardware resource of the time synchronizing apparatus 100 shown in the first and second embodiments. Here, the configuration of FIG. 31 shows merely one of examples of hardware configuration of the time synchronizing apparatus 100; and the hardware configuration of the time synchronizing apparatus 100 is not limited to the configuration shown in FIG. 31, but can be another configuration.

In FIG. 31, the time synchronizing apparatus 100 includes a CPU 911 (Central Processing Unit; also called as a central processing device, a processing device, an operation device, a micro-processor, a micro-computer, and a processor) executing programs. The CPU 911 is connected via a bus 912 to for example, a ROM (Read Only Memory) 913, a RAM (Random Access Memory) 914, a communication board 915, a display device 901, a keyboard 902, a mouse 903, and a magnetic disk drive 920, and controls these hardware devices. Moreover, the CPU 911 can be connected to a FDD 904 (Flexible Disk Drive), a compact disk drive 905 (CDD), a printer device 906, and a scanner device 907. Further, instead of the magnetic disk drive 920, it can be connected to a memory device such as an optical disk drive, and a memory card reader/writer device, etc.

The RAM 914 is an example of a volatile memory. Storage medium of the ROM 913, the FDD 904, the CDD 905, and the magnetic disk drive 920 are examples of a non-volatile memory. These are examples of the memory device or the memory unit.

The communication board 915, the keyboard 902, the scanner device 907, and the FDD 904, etc. are examples of the inputting unit and the inputting device.

Further, the communication board 915, the display device 901, and the printer device 906, etc. are examples of the outputting unit and the outputting device.

The communication board 915 is, as shown in FIG. 3, connected to the ring type network. Further, the communication board 915 can be connectable to, for example, a LAN (local area network), the Internet, a WAN (wide area network), etc.

The magnetic disk drive 920 stores an operating system 921 (OS), a window system 922, a group of programs 923, and a group of files 924. Programs of the group of programs 923 are executed by the CPU 911, the operating system 921, and the window system 922.

The above group of programs 923 store programs executing functions explained in the first and second embodiments as "--unit" and "--means". The programs are read and executed by the CPU 911.

The group of files 924 store information, data, signal values, variable values, or parameters showing processed result explained in the first and second embodiments as "determination of--", "operation of--", "calculation of--", "comparison of--", "obtainment of--", "update of--", "setting of--", and "registration of--", etc. as each item of "--file" or "--database". "--file" or "--database" is stored by the recording medium such as disks or memories, etc. The information, data, signal values, variable values, or parameters stored in the storage medium such as disks or memories, etc. are read by the CPU 911 via the reading/writing circuit to a main memory or a cache memory, and used for the operation of the CPU such as extraction, search, reference, comparison, operation, calculation, processing, edition, output, print, and display, etc. During the operation of the CPU of extraction, search, reference, comparison, operation, calculation, processing, edition, output, print, and display, the information, data, signal values, variable values, or parameters are temporarily stored in the main memory, a register, the cache memory, and a buffer memory, etc.

Further, an arrow part of the flowcharts explained in the first and second embodiments mainly shows input/output of data or signals, and data or signal values are stored in recording medium such as a memory of the RAM 914, a flexible disk of the FDD 904, a compact disk of the CDD 905, a magnetic disk of the magnetic disk drive 920, and other optical disk, mini disk, DVD, etc. Further, data or signals are transmitted online by the bus 912, signal lines, cables, and other transmission medium.

Further, "--unit" and "--means" explained in the first and second embodiments can be "--circuit", "--device", and "--equipment", and can be also "--step", "--procedure", and "--process". That is, "--unit" and "--means" can be implemented by the firmware stored in the ROM 913. Or it is also possible to implement only by software, only by hardware such as elements, devices, boards, and wirings, etc., or a combination of software and hardware, and a combination further with firmware. The firmware and software are stored as programs in the recording medium such as the magnetic disk, the flexible disk, the optical disk, the compact disk, the mini disk, the DVD, etc. The programs are read by the CPU 911, and executed by the CPU 911. That is, the programs are to function a computer as "--unit" and "--means" in the first and second embodiments. Or the programs are to have the computer execute procedures or methods of "--unit" and "--means" in the first and second embodiments.

Like this, the time synchronizing apparatus 100 shown in the first and second embodiments is a computer including the CPU being the processing unit, memories and magnetic disks, etc. being the storage medium, a keyboard, a mouse, a communication board, etc. being the inputting devices, a display device, a communication board, etc. being the outputting device, and, as discussed above, is to implement functions shown as "--unit" and "--means" using these processing unit, the storage device, the inputting device, and the outputting device.

EXPLANATION OF SIGNS

Figure 1:
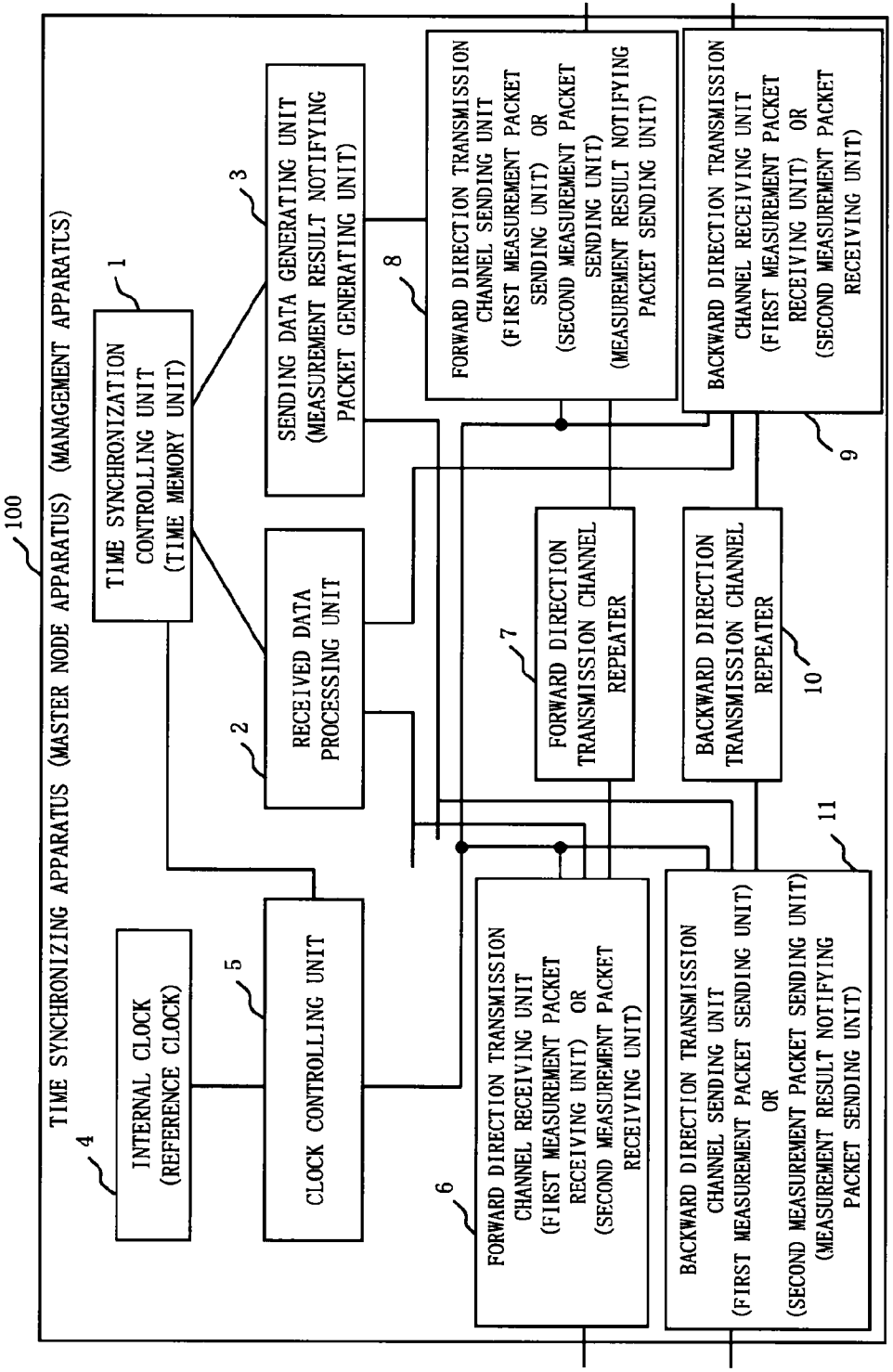
FIG. 1 shows a configuration example of a time synchronizing apparatus as a master node according to the first embodiment.
Figure 2:
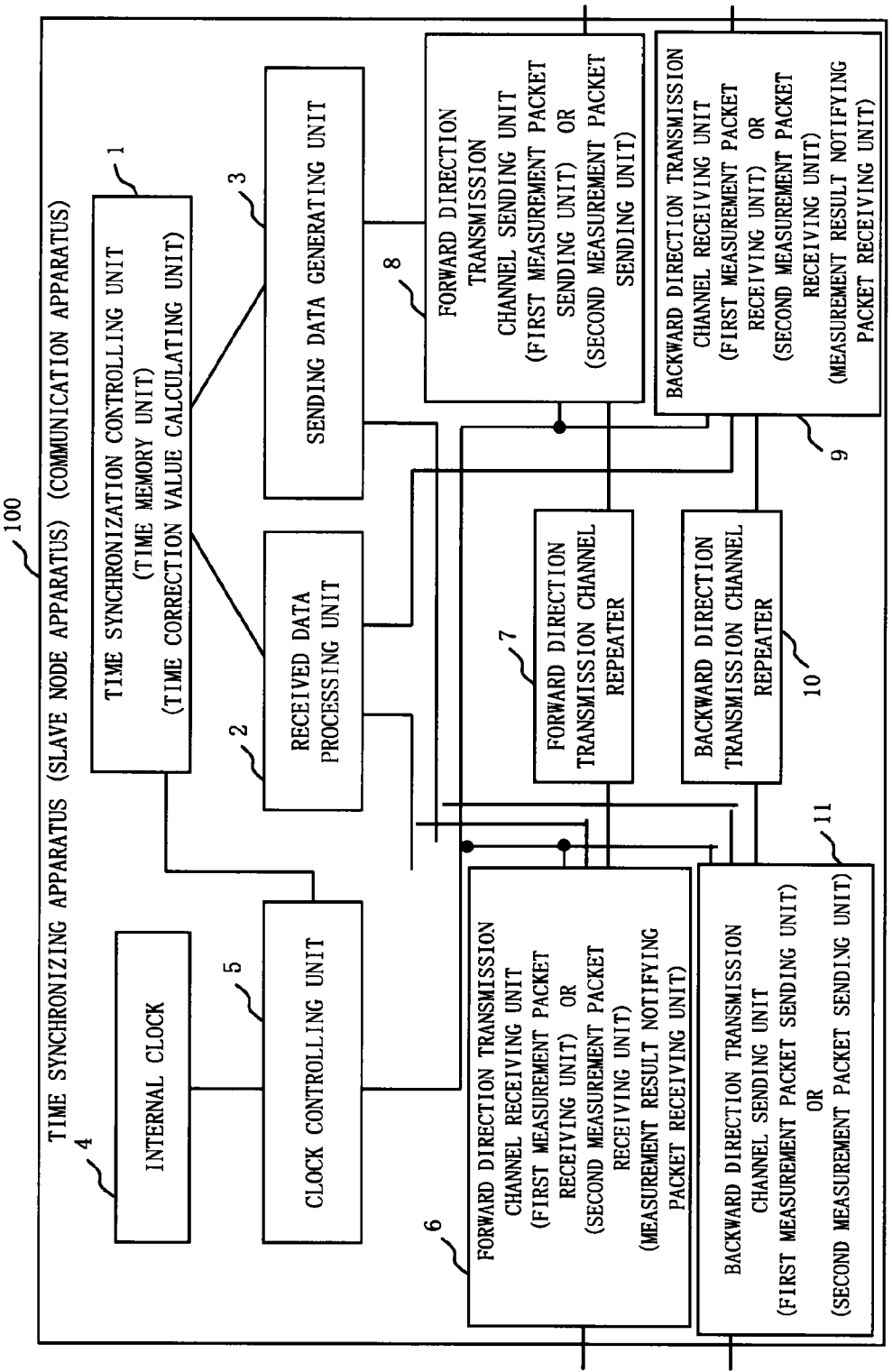
FIG. 2 shows a configuration example of a time synchronizing apparatus as a slave node according to the first embodiment.
Figure 3:
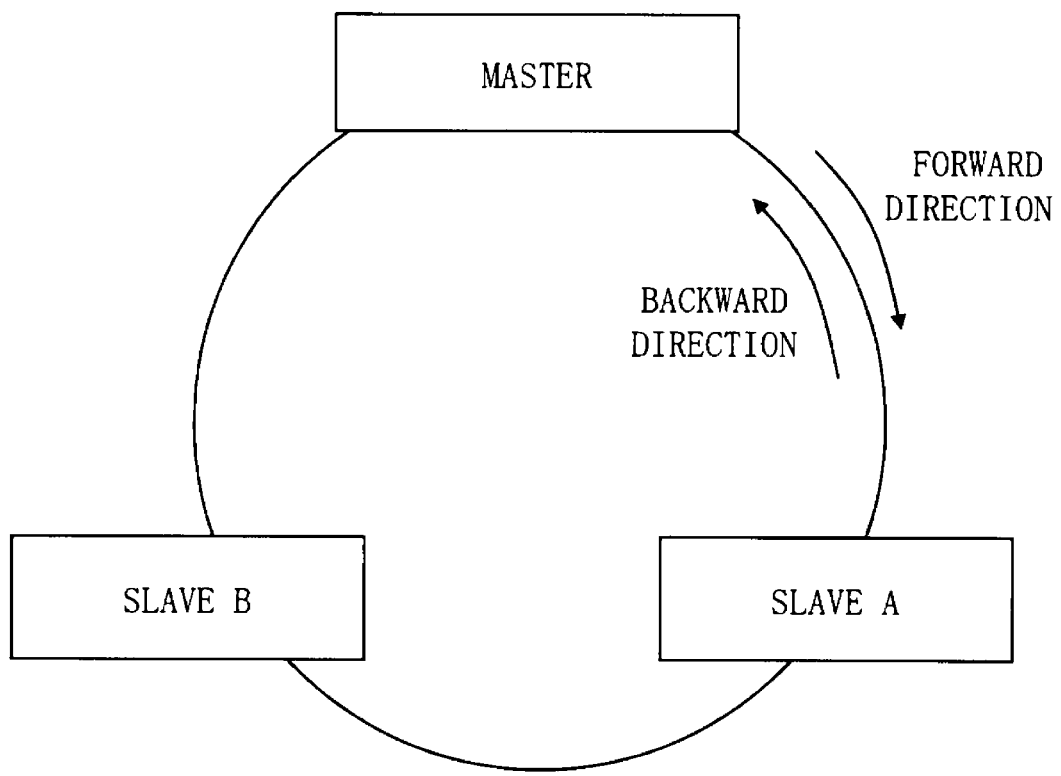
FIG. 3 shows a configuration example of a ring type network according to the first embodiment.
Figure 4:
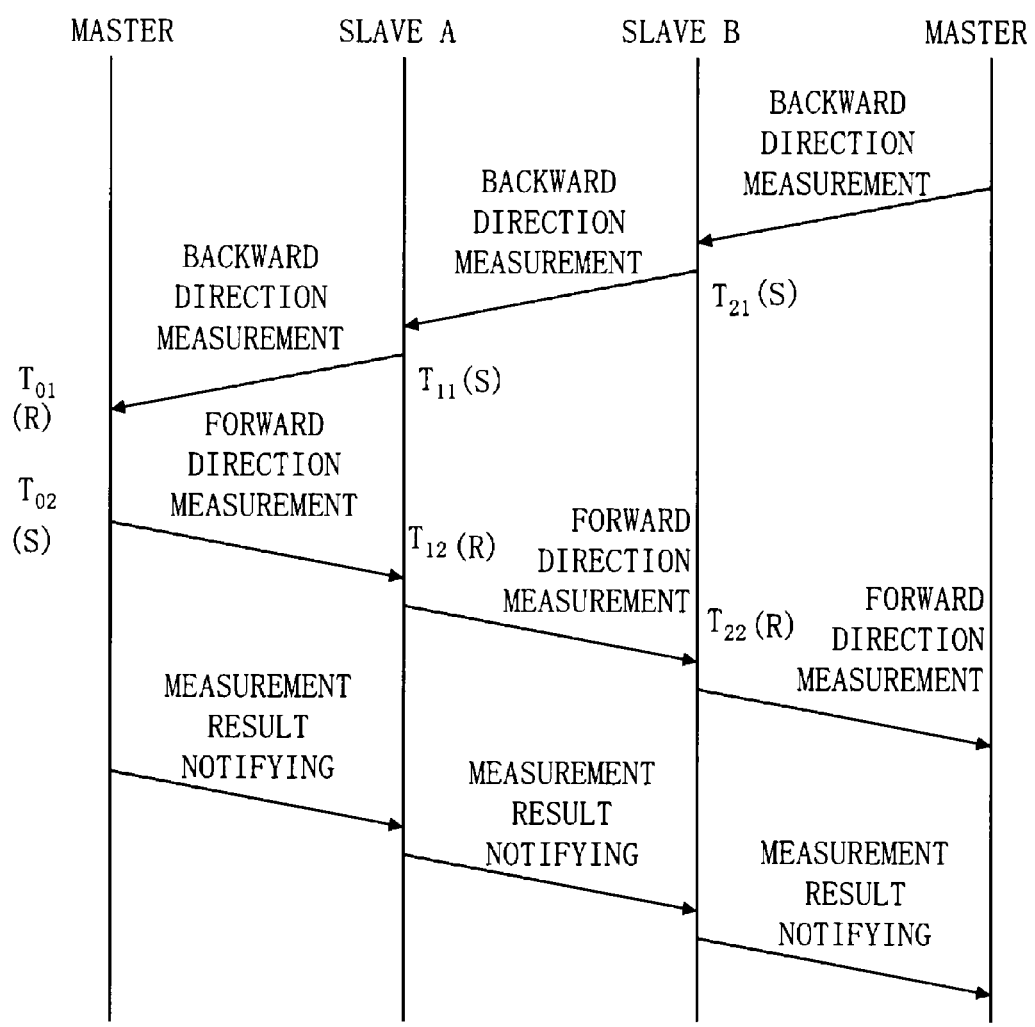
FIG. 4 shows an example of packet transfer between nodes according to the first embodiment.
Figure 5:
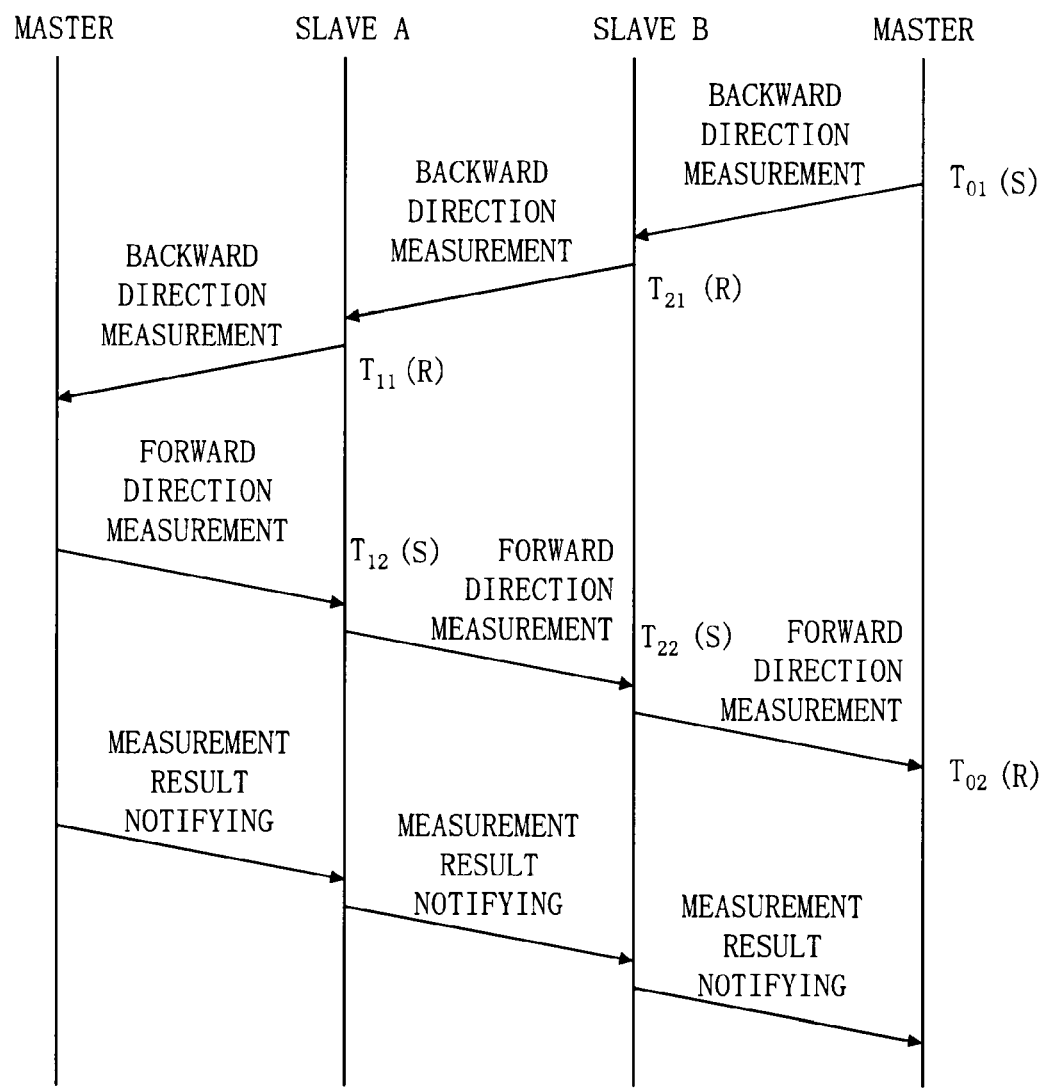
FIG. 5 shows an example of packet transfer between nodes according to the first embodiment.
Figure 6:
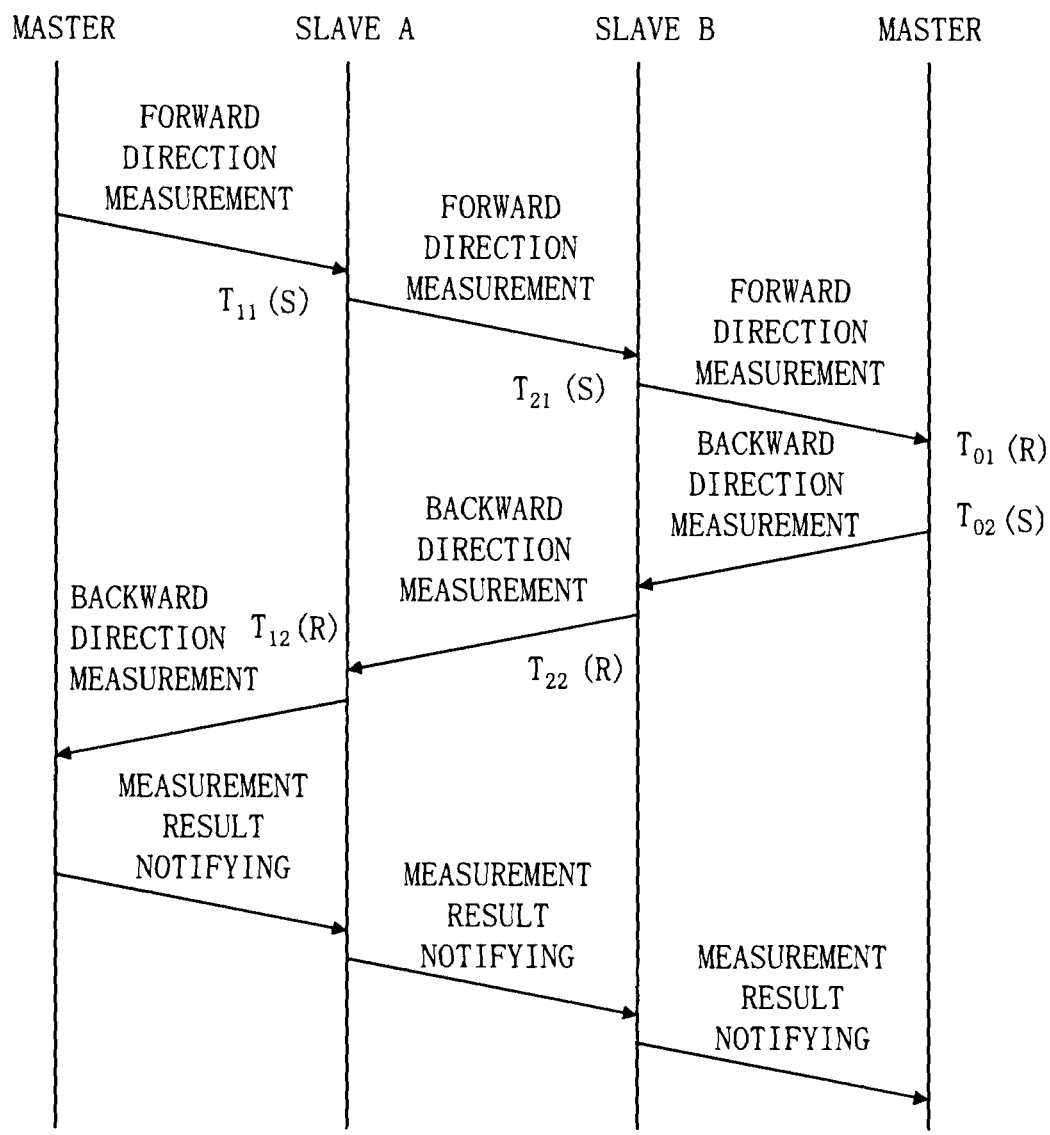
FIG. 6 shows an example of packet transfer between nodes according to the first embodiment.
Figure 7:
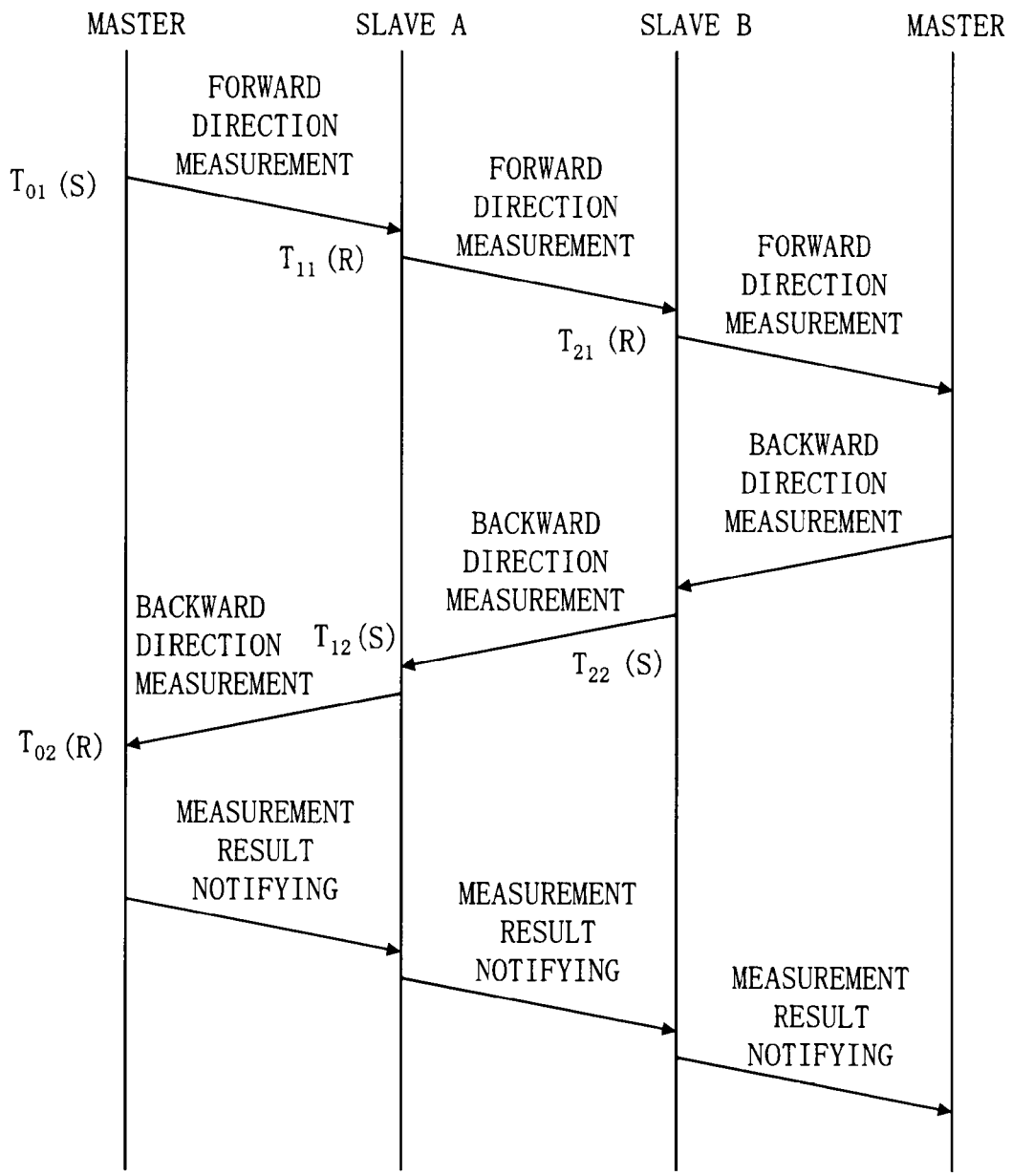
FIG. 7 shows an example of packet transfer between nodes according to the first embodiment.
Figure 8:
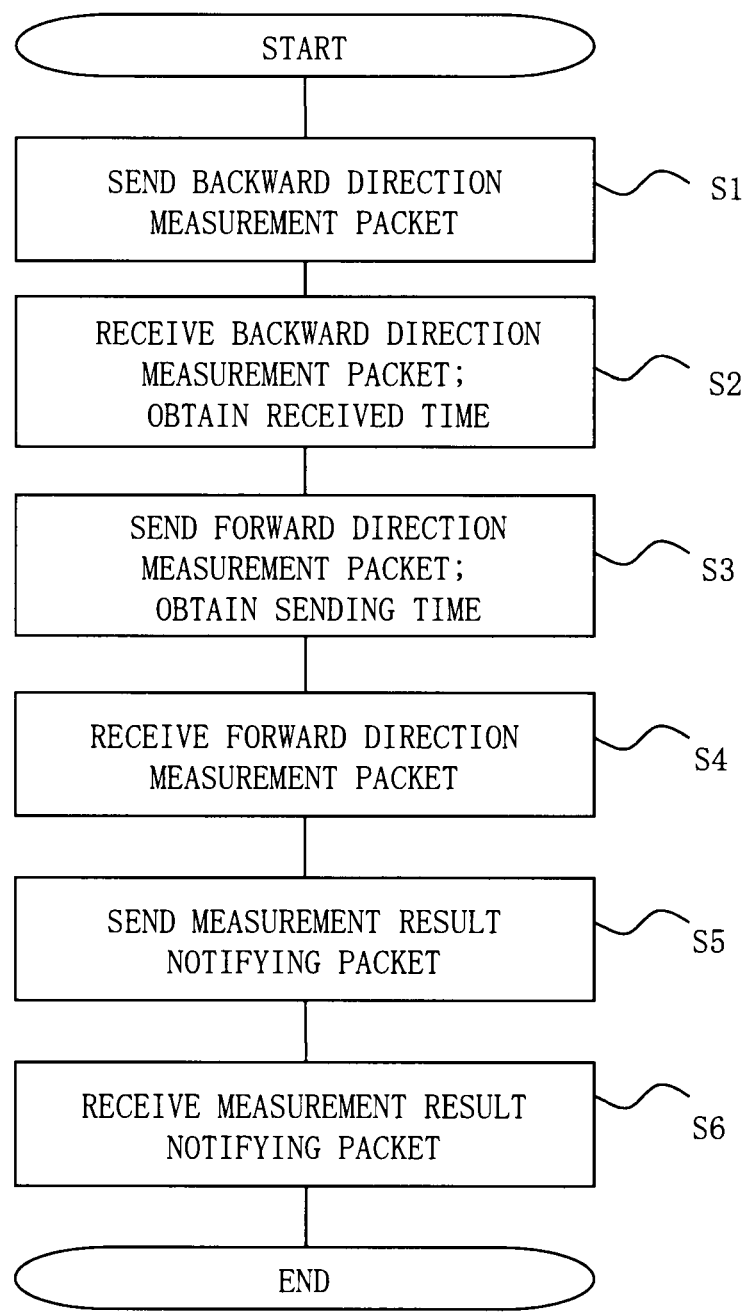
FIG. 8 is a flowchart showing an operation example of the master node according to the first embodiment.
Figure 9:
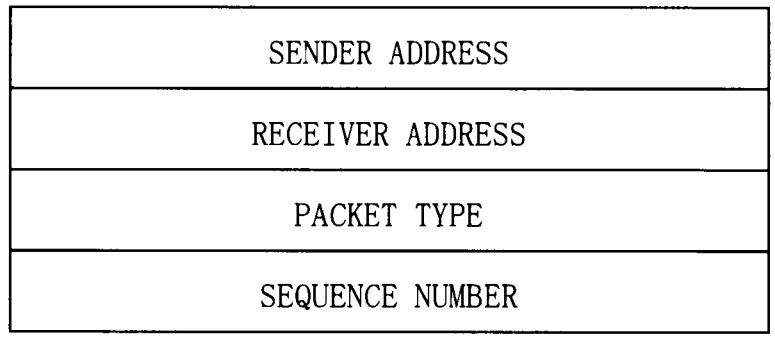
FIG. 9 shows an example of measurement packet according to the first embodiment.
Figure 10:
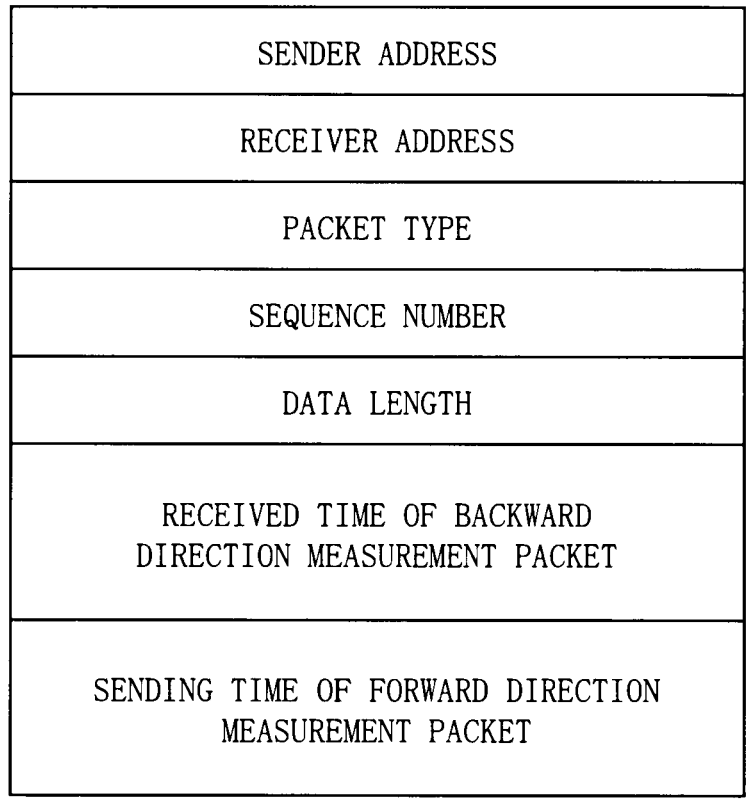
FIG. 10 shows an example of a measurement result notifying packet according to the first embodiment.
Figure 11:
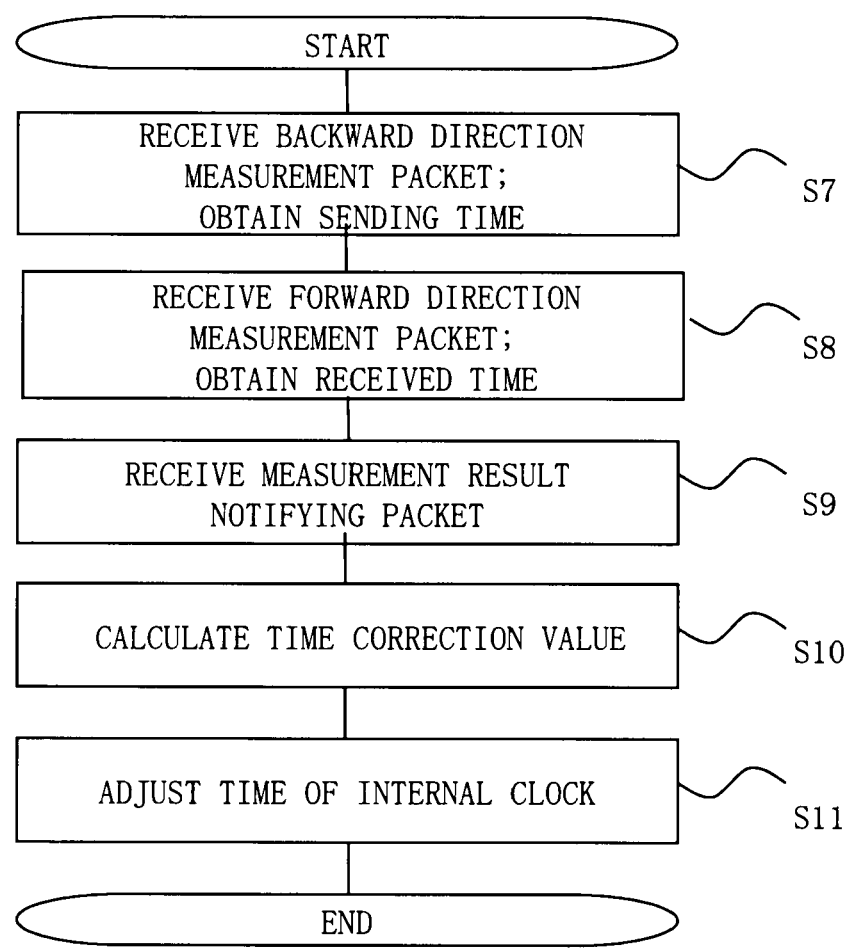
FIG. 11 is a flowchart showing an operation example of the slave node according to the first embodiment.
Figure 12:
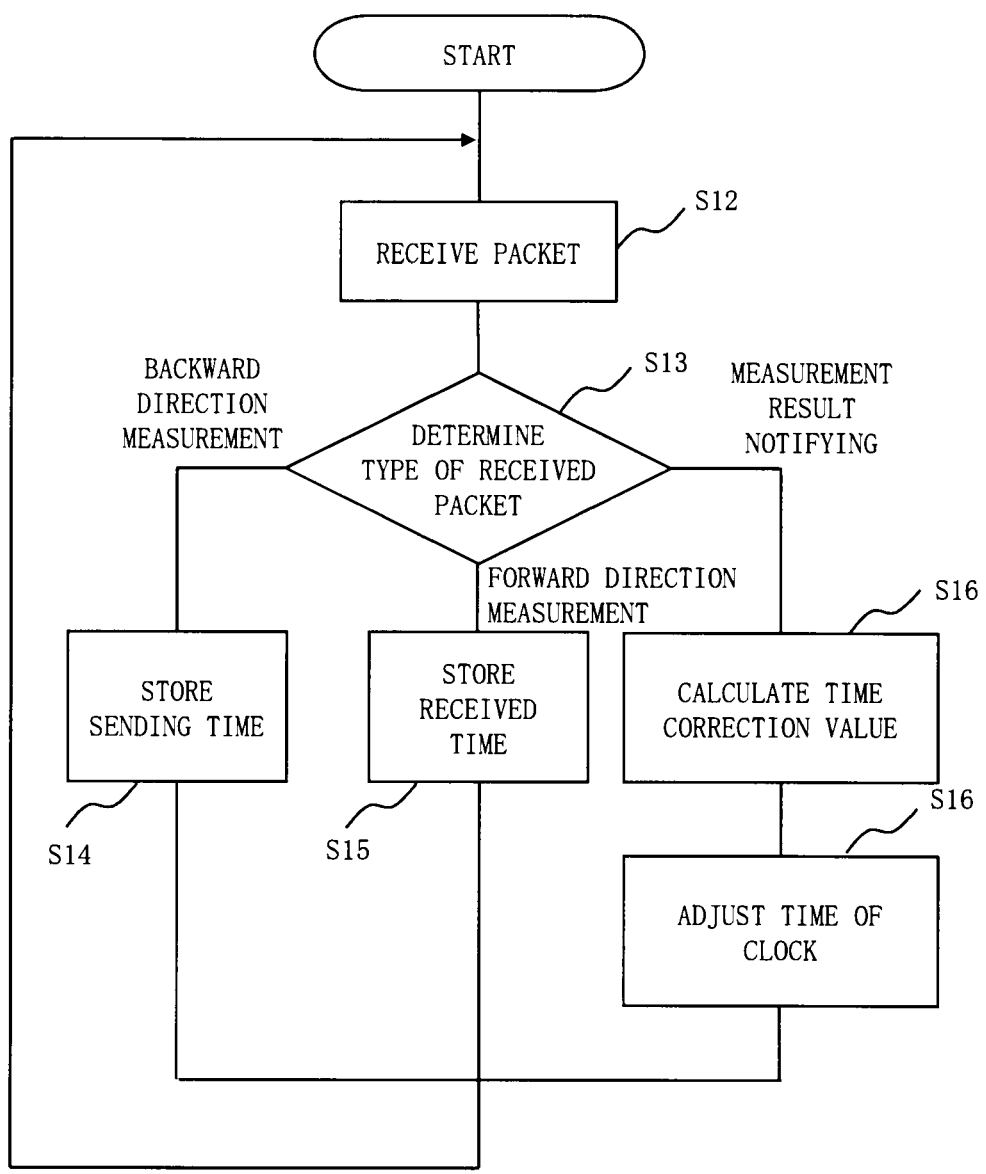
FIG. 12 is a flowchart showing an operation example of the slave node according to the first embodiment.
Figure 13:
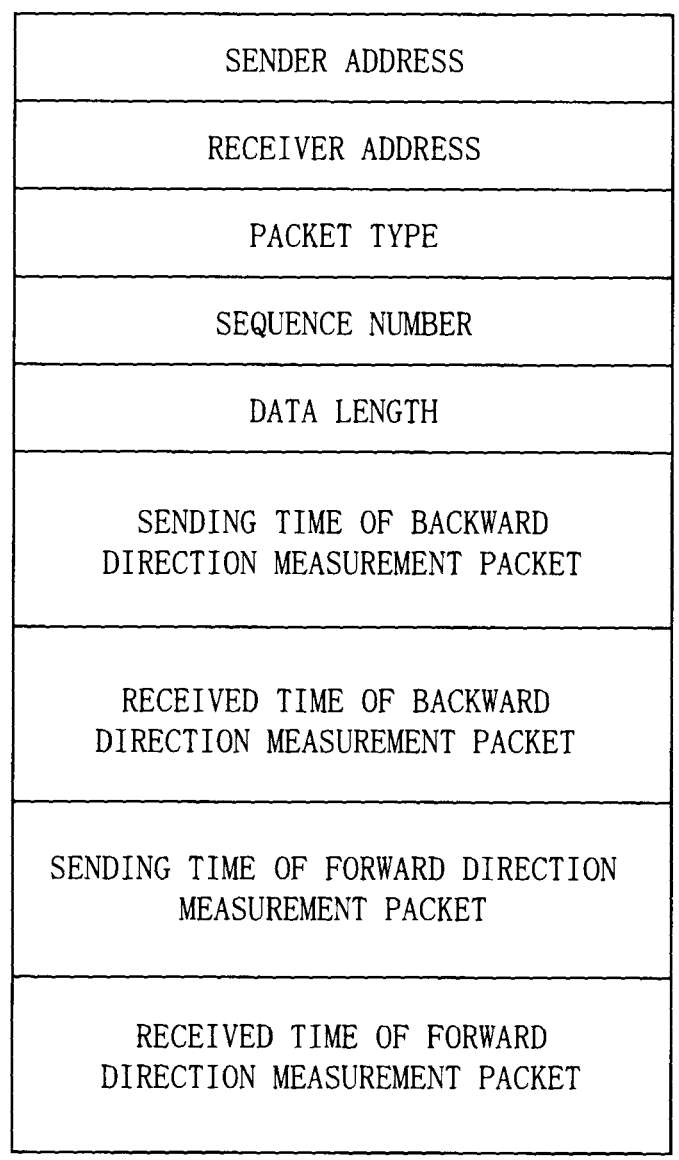
FIG. 13 shows an example of the measurement result notifying packet according to the first embodiment.
Figure 14:
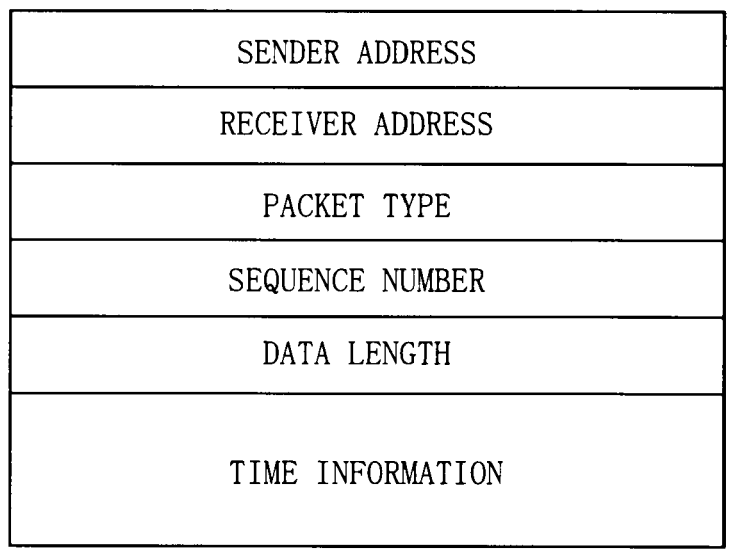
FIG. 14 shows an example of a backward direction measurement packet according to the first embodiment.
Figure 15:
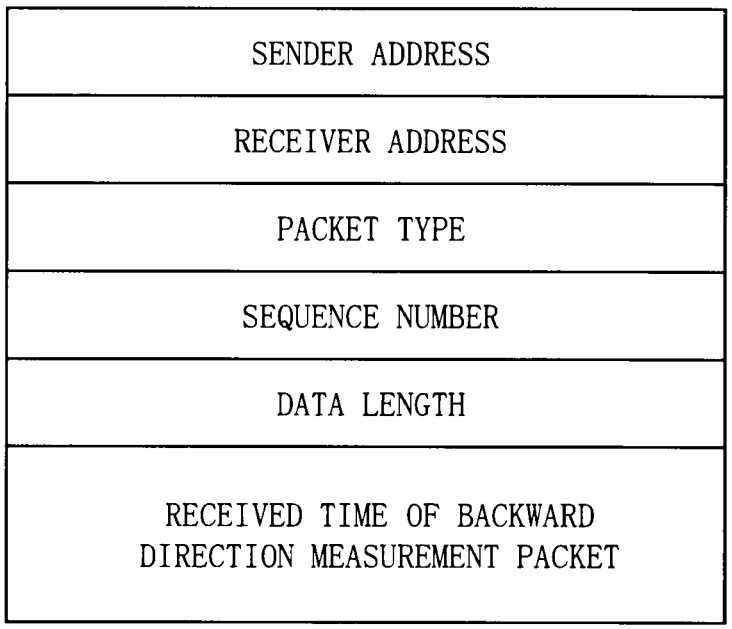
FIG. 15 shows an example of a forward direction measurement packet according to the first embodiment.
Figure 16:
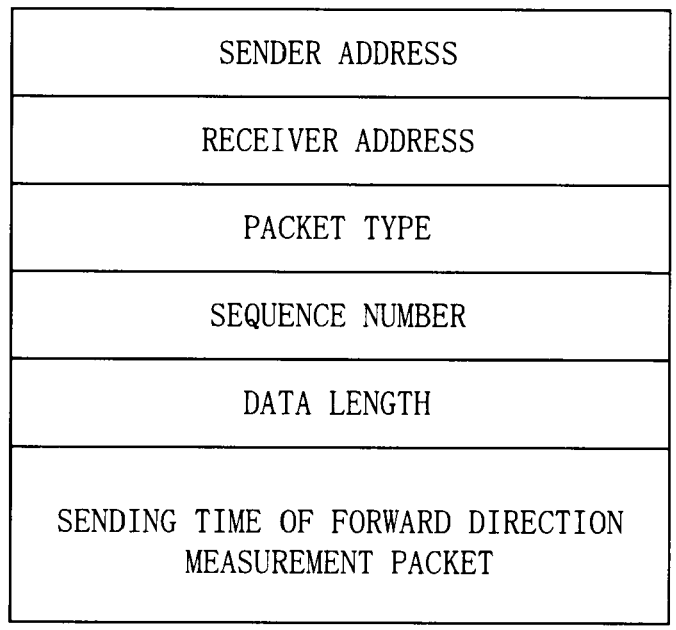
FIG. 16 shows an example of the measurement result notifying packet according to the first embodiment.
Figure 17:
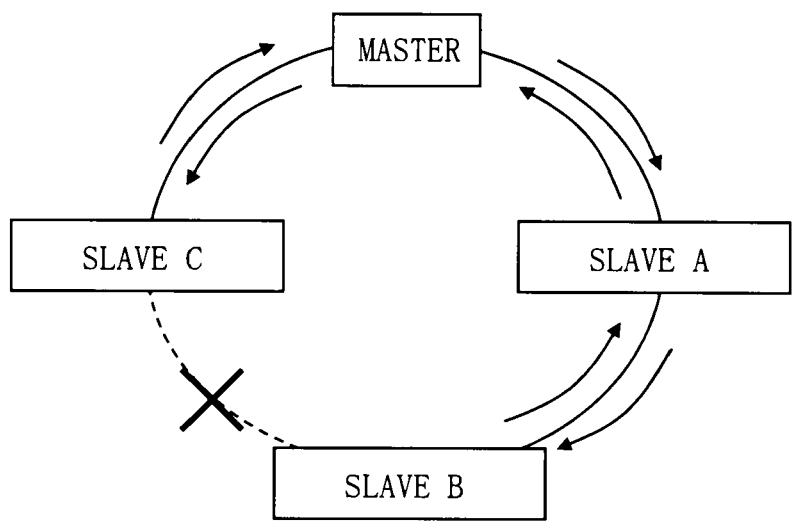
FIG. 17 shows an example of turn-back operation of the ring type network due to a partial communication failure according to the first embodiment.
Figure 18:
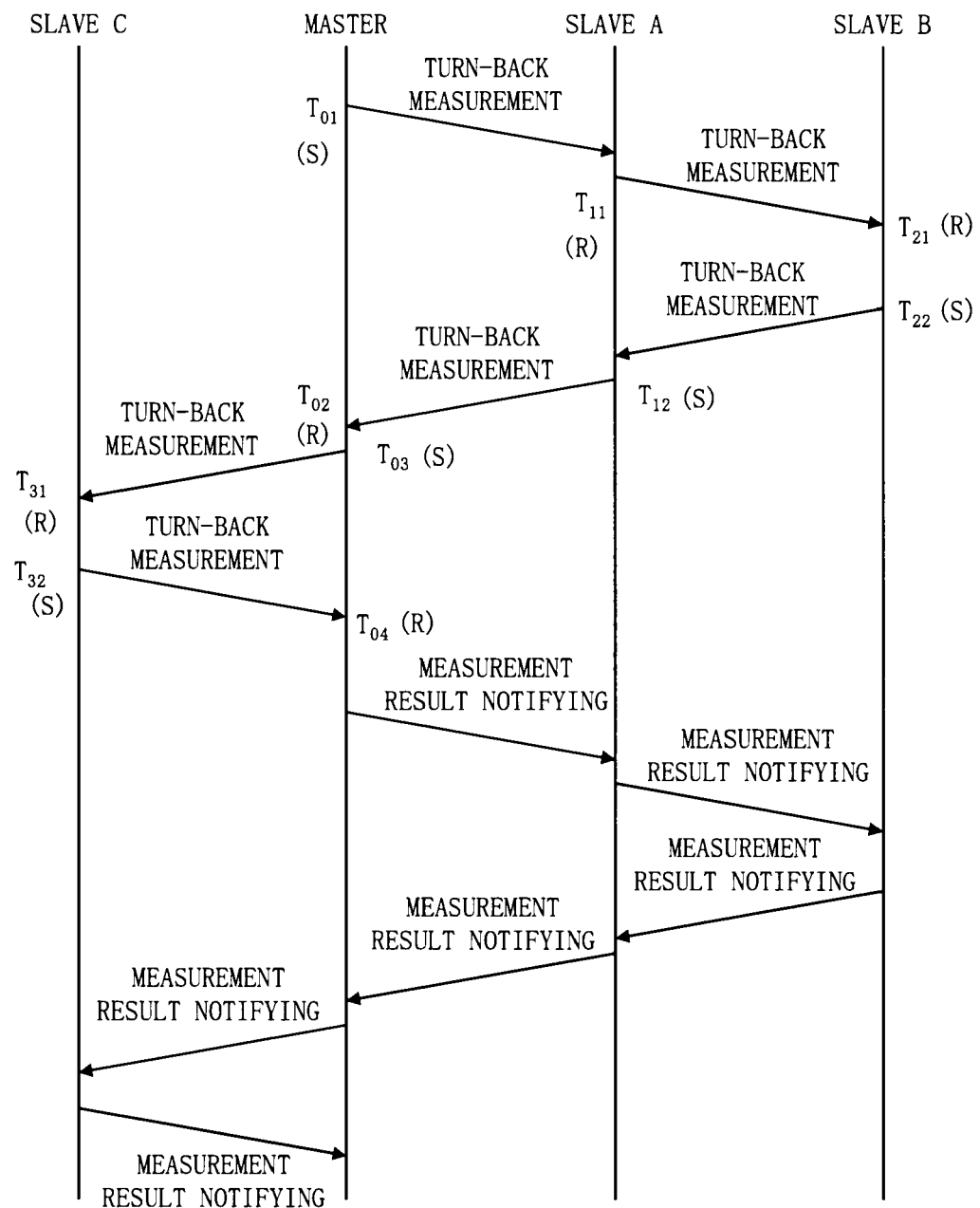
FIG. 18 shows an example of packet transfer between nodes in case of turn-back operation according to the first embodiment.
Figure 19:
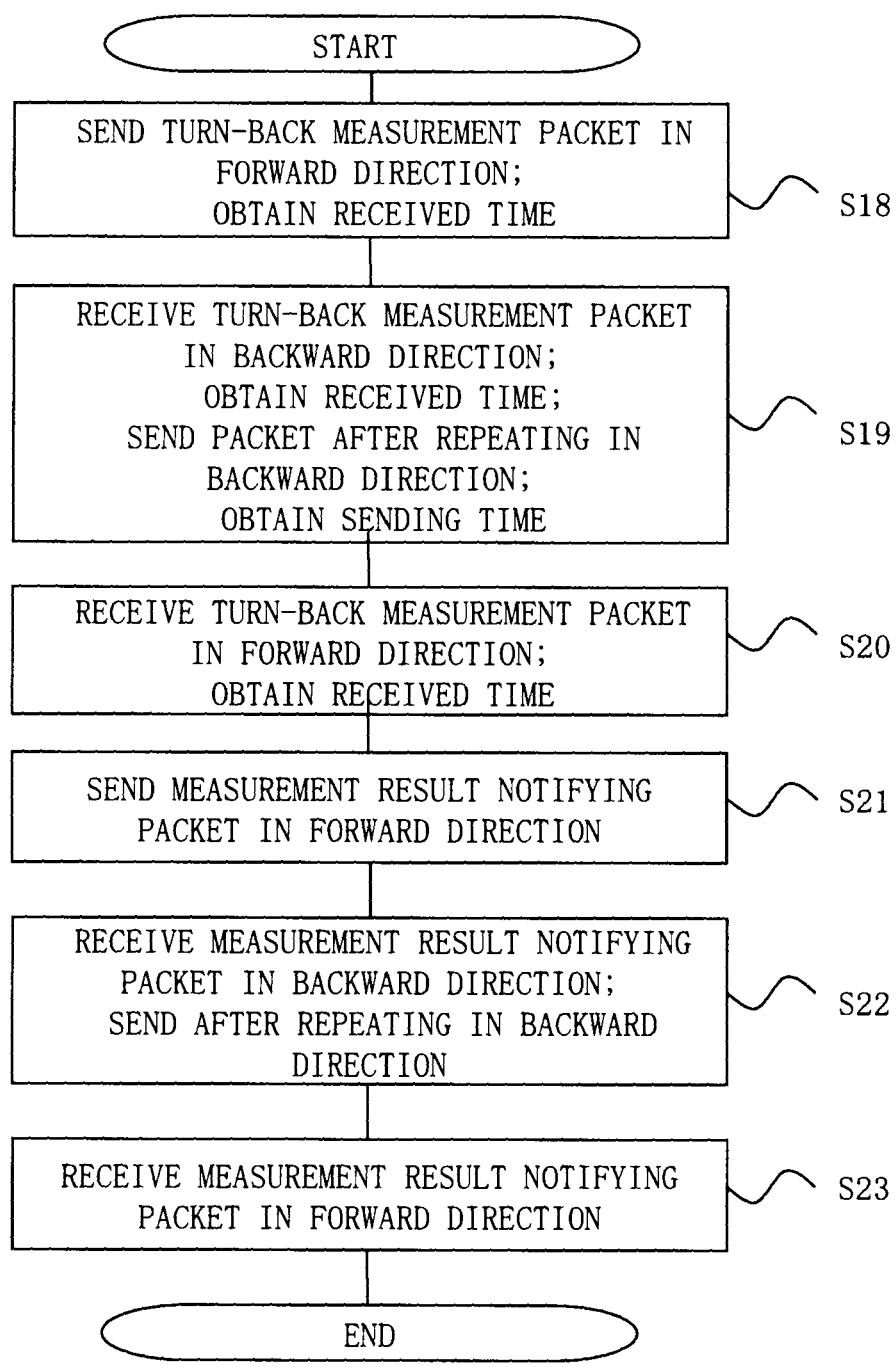
FIG. 19 is a flowchart showing an operation example of the master node in case of turn-back operation according to the first embodiment.
Figure 20:
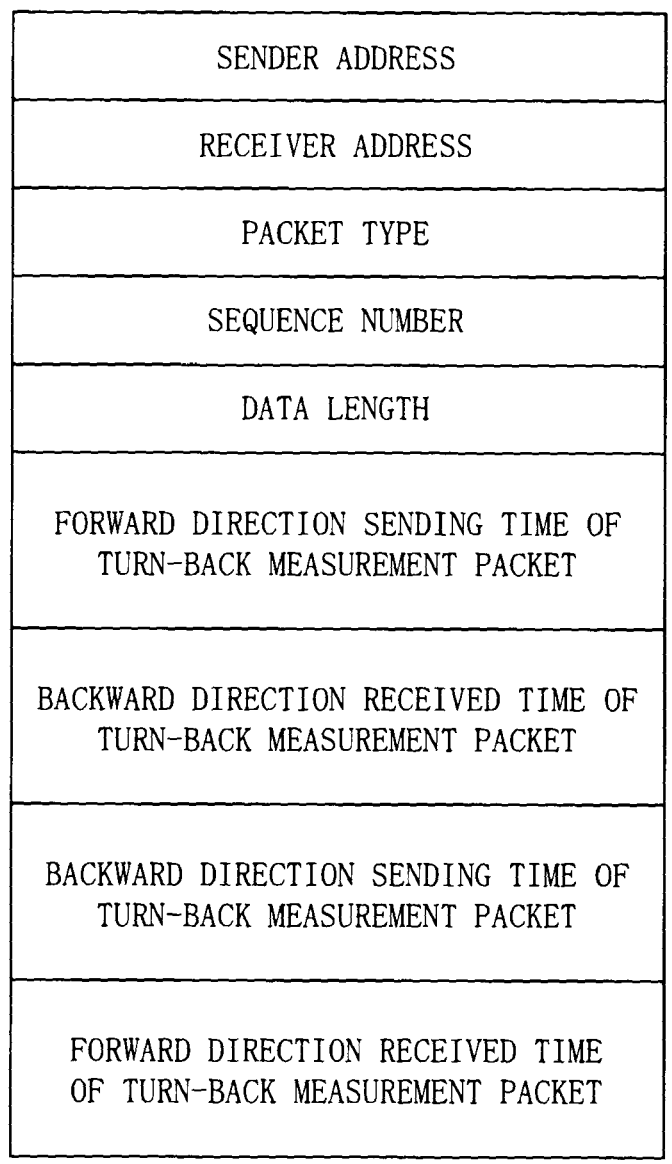
FIG. 20 shows an example of a measurement result notifying packet in case of the turn-back operation according to the first embodiment.
Figure 21:
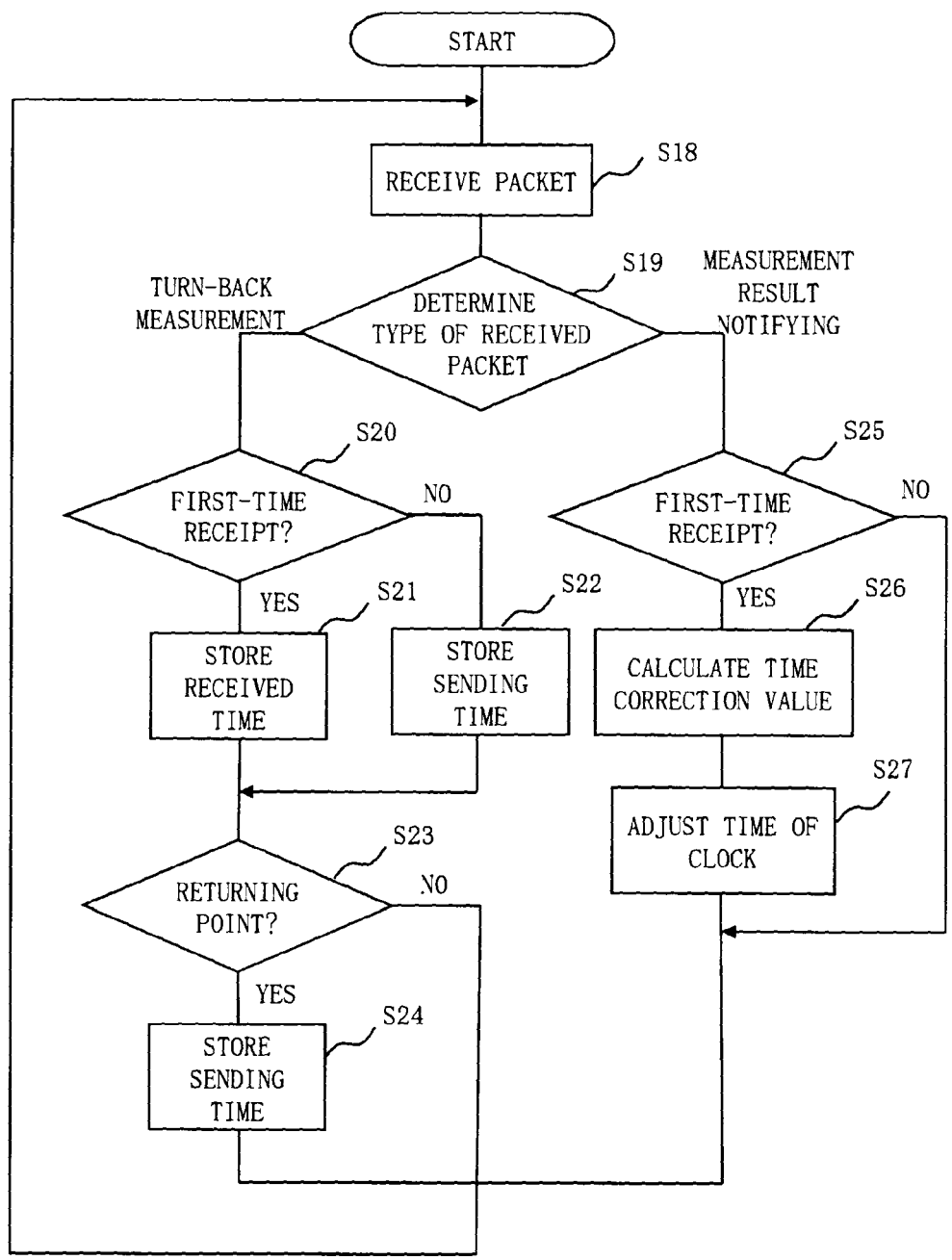
FIG. 21 is a flowchart showing an operation example of the slave node in case of the turn-back operation according to the first embodiment.
Figure 22:
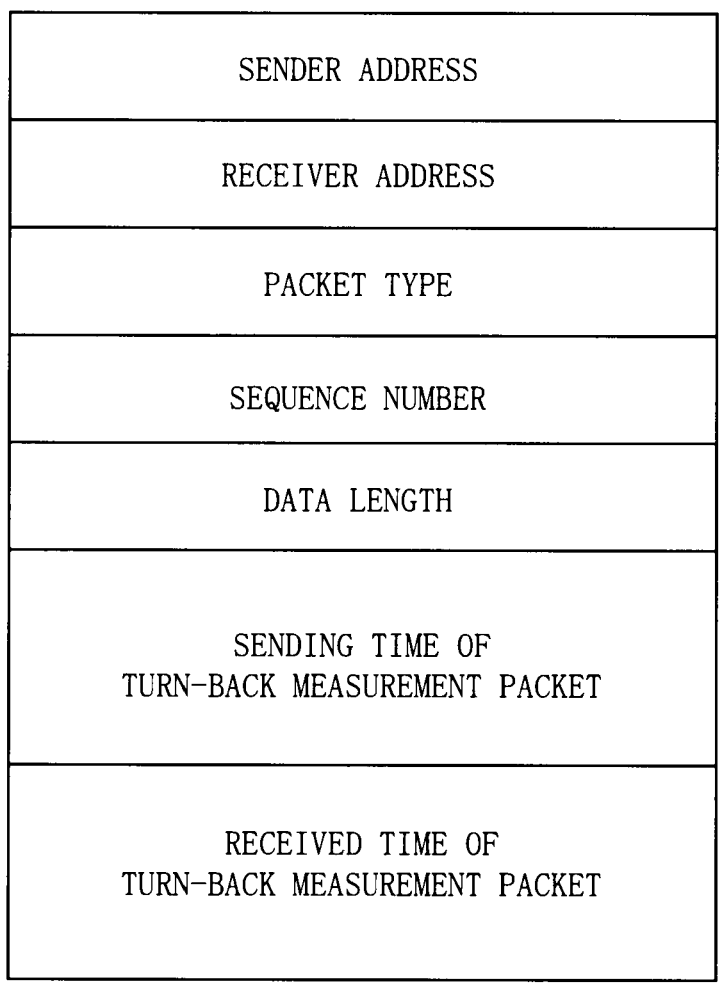
FIG. 22 shows an example of the measurement result notifying packet in case of the turn-back operation according to the first embodiment.
Figure 23:
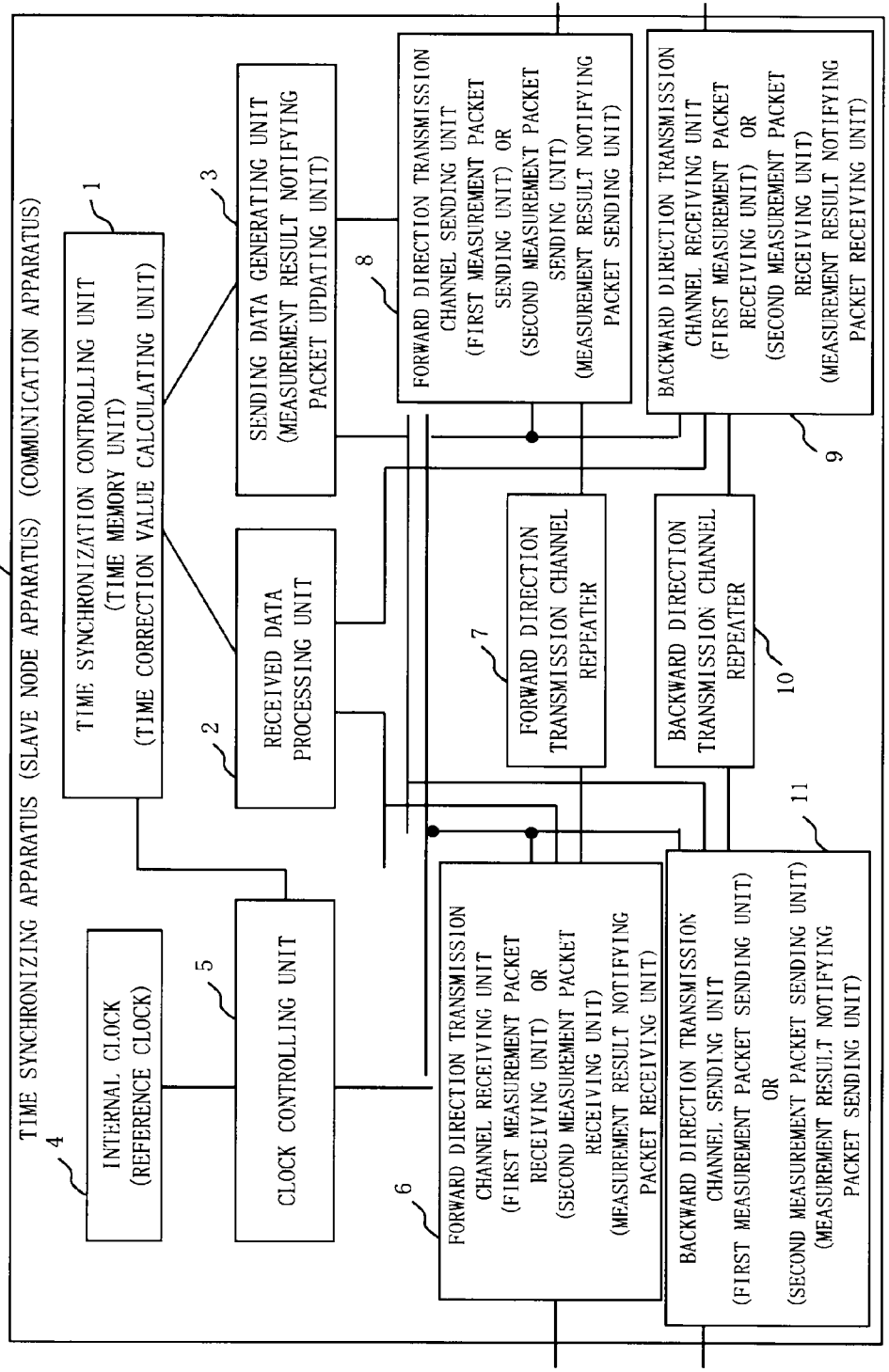
FIG. 23 shows a configuration example of a time synchronizing apparatus as a slave node according to the second embodiment.
Figure 24:
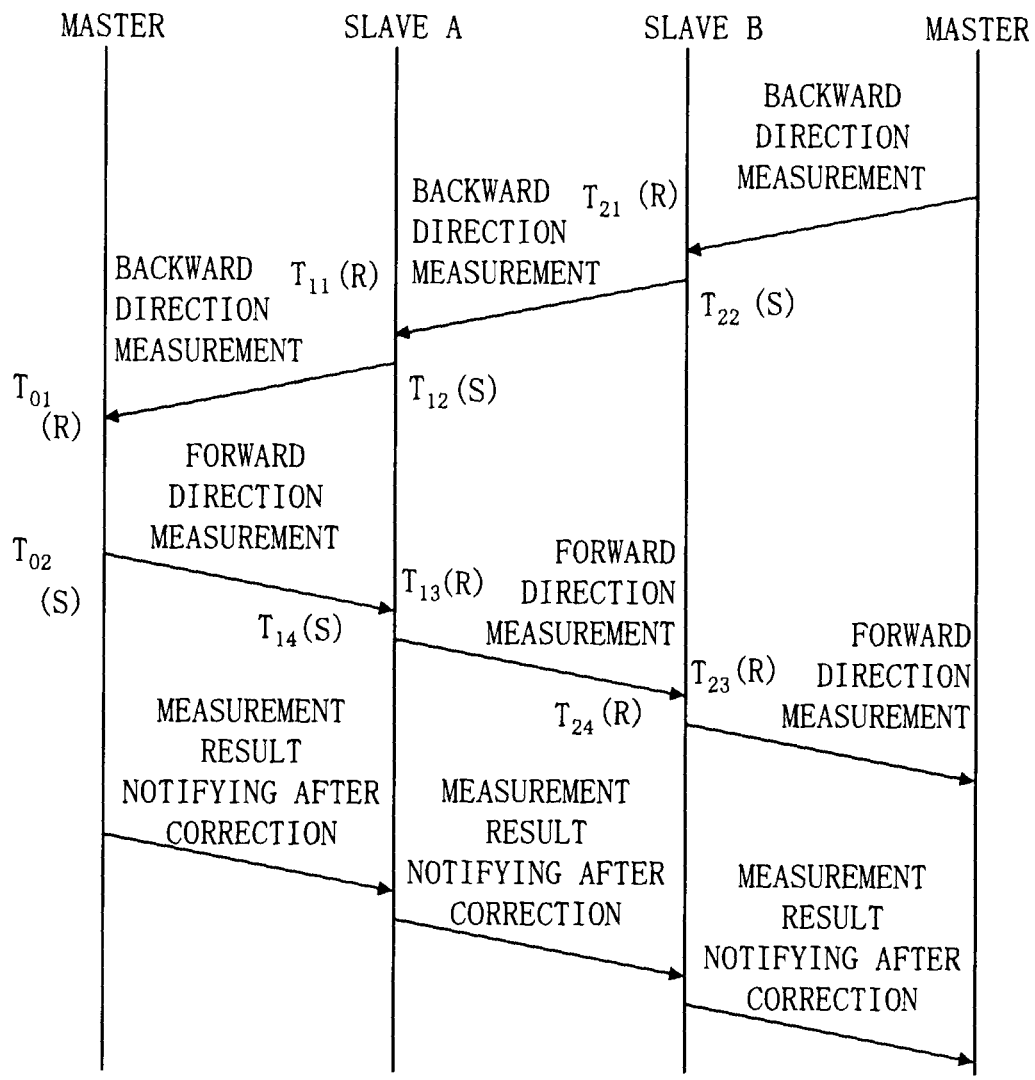
FIG. 24 shows an example of packet transfer between nodes according to the second embodiment.
Figure 25:
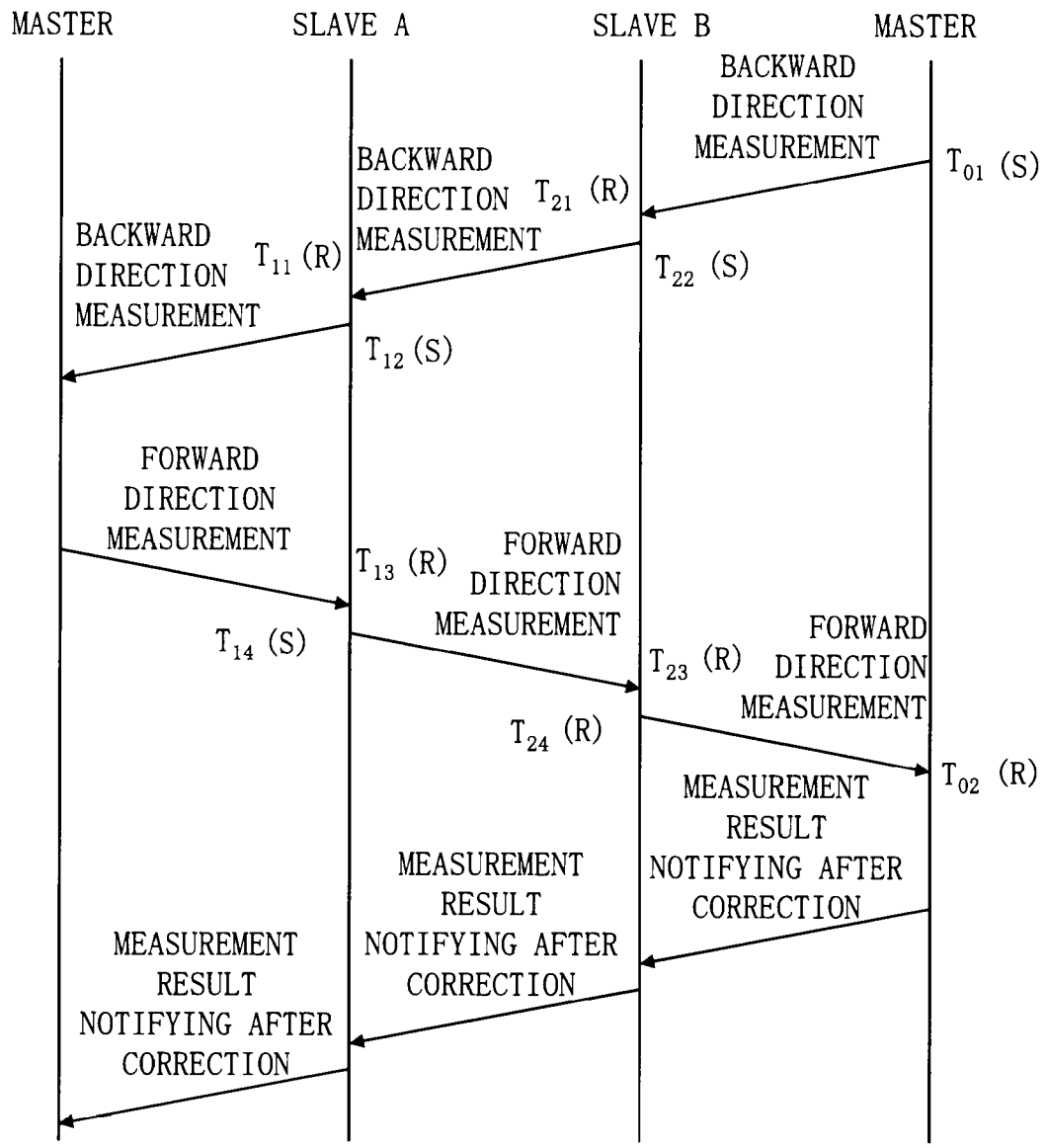
FIG. 25 shows an example of packet transfer between nodes according to the second embodiment.
Figure 26:
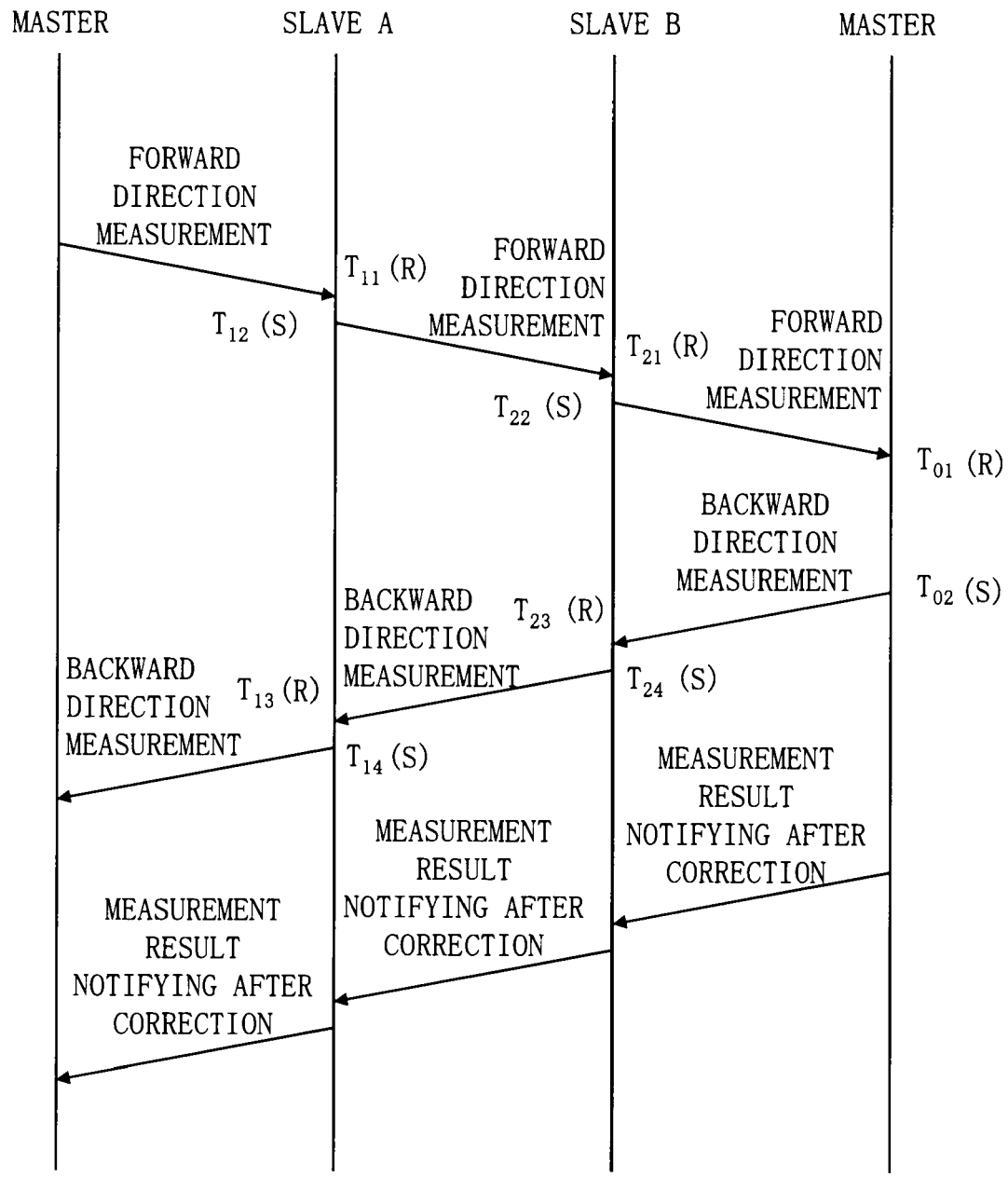
FIG. 26 shows an example of packet transfer between nodes according to the second embodiment.
Figure 27:
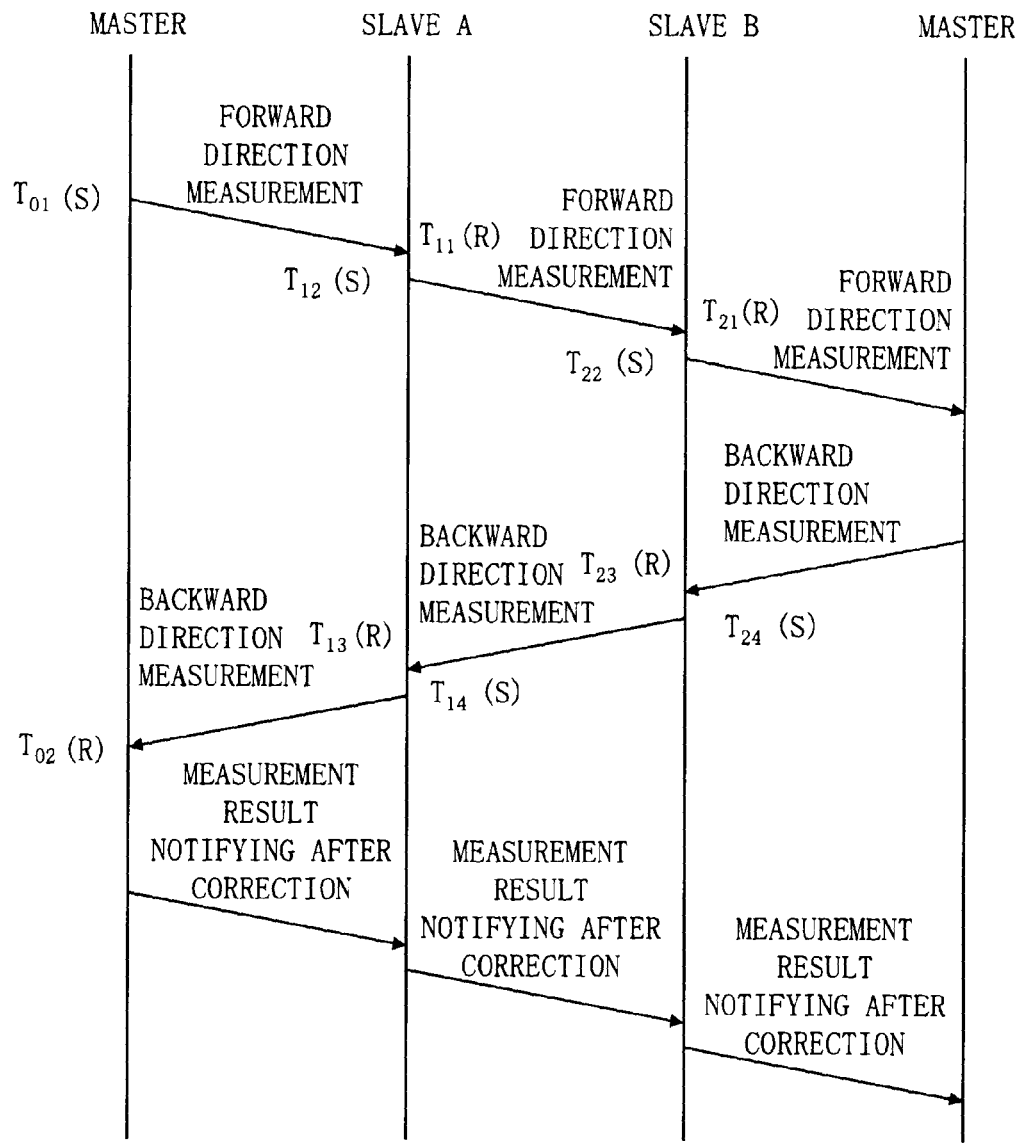
FIG. 27 shows an example of packet transfer between nodes according to the second embodiment.
Figure 28:
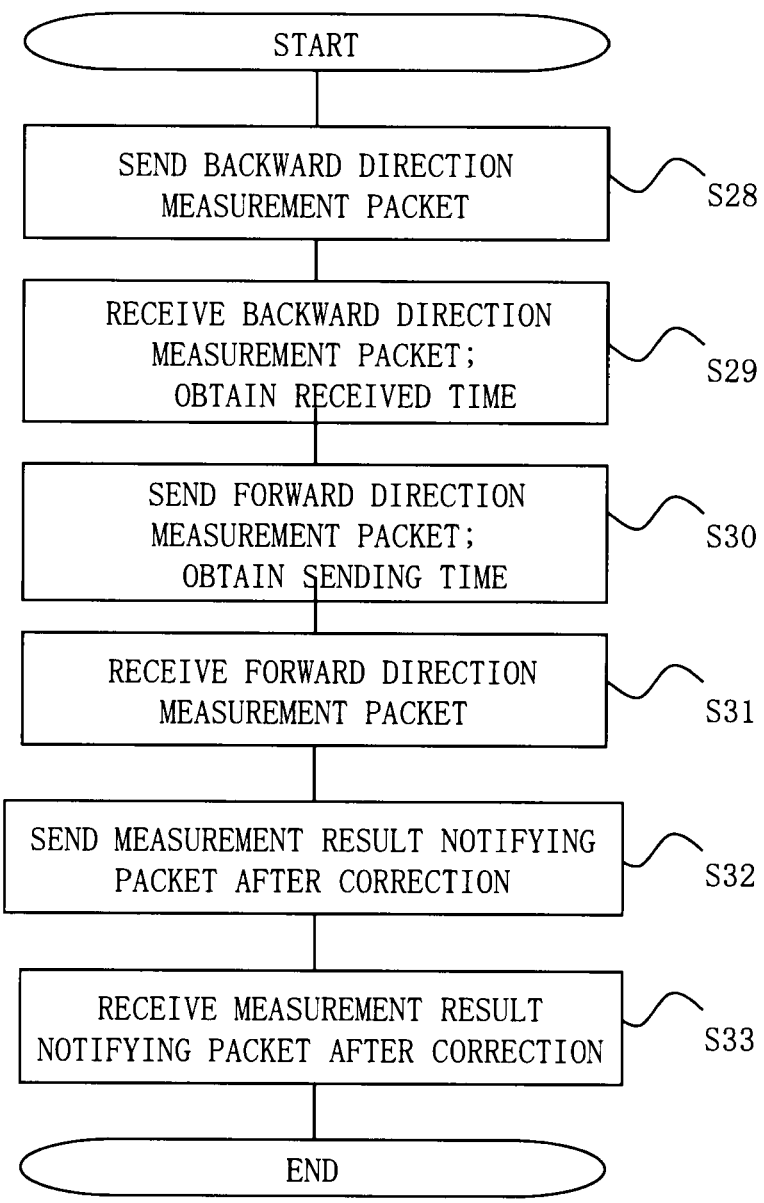
FIG. 28 is a flowchart showing an operation example of the master node according to the second embodiment.
Figure 29:
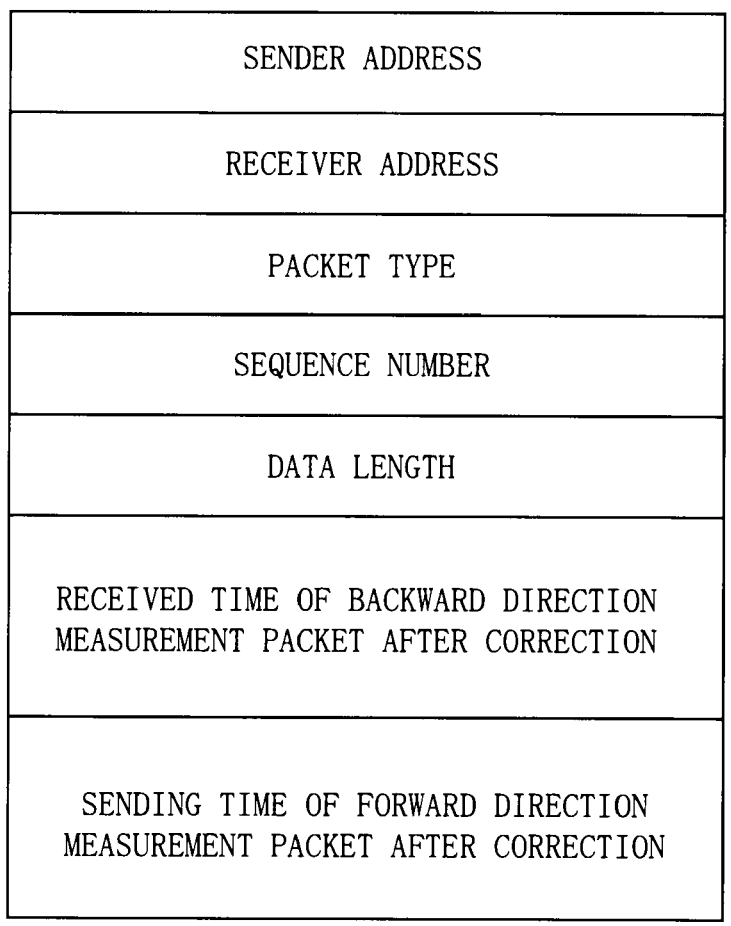
FIG. 29 shows an example of the measurement result notifying packet after correction according to the second embodiment.
Figure 30:
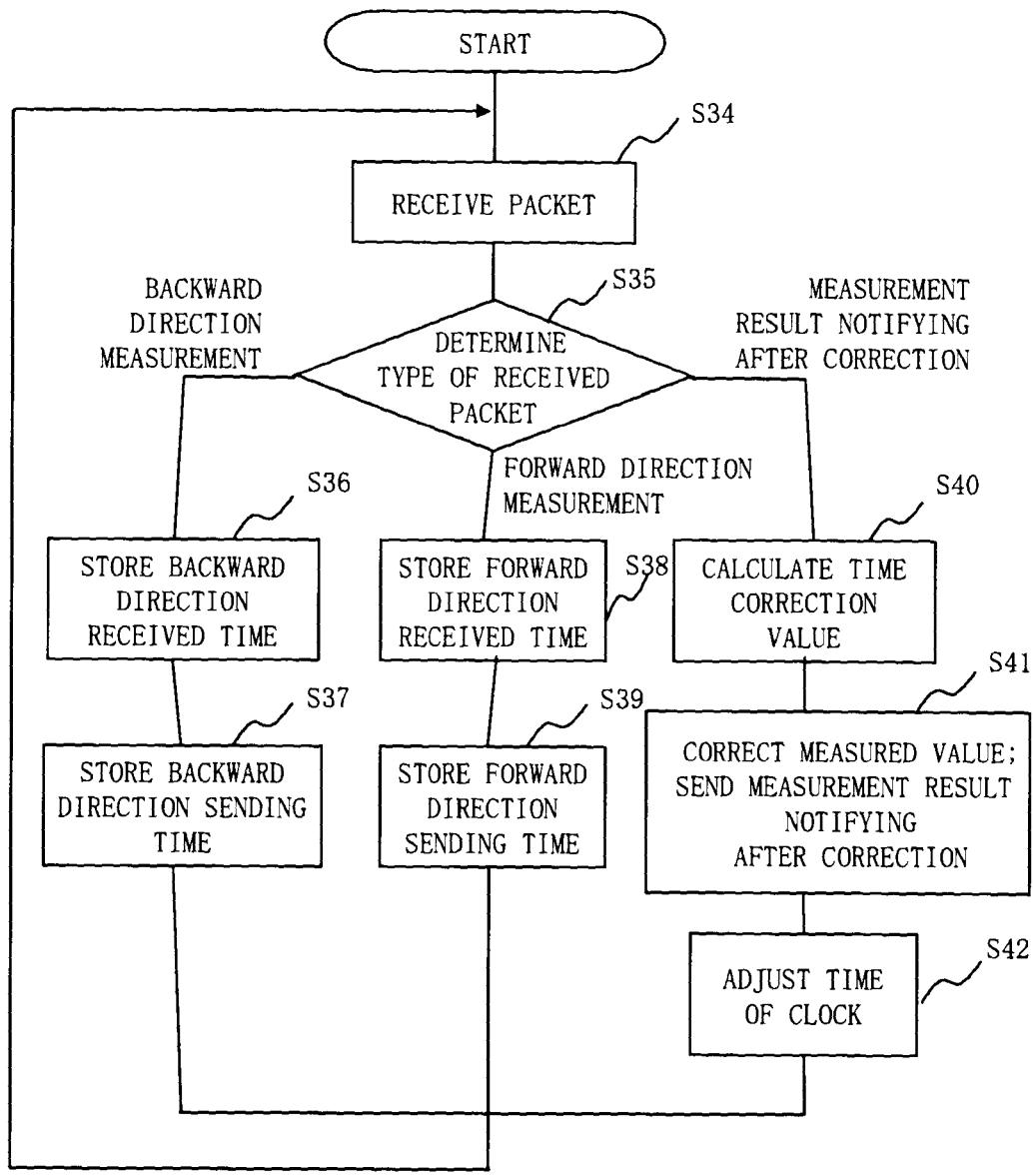
FIG. 30 is a flowchart showing an operation example of the slave node according to the second embodiment.
Figure 31:
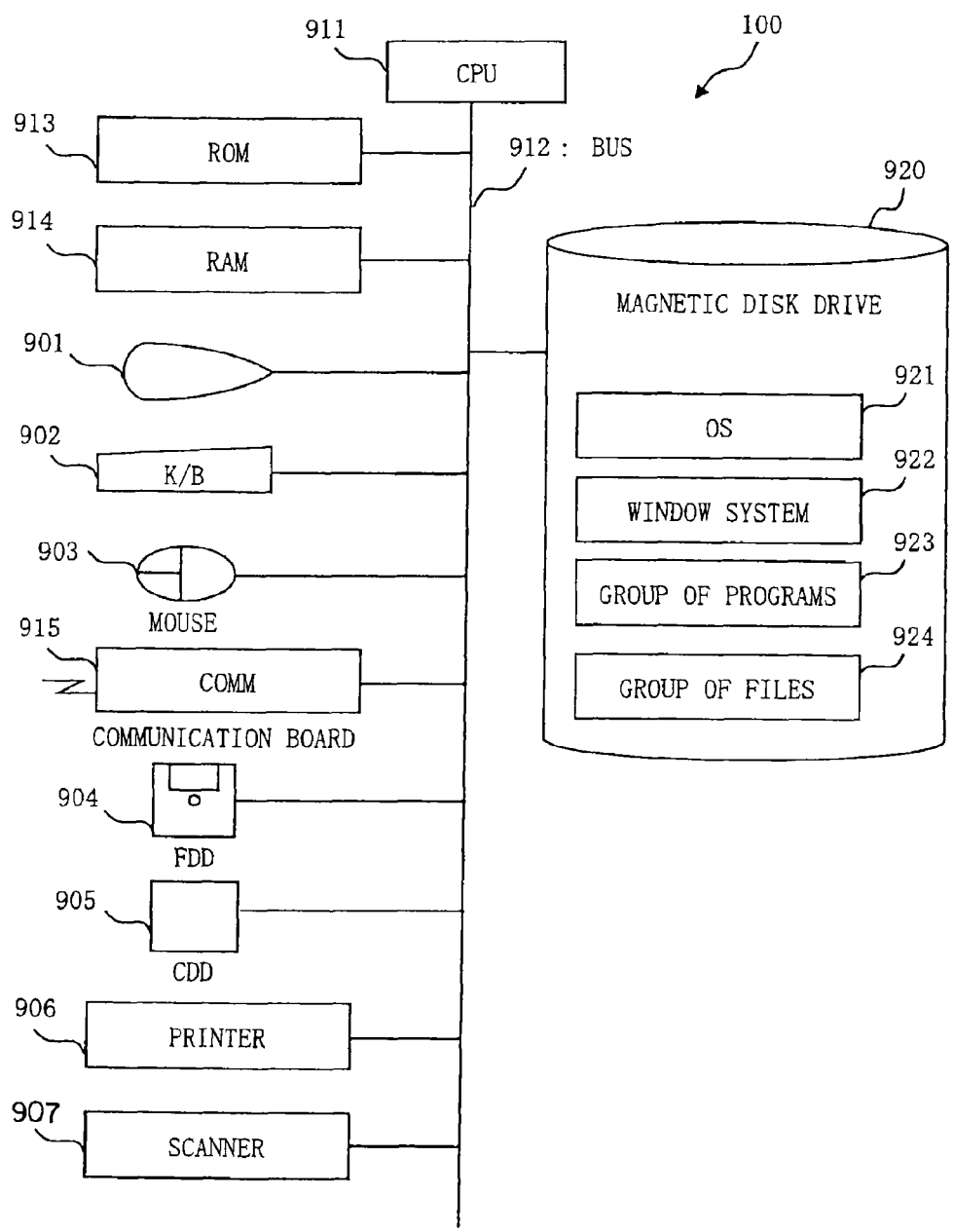
FIG. 31 shows a configuration example of a hardware of a time synchronizing apparatus according to the first and second embodiments.

1: a time synchronization controlling unit; 2: a received data processing unit; 3: a sending data generating unit; 4: an internal clock; 5: a clock controlling unit; 6: a forward direction transmission channel receiving unit; 7: a forward direction transmission channel repeater; 8: a forward direction transmission channel sending unit; 9: a backward direction transmission channel receiving unit; 10: a backward direction transmission channel repeater; 11: a backward direction transmission channel sending unit; and 100: a time synchronizing apparatus.

The invention claimed is:

1. A communication system, in which a master node apparatus having a reference clock and a plurality of slave node apparatuses each having an internal clock are connected to form a ring, for circulating a packet between a plurality of node apparatuses in two directions by transferring the packet in the two directions according to a packet transferring order prescribed for each node apparatus, the communication system comprising:
the master node apparatus that:
sends a first measurement packet to a slave node apparatus being a receiver in one direction according to the packet transferring order, and receives the first measurement packet which has been circulated among the plurality of slave node apparatuses in the one direction;
sends a second measurement packet to a slave node apparatus being a receiver in an other direction according to the packet transferring order, and receives the second measurement packet which has been circulated among the plurality of slave node apparatuses in the other direction;
according to time-keeping of the reference clock, stores at least either of a pair of a sending time of the first measurement packet and a received time of the second measurement packet and a pair of a received time of the first measurement packet and a sending time of the second measurement packet;
generates a measurement result notifying packet showing at least either of the pair of the sending time of the first measurement packet and the received time of the second measurement packet and the pair of the received time of the first measurement packet and the sending time of the second measurement packet; and
sends the measurement result notifying packet generated to a slave node apparatus being a receiver in either direction, and
each slave node apparatus that:
receives the first measurement packet from a node apparatus of a sender of the one direction, and sends the first measurement packet received to a node apparatus being a receiver in the one direction;
receives the second measurement packet from a node apparatus of a sender in the other direction, and sends the second measurement packet received to a node apparatus being the receiver in the other direction;
according to time-keeping of the internal clock, stores at least either of a pair of a received time of the first measurement packet and a sending time of the second measurement packet and a pair of a sending time of the first measurement packet and a received time of the second measurement packet; and
receives the measurement result notifying packet from a node apparatus being a sender in either direction, calculates a time correction value using at least either of the pair of the sending time of the first measurement packet and the received time of the second measurement packet and the pair of the received time of the first measurement packet and the sending time of the second measurement packet shown in the measurement result notifying packet received and at least either of the pair of the received time of the first measurement packet and the sending time of the second measurement packet stored and the pair of the sending time of the first measurement packet and the received time of the second measurement packet stored, and corrects a time of the internal clock using the time correction value calculated.

2. The communication system of claim 1,
wherein each slave node apparatus sets as the time correction value, a differential value obtained by subtracting an average value of the sending time and the received time of the pair stored from an average value of the sending time and the received time of the pair shown in the measurement result notifying packet.

3. The communication system of claim 2,
wherein each slave node apparatus:
when the pair of the sending time of the first measurement packet and the received time of the second measurement packet is stored at the master node apparatus, stores the pair of the received time of the first measurement packet and the sending time of the second measurement packet, sets as the time correction value, a differential value obtained by subtracting an average value of the received time of the first measurement packet and the sending time of the second measurement packet stored from an average value of the sending time of the first measurement packet and the received time of the second measurement packet shown in the measurement result notifying packet received; and
when the pair of the received time of the first measurement packet and the sending time of the second measurement packet is stored at the master node apparatus, stores the pair of the sending time of the first measurement packet and the received time of the second measurement packet, sets as the time correction value, a differential value obtained by subtracting an average value of the sending time of the first measurement packet and the received time of the second measurement packet stored from an average value of the received time of the first measurement packet and the sending time of the second measurement packet shown in the measurement result notifying packet received.

4. The communication system of claim 1,
wherein the master node apparatus:
when either one of the plurality of slave node apparatuses is uncommunicable, sends a turn-back measurement packet to be returned by a turn-back point slave node apparatus being uncommunicable to a slave node apparatus being a receiver in a direction of the turn-back point slave node apparatus, and according to time-keeping of the reference clock, stores a sending time of the turn-back measurement packet;
receives a returned turn-back measurement packet returned by the turn-back point slave node apparatus, and according to the time-keeping of the reference clock, stores a received time of the returned turn-back measurement packet; and
generates a turn-back measurement result notifying packet showing the sending time of the turn-back measurement packet and the received time of the returned turn-back measurement packet, and sends the turn-back measurement result notifying packet generated to a slave node apparatus being a receiver in a direction of the turn-back point slave node apparatus, and each slave node apparatus:
on receiving the turn-back measurement packet, according to the time-keeping of the internal clock, stores a received time of the turn-back measurement packet;
when the apparatus itself is not the turn-back point slave node apparatus, sends the turn-back measurement packet to a node apparatus being a receiver in a sending direction of the turn-back measurement packet, receives the returned turn-back measurement packet returned by the turn-back point slave node apparatus, sends the returned turn-back measurement packet received to a node apparatus being a receiver in a returning direction, and according to the time-keeping of the internal clock, stores a sending time of the returned turn-back measurement packet;
when the apparatus itself is the turn-back point slave node apparatus, returns the turn-back measurement packet to a node apparatus being a sender of the turn-back measurement packet, and according to the time-keeping of the internal clock, stores a sending time of the returned turn-back measurement packet; and
receives the turn-back measurement result notifying packet, calculates a time correction value using the sending time of the turn-back measurement packet and the received time of the returned turn-back measurement packet shown in the turn-back measurement result notifying packet and the received time of the turn-back measurement packet stored and the sending time of the returned turn-back measurement packet stored, and corrects a time of the internal clock using the time correction value calculated.

5. The communication system of claim 4,
wherein the master node apparatus:
when two slave node apparatuses are uncommunicable between each other, receives a returned turn-back measurement packet returned by a turn-back point slave node apparatus of one side of the two slave node apparatuses being uncommunicable, sends the returned turn-back measurement packet to a slave node apparatus being a receiver in a direction of a turn-back point slave node apparatus of an other side of the two slave node apparatuses being uncommunicable, and as well according to the time-keeping of the reference clock, stores a sending time of the returned turn-back measurement packet;
receives a twicely-returned turn-back measurement packet returned twice by the turn-back point slave node apparatus being the other side, and according to the time-keeping of the reference clock, stores a received time of the twicely-returned turn-back measurement packet; and
generates a turn-back measurement result notifying packet showing the sending time of the returned turn-back measurement packet and the received time of the twicely-returned turn-back measurement packet, and sends the turn-back measurement result notifying packet generated to the slave node apparatus being the receiver in the direction of the turn-back point slave node apparatus being the other side, and
each slave node apparatus:
on receiving the returned turn-back measurement packet sent by the master node apparatus, according to the time-keeping of the internal clock, stores a received time of the returned turn-back measurement packet;
when the apparatus itself is not the turn-back point slave node apparatus being the other side, sends the returned turn-back measurement packet to a node apparatus being a receiver in a sending direction of the returned turn-back measurement packet, receives the twicely-returned turn-back measurement packet returned twicely by the turn-back point slave node apparatus being the other side, sends the twicely-returned turn-back measurement packet received to a node apparatus being a receiver in a twicely-returning direction, and according to the time-keeping of the internal clock, stores a sending time of the twicely-returned turn-back measurement packet;

when the apparatus itself is the turn-back point slave node apparatus being the other side, twicely returns the returned turn-back measurement packet to a node apparatus being a sender of the returned turn-back measurement packet, and according to the time-keeping of the internal clock, stores a sending time of the twicely-returned turn-back measurement packet returned twicely; and receives the turn-back measurement result notifying packet, calculates the time correction value using the sending time of the returned turn-back measurement packet and the received time of the twicely-returned turn-back measurement packet shown in the turn-back measurement result notifying packet and the received time of the returned turn-back measurement packet stored and the sending time of the twicely-returned turn-back measurement packet stored, and corrects the time of the internal clock using the time correction value calculated.

6. The communication system of claim 4,
wherein each slave node apparatus sets as the time correction value, a differential value obtained by subtracting an average value of the received time of the turn-back measurement packet and the sending time of the returned turn-back measurement packets stored from an average value of the sending time of the turn-back measurement packet and the received time of the returned turn-back measurement packet shown in the turn-back measurement result notifying packet.

7. The communication system of claim 5,
wherein each slave node apparatus sets as the time correction value, a differential value obtained by subtracting an average value of the received time of the returned turn-back measurement packet and the sending time of the twicely-returned turn-back measurement packets stored from an average value of the sending time of the returned turn-back measurement packet and the received time of the twicely-returned turn-back measurement packet shown in the turn-back measurement result notifying packet.

8. The communication system of claim 1,
wherein each slave node apparatus:
according the time-keeping of the internal clock, stores the pair of the sending time of the first measurement packet and the received time of the second measurement packet and the pair of the received time of the first measurement packet and the sending time of the second measurement packet;

receives a measurement result notifying packet showing either of a pair of a sending time of the first measurement packet and a received time of the second measurement packet at an other node apparatus and a pair of a received time of the first measurement packet and a sending time of the second measurement packet at the other node apparatus;

calculates the time correction value using the pair of the sending time and the received time shown in the measurement result notifying packet received and either pair of the sending time and the received time out of the pairs stored; and calculates a sending time after correction and a received time after correction by applying the time correction value calculated to the pair of the sending time and the received time which has not been used for calculating the time correction value out of the pairs of the sending time and the received time stored.

9. The communication system of claim 8,
wherein each slave node apparatus:
receives, from the node apparatus being the sender in the one direction, a measurement result notifying packet showing the pair of the sending time of the first measurement packet and the received time of the second measurement packet at the node apparatus;

calculates the time correction value using the pair of the sending time of the first measurement packet and the received time of the second measurement packet shown in the measurement result notifying packet received and the pair of the received time of the first measurement packet and the sending time of the second measurement packet stored, and calculates the sending time after correction of the first measurement packet and the received time after correction of the second measurement packet by applying the time correction value calculated to the sending time of the first measurement packet stored and the received time of the second measurement packet stored; and stores a pair of the sending time after correction of the first measurement packet calculated and the received time after correction of the second measurement packet calculated in the measurement result notifying packet by replacing the pair of the sending time of the first measurement packet and the received time of the second measurement packet shown in the measurement result notifying packet received, and sends to a node apparatus being a receiver in the one direction the measurement result notifying packet in which the pair of the sending time after correction of the first measurement packet and the received time after correction of the second measurement packet is stored.

10. The communication system of claim 8,
wherein each slave node apparatus:
receives, from a node apparatus of a sender in the other direction, the measurement result notifying packet showing the pair of the received time of the first measurement packet and the sending time of the second measurement packet of the node apparatus;

calculates the time correction value using the pair of the received time of the first measurement packet and the sending time of the second measurement packet shown in the measurement result notifying packet received and the pair of the sending time of the first measurement packet stored and the received time of the second measurement packet stored, and calculates the received time after correction of the first measurement packet and the sending time after correction of the second measurement packet by applying the time correction value calculated to the received time of the first measurement packet stored and the sending time of the second measurement packet stored; and stores a pair of the received time after correction of the first measurement packet and the sending time after correction of the second measurement packet calculated in the measurement result notifying packet by replacing the pair of the received time of the first measurement packet and the sending time of the second measurement packet shown in the measurement result notifying packet received, and sends the measurement result notifying packet in which the pair of the received time after correction of the first measurement packet and the sending time after correction of the second measurement packet is stored to a node apparatus of a receiver in the other direction.

11. The communication system of claim 9,
wherein each slave node apparatus sets as the time correction value, a differential value obtained by subtracting an average value of the received time of the first measurement packet stored and the sending time of the second measurement packet stored from an average value of the sending time of the first measurement packet and the received time of the second measurement packet shown in the measurement result notifying packet.

12. The communication system of claim 10,
wherein each slave node apparatus sets as the time correction value, a differential value obtained by subtracting an average value of the sending time of the first measurement packet stored and the received time of the second measurement packet stored from an average value of the received time of the first measurement packet and the sending time of the second measurement packet shown in the measurement result notifying packet.

13. A management apparatus having a reference clock, forming a circulation route of a packet with a plurality of communication apparatuses, and circulating a packet in two directions on the circulation route according to a packet transferring order prescribed for each of the apparatus, the management apparatus comprising:
a first measurement packet sending unit sending a first measurement packet to a communication apparatus being a receiver in one direction according to the packet transferring order;
a first measurement packet receiving unit receiving the first measurement packet which has been circulated among the plurality of communication apparatuses in the one direction;
a second measurement packet sending unit sending a second measurement packet to a communication apparatus being a receiver in an other direction according to the packet transferring order;
a second measurement packet receiving unit receiving the second measurement packet which has been circulated among the plurality of communication apparatuses in the other direction;
a time memory unit, according to time-keeping of the reference clock, storing at least either of a pair of a sending time of the first measurement packet and a received time of the second measurement packet and a pair of a received time of the first measurement packet and a sending time of the second measurement packet;
a measurement result notifying packet generating unit generating a measurement result notifying packet showing at least either of the pair of the sending time of the first measurement packet and the received time of the second measurement packet and the pair of the received time of the first measurement packet and the sending time of the second measurement packet stored in the time memory unit; and
a measurement result notifying packet sending unit sending the measurement result notifying packet generated by the measurement result notifying packet generating unit to a slave node apparatus being the receiver in either direction.

14. The management apparatus of claim 13,
wherein the management apparatus further comprising:
a turn-back measurement packet generating unit, when either one of the plurality of communication apparatuses is uncommunicable, generating a turn-back measurement packet to be returned by a turn-back point communication apparatus which is uncommunicable;
a turn-back measurement packet sending unit sending the turn-back measurement packet generated by the turn-back measurement packet generating unit to a communication apparatus being a receiver in a direction of the turn-back point communication apparatus; and
a turn-back measurement packet receiving unit receiving a returned turn-back measurement packet returned by the turn-back point communication apparatus,
wherein the time memory unit, according to time-keeping of the reference clock, stores a sending time of the turn-back measurement packet by the turn-back measurement packet sending unit and a received time of the returned turn-back measurement packet by the turn-back measurement packet receiving unit,
wherein the measurement result notifying packet generating unit generates a turn-back measurement result notifying packet showing the sending time of the turn-back measurement packet and the received time of the returned turn-back measurement packet stored in the time memory unit, and
wherein the measurement result notifying packet sending unit sends the turn-back measurement result notifying packet generated by the measurement result notifying packet generating unit to the communication apparatus being the receiver in the direction of the turn-back point communication apparatus.

15. The management apparatus of claim 14,
wherein the turn-back measurement packet receiving unit receives, when two communication apparatuses are uncommunicable between each other, the returned turn-back measurement packet from a turn-back point communication apparatus of one side of the two communication apparatuses being uncommunicable,
wherein the turn-back measurement packet sending unit sends the returned turn-back measurement packet received by the turn-back measurement packet receiving unit to a communication apparatus being a receiver in a direction of a turn-back point communication apparatus of an other side of the two communication apparatuses being uncommunicable,
wherein the turn-back measurement packet receiving unit further receives a twicely-returned turn-back measurement packet returned twicely by the turn-back point communication apparatus of the other side,
wherein the time memory unit, according to the time-keeping of the reference clock, stores a sending time of the returned turn-back measurement packet by the turn-back measurement packet sending unit and a received time of the twicely-returned turn-back measurement packet by the turn-back measurement packet receiving unit,
wherein the turn-back measurement result notifying packet generating unit generates a turn-back measurement result notifying packet showing the sending time of the returned turn-back measurement packet and the received time of the twicely-returned turn-back measurement packet stored by the time memory unit, and
wherein the turn-back measurement result notifying packet sending unit sends the turn-back measurement result notifying packet generated by the turn-back measurement result notifying packet generating unit to a communication apparatus being a receiver in the direction of the turn-back point communication apparatus of the other side.

16. A communication apparatus having an internal clock, forming a circulation route of a packet with a management apparatus having a reference clock and at least one other communication apparatus, and circulating a packet in two directions on the circulation route according to a packet transferring order prescribed for each of the apparatuses, the communication apparatus comprising:
- a first measurement packet receiving unit receiving a first measurement packet which has been sent by the management apparatus in one direction, from an apparatus being a sender in the one direction according to the packet transferring order;
- a first measurement packet sending unit sending the first measurement packet received by the first measurement packet receiving unit to an apparatus being a receiver in the one direction;
- a second measurement packet receiving unit receiving a second measurement packet which has been sent by the management apparatus in an other direction, from an apparatus being a sender in the other direction according to the packet transferring order;
- a second measurement packet sending unit sending the second measurement packet received by the second measurement packet receiving unit to an apparatus being a receiver in the other direction according to the packet transferring order;
- a time memory unit, according to time-keeping of the internal clock, storing at least either of a pair of a received time of the first measurement packet and a sending time of the second measurement packet and a pair of a sending time of the first measurement packet and a received time of the second measurement packet;
- a measurement result notifying packet receiving unit receiving a measurement result notifying packet showing, according to time-keeping of the reference clock of the management apparatus, at least either of a pair of a sending time of the first measurement packet at the management apparatus and a received time of the second measurement packet which has been circulated through the circulation route at the management apparatus and a pair of a received time of the first measurement packet which has been circulated through the circulation route at the management apparatus and a sending time of the second measurement packet at the management apparatus;
- a time correction value calculating unit calculating a time correction value using at least either of the pair of the sending time of the first measurement packet at the management apparatus and the received time of the second measurement packet at the management apparatus and the pair of the received time of the first measurement packet at the management apparatus and the sending time of the second measurement packet at the management apparatus shown in the measurement result notifying packet received, and at least either of the pair of the received time of the first measurement packet and the sending time of the second measurement packet and the pair of the sending time of the first measurement packet and the received time of the second measurement packet stored by the time memory unit; and
- a clock controlling unit correcting a time of the internal clock using the time correction value calculated by the time correction value calculating unit.

17. The communication apparatus of claim 16,
wherein the time correction value calculating unit sets as the time correction value, a differential value obtained by subtracting an average value of the sending time and the received time of the pair stored in the time memory unit from an average value of the received time of and the sending time shown in the measurement result notifying packet.

18. The communication apparatus of claim 17,
wherein the time memory unit:
when the measurement result notifying packet showing the pair of the sending time of the first measurement packet and the received time of the second measurement packet at the management apparatus is received by the measurement result notifying packet receiving unit, stores the pair of the received time of the first measurement packet and the sending time of the second measurement packet; and
when the measurement result notifying packet showing the pair of the received time of the first measurement packet and the sending time of the second measurement packet at the management apparatus is received by the measurement result notifying packet receiving unit, stores the pair of the sending time of the first measurement packet and the received time of the second measurement packet,
wherein the time correction value calculating unit:
when the measurement result notifying packet showing the pair of the sending time of the first measurement packet and the received time of the second measurement packet at the management apparatus is received by the measurement result notifying packet receiving unit, sets as the time correction value, a differential value obtained by subtracting an average value of the received time of the first measurement packet and the sending time of the second measurement packet stored in the time memory unit from an average value of the sending time of the first measurement packet and the received time of the second measurement packet at the management apparatus shown in the measurement result notifying packet; and
when the measurement result notifying packet showing the pair of the received time of the first measurement packet and the sending time of the second measurement packet at the management apparatus is received by the measurement result notifying packet receiving unit, sets as the time correction value, a differential value obtained by subtracting an average value of the sending time of the first measurement packet and the received time of the second measurement packet stored by the time memory unit from an average value of the received time of the first measurement packet and the sending time of the second measurement packet shown in the measurement result notifying packet.

19. The communication apparatus of claim 16 further comprising:
- a turn-back measurement packet receiving unit, when either of the communication apparatuses is uncommunicable, receiving a turn-back measurement packet to be returned by a turn-back point communication apparatus being uncommunicable, sent by the management apparatus; and
- a turn-back measurement packet sending unit, when an apparatus itself is not the turn-back point communication apparatus, sending the turn-back measurement packet to an apparatus being a receiver in a sending direction of the turn-back measurement packet, as well sending a returned turn-back measurement packet which is the turn-back measurement packet returned by the turn-back point communication apparatus to an apparatus being a receiver in a returning direction after the returned turn-back measurement packet is received by the turn-back measurement packet receiving unit, and when the apparatus itself is the turn-back point communication apparatus, returning the turn-back measurement packet as the returned turn-back measurement packet to an apparatus being a sender of the turn-back measurement packet, wherein the time memory unit stores, according to time-keeping of the internal clock, a received time of the turn-back measurement packet and a sending time of the returned turn-back measurement packet, wherein the measurement result notifying packet receiving unit receives a turn-back measurement result notifying packet showing, according to time-keeping of the reference clock of the management apparatus, a sending time of the turn-back measurement packet at the management apparatus and a received time of the returned turn-back measurement packet at the management apparatus;, and wherein the time correction value calculating unit calculates the time correction value using the sending time of the turn-back measurement packet at the management apparatus and the received time of the returned turn-back measurement packet at the management apparatus shown in the turn-back measurement result notifying packet and the received time of the turn-back measurement packet and the sending time of the returned turn-back measurement packet stored in the time memory unit.

20. The communication apparatus of claim 19, wherein the time correction value calculating unit sets as the time correction value, a differential value obtained by subtracting an average value of the received time of the turn-back measurement packet and the sending time of the returned turn-back measurement packet stored by the time memory unit from an average value of the sending time of the turn-back measurement packet at the management apparatus and the received time of the returned turn-back measurement packet at the management apparatus shown in the measurement result notifying packet.

21. The communication apparatus of claim 16, wherein the time memory unit according to the time-keeping of the internal clock, stores the pair of the sending time of the first measurement packet and the received time of the second measurement packet and the pair of the received time of the first measurement packet and the sending time of the second measurement packet, wherein the measurement result notifying packet receiving unit receives a measurement result notifying packet showing either of a pair of a sending time of the first measurement packet at an other apparatus and a received time of the second measurement packet at the other apparatus and a pair of a received time of the first measurement packet at the other apparatus and a sending time of the second measurement packet at the other apparatus, and wherein the time correction value calculating unit:

calculates the time correction value using the pair of the sending time and the received time at the other apparatus shown in the measurement result notifying packet received by the measurement result notifying packet receiving unit and either pair of the sending time and the received time out of the pairs stored by the time memory unit; and calculates a sending time after correction and a received time after correction by applying the time correction value calculated to the pair of the sending time and the received time which is not used for calculating the time correction value out of the pairs of the sending time and the received time stored by the time memory unit.

22. The communication apparatus of claim 21, wherein the measurement result notifying packet receiving unit receives a measurement result notifying packet showing a pair of a sending time of the first measurement packet and a received time of the second measurement packet at the apparatus being the sender in the one direction, from the apparatus, wherein the time correction value calculating unit calculates the time correction value using the sending time of the first measurement packet and the received time of the second measurement packet shown in the measurement result notifying packet received by the measurement result notifying packet receiving unit and the pair of the received time of the first measurement packet and the sending time of the second measurement packet stored by the time memory unit, and calculates a sending time after correction of the first measurement packet and a received time after correction of the second measurement packet by applying the time correction value calculated to the sending time of the first measurement packet and the received time of the second measurement packet stored by the time memory unit, and wherein the communication apparatus further comprises:

a measurement result notifying packet updating unit storing a pair of the sending time after correction of the first measurement packet and the received time after correction of the second measurement packet calculated by the time correction value calculating unit in the measurement result notifying packet by replacing the pair of the sending time of the first measurement packet and the received time of the second measurement packet shown in the measurement result notifying packet received by the measurement result notifying packet receiving unit; and a measurement result notifying packet sending unit sending the measurement result notifying packet in which the pair of the sending time after correction of the first measurement packet and the received time after correction of the second measurement packet is stored by the measurement result notifying packet updating unit, to an apparatus being a receiver in the one direction.

23. The communication apparatus of claim 21, wherein each communication apparatus, wherein the measurement result notifying packet receiving unit receives a measurement result notifying packet showing a pair of a received time of the first measurement packet and a sending time of the second measurement packet at the apparatus being the sender in the other direction, wherein the time correction value calculating unit calculates the time correction value using the received time of the first measurement packet and the sending time of the second measurement packet shown in the measurement result notifying packet received by the measurement result notifying packet receiving unit and the pair of the sending time of the first measurement packet and the received time of the second measurement packet stored by the time memory unit, and calculates a received time after correction of the first measurement packet and a sending time after correction of the second measurement packet by applying the time correction value calculated to the received time of the first measurement packet and the sending time of the second measurement packet stored by the time memory unit, and wherein the communication apparatus further comprises:

a measurement result notifying packet updating unit storing a pair of the received time after correction of the first measurement packet and the sending time after correction of the second measurement packet calculated by the time correction value calculating unit in the measurement result notifying packet by replacing the pair of the received time of the first measurement packet and the sending time of the second measurement packet shown in the measurement result notifying packet received by the measurement result notifying packet receiving unit; and a measurement result notifying packet sending unit sending the measurement result notifying packet in which the pair of the received time after correction of the first measurement packet and the sending time after correction of the second measurement packet is stored by the measurement result notifying packet updating unit, to an apparatus being a receiver in the other direction.

24. The communication apparatus of claim 22, wherein the time correction value calculating unit sets as the time correction value, a differential value obtained by subtracting an average value of the received time of the first measurement packet and the sending time of the second measurement packet stored by the time memory unit from an average value of the sending time of the first measurement packet and the received time of the second measurement packet shown in the measurement result notifying packet to.

25. The communication apparatus of claim 23, wherein each communication apparatus sets as the time correction value, a differential value obtained by subtracting an average value of the sending time of the first measurement packet and the received time of the second measurement packet stored by the time memory unit from an average value of the received time of the first measurement packet and the sending time of the second measurement packet shown in the measurement result notifying packet.

26. A non-transitory computer readable medium including computer executable instructions, which when executed by a management apparatus, having a reference clock, forming a circulation route of a packet with a plurality of communication apparatuses, and circulating a packet in two directions on the circulation route according to a packet transferring order prescribed for each of the apparatus, cause the management apparatus to perform a method comprising:

sending a first measurement packet to a communication apparatus being a receiver in one direction according to the packet transferring order;

receiving the first measurement packet which has been circulated among the plurality of communication apparatuses in the one direction;

sending a second measurement packet to a communication apparatus being a receiver in an other direction according to the packet transferring order;

receiving the second measurement packet which has been circulated among the plurality of communication apparatuses in the other direction;

storing, according to time-keeping of the reference clock, at least either of a pair of a sending time of the first measurement packet and a received time of the second measurement packet and a pair of a received time of the first measurement packet and a sending time of the second measurement packet;

generating a measurement result notifying packet showing at least either of the pair of the sending time of the first measurement packet and the received time of the second measurement packet and the pair of the received time of the first measurement packet and the sending time of the second measurement packet stored by the time storing process; and sending the measurement result notifying packet to a communication apparatus being a receiver in either direction.

27. A non-transitory computer readable medium including computer executable instructions, which when executed by a communication apparatus, having an internal clock, forming a circulation route of a packet with a management apparatus having a reference clock and at least one other communication apparatuses, and circulating a packet in two directions on the circulation route according to a packet transferring order prescribed for each of the apparatuses, cause the management apparatus to perform a method comprising:

receiving a first measurement packet which has been sent by the management apparatus in one direction, from an apparatus being a sender in the one direction according to the packet transferring order;

sending the first measurement packet to an apparatus being a receiver in the one direction;

receiving a second measurement packet which has been sent by the management apparatus in an other direction, from an apparatus being a sender in the other direction according to the packet transferring order;

sending the second measurement packet to an apparatus being a receiver in the other direction according to the packet transferring order;

storing, according to time-keeping of the internal clock, at least either of a pair of a received time of the first measurement packet and a sending time of the second measurement packet and a pair of a sending time of the first measurement packet and a received time of the second measurement packet;

receiving a measurement result notifying packet showing, according to time-keeping of the reference clock of the management apparatus, at least either of a pair of a sending time of the first measurement packet at the management apparatus and a received time of the second measurement packet which has been circulated through the circulation route at the management apparatus and a pair of a received time of the first measurement packet which has been circulated through the circulation route at the management apparatus and a sending time of the second measurement packet at the management apparatus;

calculating a time correction value using at least either of the pair of the sending time of the first measurement packet and the received time of the second measurement packet at the management apparatus and the pair of the received time of the first measurement packet at the management apparatus and the sending time of the second measurement packet at the management apparatus shown in the measurement result notifying packet received, and at least either of the pair of the received time of the first measurement packet and the sending time of the second measurement packet and the pair of the sending time of the first measurement packet and the received time of the second measurement packet; and correcting a time of the internal clock using the time correction value.

* * * * *